US008907968B2

(12) United States Patent
Tanaka et al.

(10) Patent No.: US 8,907,968 B2
(45) Date of Patent: Dec. 9, 2014

(54) IMAGE RENDERING DEVICE, IMAGE RENDERING METHOD, AND IMAGE RENDERING PROGRAM FOR RENDERING STEREOSCOPIC PANORAMIC IMAGES

(75) Inventors: Keiichi Tanaka, Osaka (JP); Tomoko Katayama, Osaka (JP); Osamu Yamaji, Osaka (JP)

(73) Assignee: Panasonic Corporation, Osaka (JP)

( * ) Notice: Subject to any disclaimer, the term of this patent is extended or adjusted under 35 U.S.C. 154(b) by 197 days.

(21) Appl. No.: 13/635,820

(22) PCT Filed: Mar. 2, 2012

(86) PCT No.: PCT/JP2012/001460
§ 371 (c)(1),
(2), (4) Date: Sep. 18, 2012

(87) PCT Pub. No.: WO2012/132234
PCT Pub. Date: Oct. 4, 2012

(65) Prior Publication Data
US 2013/0044108 A1 Feb. 21, 2013

Related U.S. Application Data

(60) Provisional application No. 61/470,032, filed on Mar. 31, 2011.

(51) Int. Cl.
*G09G 5/00* (2006.01)
*G06T 15/04* (2011.01)
*G06T 15/20* (2011.01)
*H04N 13/00* (2006.01)
(52) U.S. Cl.
CPC ............... *G06T 15/04* (2013.01); *G06T 15/20* (2013.01); *H04N 13/0011* (2013.01)
USPC ............ 345/585; 345/419; 345/422; 345/582

(58) Field of Classification Search
USPC .......................... 345/419, 420, 422, 582, 585
See application file for complete search history.

(56) References Cited

U.S. PATENT DOCUMENTS 5,953,014 A * 9/1999 Wood ............................. 345/422
7,295,699 B2 * 11/2007 Ohba et al. .................... 382/154
(Continued)

FOREIGN PATENT DOCUMENTS

JP 11-514118 11/1999
JP 2004-132933 4/2004
(Continued)

OTHER PUBLICATIONS

S.Iizuka et al., "An efficient modeling system for 3-D scenes from a single landscape image", No. 142, Apr. 15, 2011, pp. 1-6.
(Continued)

*Primary Examiner* — Maurice L McDowell, Jr.
(74) *Attorney, Agent, or Firm* — Greenblum & Bernstein, P.L.C.

(57) ABSTRACT

An image rendering device realizes stereoscopic viewing of a joint background image. A DIBR unit 17 applies pixel shifting to each background image constructing the joint background image and also conducts boundary processing relative to the pixel shifting. The joint background image is composed of one or more background images stitched together along their edges on a three-dimensional model. The pixel shifting is to shift pixels of each background image in the row direction. The amount of shift applied to each pixel is determined based on the depth value of a corresponding pixel of a depth image. The boundary processing is to extract pixels shifted out of the display region of a given background image as a result of pixel shifting and add the extracted pixels to an edge of another background image adjacent to the given background image in the row direction.

7 Claims, 32 Drawing Sheets

(56) References Cited

U.S. PATENT DOCUMENTS

| | | | |
|---|---|---|---|
| 7,843,451 B2* | 11/2010 | Lafon | 345/423 |
| 8,417,024 B2* | 4/2013 | Mashitani et al. | 382/154 |
| 2008/0291201 A1 | 11/2008 | Lafon | |
| 2008/0291217 A1 | 11/2008 | Vincent et al. | |
| 2008/0292213 A1 | 11/2008 | Chau | |
| 2009/0129667 A1 | 5/2009 | Ho et al. | |
| 2010/0104262 A1* | 4/2010 | Kanamaru et al. | 386/95 |
| 2010/0208942 A1 | 8/2010 | Porter et al. | |
| 2010/0226628 A1 | 9/2010 | Yamaji et al. | |
| 2010/0306249 A1* | 12/2010 | Hill et al. | 707/769 |
| 2011/0080462 A1 | 4/2011 | Yamaji et al. | |
| 2011/0141227 A1* | 6/2011 | Bigioi et al. | 348/36 |
| 2011/0254915 A1 | 10/2011 | Vincent et al. | |
| 2012/0169729 A1* | 7/2012 | Yamaji et al. | 345/419 |

FOREIGN PATENT DOCUMENTS

| | | |
|---|---|---|
| JP | 2009-123219 | 6/2009 |
| JP | 2010-193458 | 9/2010 |
| JP | 2010-531007 | 9/2010 |
| WO | 97/47141 A2 | 12/1997 |
| WO | 97/47141 A3 | 2/1998 |
| WO | 2008/147561 | 12/2008 |

OTHER PUBLICATIONS

U.S. Appl. No. 13/580,027 to Germano Leichsenring et al., which was filed Aug. 20, 2012.

U.S. Appl. No. 13/638,136 to Tomoko Katayama et al., which was filed Sep. 28, 2012.

* cited by examiner

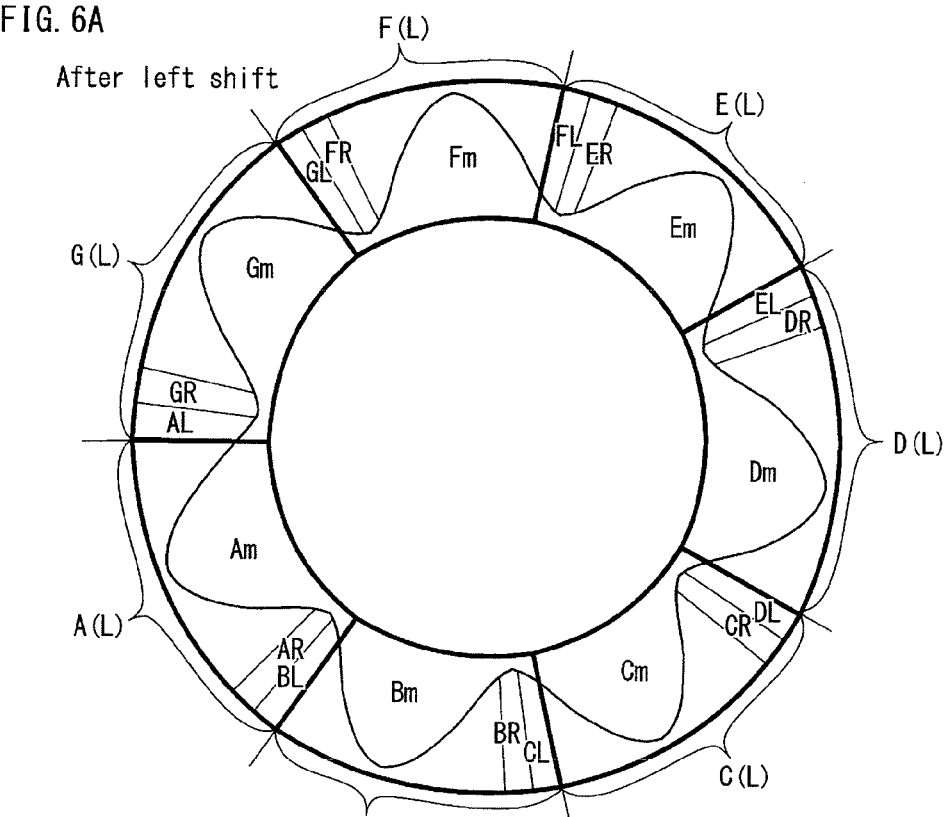
FIG. 6A After left shift
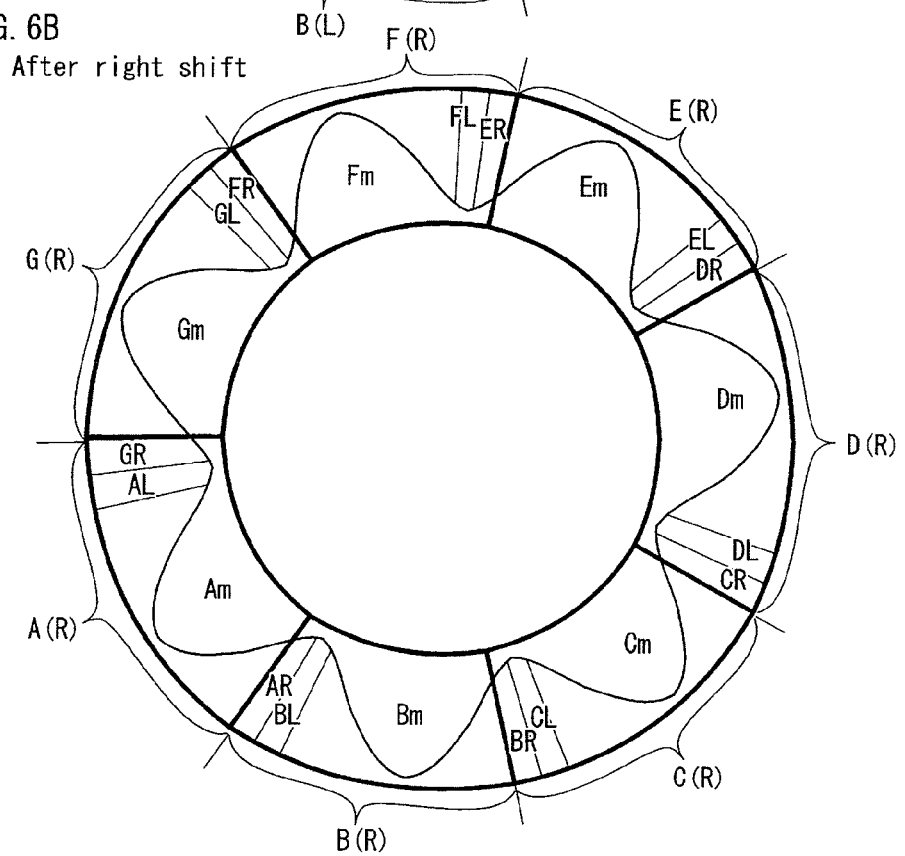
FIG. 6B After right shift

Feature point matching between foreground image and background image applied on sphere Foreground image

FIG. 14A
Panoramic image
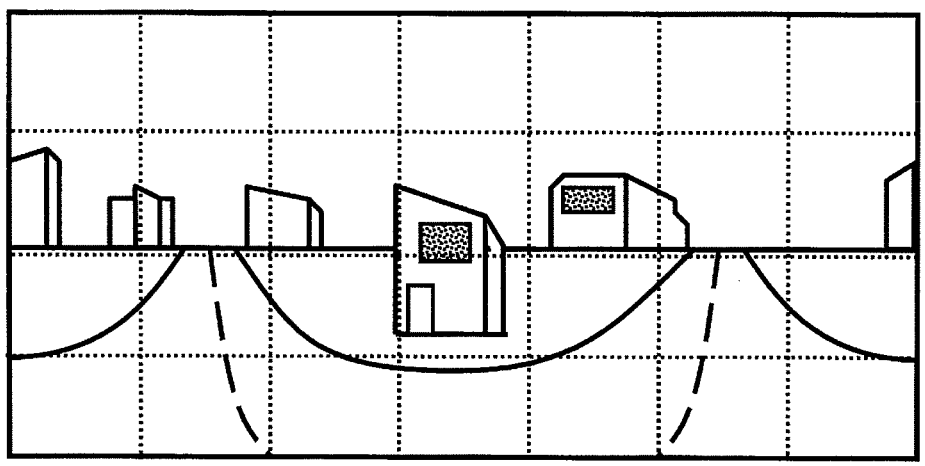
FIG. 14B
Depth image
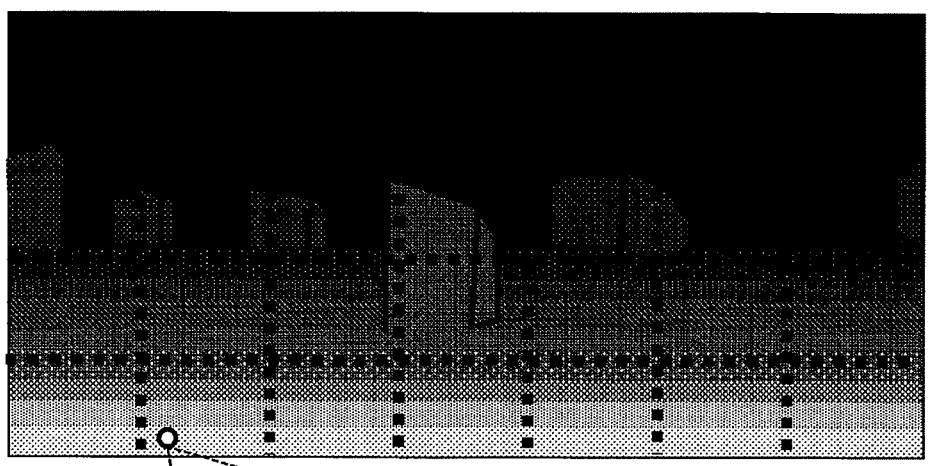
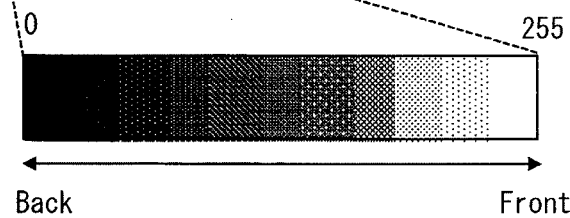
Back          Front 1st level: Panoramic image memory 1st level: Panoramic image memory

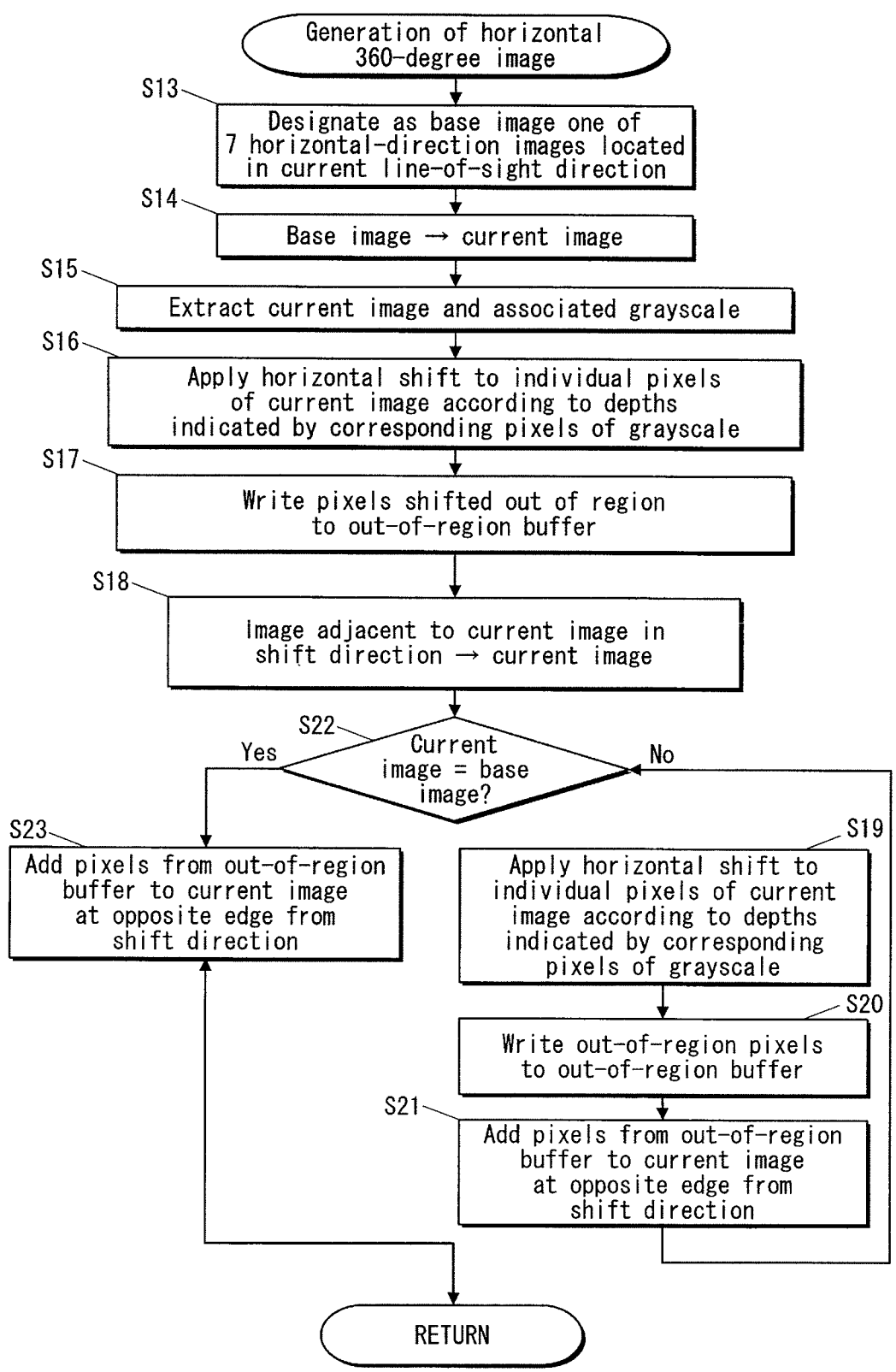

FIG. 26A  Shift without boundary processing
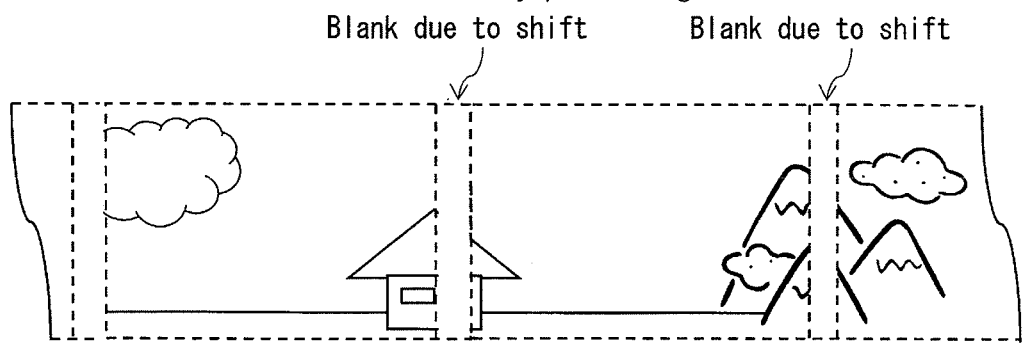
FIG. 26B  Shift with boundary processing
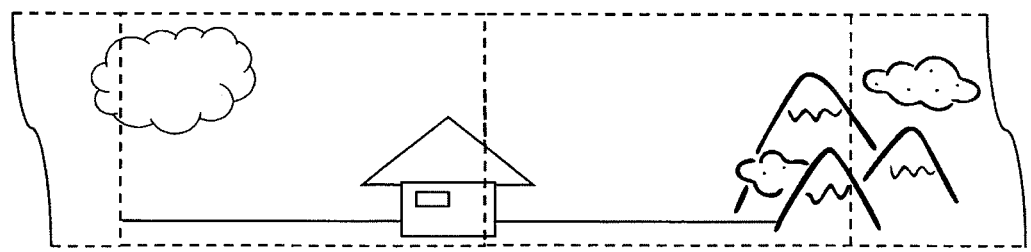

Panoramic image

Depth image

After pixel shifting

After generation of stereo image

IMAGE RENDERING DEVICE, IMAGE RENDERING METHOD, AND IMAGE RENDERING PROGRAM FOR RENDERING STEREOSCOPIC PANORAMIC IMAGES

RELATED APPLICATIONS

This application is a National Phase application of International Application No. PCT/JP2012/001460, filed Mar. 2, 2012, and claims the benefit of U.S. Provisional application No. 61/470,032, filed Mar. 31, 2011, the disclosures of which are incorporated by reference herein in their entireties.

TECHNICAL FIELD

The present invention relates to a technique for rendering panoramic images.

BACKGROUND ART

The technique for rendering panoramic images provides the foundation for street view services. In street view services, panoramic images taken along streets are managed on the serves and users can enjoy 360-degree full panoramic views of scenery as seen from any desired street location, through a Web browser, for example. The street view service allows users to see views from any viewpoint, rather than from a fixed viewpoint. This offers improved convenience when, for example, users are confirming the conditions at a travel destination before departure or recalling memories of a trip afterwards. The Patent Literature below discloses conventional technology related to street view.

CITATION LIST

Patent Literature

Patent Literature 1

SUMMARY OF INVENTION

Technical Problem

However, although the street view services mentioned above offer panoramic images, the images are presented only as monoscopic images. In recent years, large-screen 3D televisions are becoming popular. It is clear that if panoramic images can only be presented for monoscopic viewing, the service will not compare favorably.

Yet, to provide street views for 3D stereoscopic viewing, all of the streets in the world need to be photographed again with a 3D stereo camera, which would not only require incredible time and effort, but would also be a waste of the monoscopic street view images having been accumulated. In view of the above, it is devised to make use of existing monoscopic street view images for stereoscopic viewing through conversion from monoscopic to stereoscopic viewing. Unfortunately, the conversion from monoscopic to stereoscopic viewing is associated with the following technical barrier. Generally, a panoramic image subjected to the above rendering is not captured as a single Mercator image but is a joint image constructed of a plurality of background images, such as 4 columns×7 rows. As described above, to obtain a 360-degree panoramic image by stitching a plurality of background images and use the resulting panoramic image for stereoscopic viewing, each of the plurality of images constructing the 360-degree panoramic image needs to be subjected to depth image based rendering, which is rendering performed using a depth image. The depth image based rendering is a technique of applying a horizontal shift to the coordinate of each pixel in an image to provide a depth indicated by the depth image. It is noted that pixel shifting applied based on a depth image to the individual images constructing a 360-degree panoramic image causes an edge part of each image to fall outside the image display region. Consequently, pixels located at the boundary between neighboring images in the 360-degree panoramic image are lost, which leads to the occurrence of vertical blank lines in the resulting 360-degree panoramic image.

This significantly lowers the display quality. In the case where a Mercator image is subjected to conversion for stereoscopic viewing, there is no image boundary and thus there is no blank line. However, in the case where a Mercator image constructed of a plurality of images stitched together is subjected to depth image based rendering, a large amount of memory is required for temporality storing the Mercator image, which makes it difficult to cut costs of resulting products. In addition, a Mercator image is originally intended to be applied to a spherical model. Therefore, in the state being applied to a spherical model, the edges of one Mercator image are placed next to each other and this becomes a boundary. An image generated by depth image based rendering of such a Mercator image will therefore have a blank region that is without pixels along the boundary. This significantly lowers the display quality.

As described above, when stereo images are generated using a monoscopic image and a depth image, pixel shifts applied to the image edges during the process of stereo image generation causes resultant adjacent images no longer seamless. This leads to the problem that a boundary between images is displayed unnaturally.

An object of the present invention is to provide an image rendering device not causing a blank region in a rendered image.

Solution to Problem

Although the technical problem to be solved is presented on the precondition that that a background image is a street view, this is merely one familiar example used to explain the technical problem. The technical problem solved by the present invention is not limited to the specific case where the background image is a street view. The technical problem solved by the present invention is to remove visual inconsistencies from stereoscopic viewing of images each constructed of a plurality of images stitched together. This technical problem is a technical barrier that those skilled in the art will inevitably face in an attempt to implement the above technical in the field of industry products in the near future.

To solve the above problem, an image rendering device is for realizing stereoscopic viewing of joint image data that is constructed of a plurality of pieces of background image data that are stitched together in a row direction. The image rendering device includes: a pixel shift unit operable to apply pixel shifting to each piece of background image data and conduct boundary processing relative to the pixel shifting, thereby to acquire two or more viewpoint textures for the joint image data; a mapping unit operable to place the two or more viewpoint textures onto inner surfaces of three-dimensional models in a three-dimensional modeling space; a viewport conversion unit operable to extract, for each of two or more viewports, a viewport image from the textured three-dimensional models. The pixel shifting is to shift coordinates of respective pixels in each piece of background image data in the row direction, and the amount of shift applied to each pixel is determined based on a depth of a corresponding pixel in depth image data associated with the joint image data. The boundary processing is to extract out-of-region pixels which are pixels to be located outside a display region of a given one of the pieces of background image data as a result of the pixel shifting, and write the extracted out-of-region pixels at an edge of another piece of background image data that is adjacent to the given piece of background image data in the row direction.

Advantageous Effects of Invention

According to the present invention, pixels of one image shifted to fall outside of the display region are added to an adjacent image along an edge opposite to the shift direction. Consequently, it is avoided that the pixels shifted to be out-of-region pixels are lost. Since loss of pixels at the image boundaries is avoided, images stitched direction together in the row provide a 360 degree panoramic image of greater integrity and reality. In addition, when a joint image is applied to a sphere, an image located at one edge of the joint image comes to be located next to another image located at the other edge of the joint image. Here, if shift applied to the image located at one edge of the joint image causes some pixels to fall outside the image region, those pixels are added to the other edge of the joint image. Consequently, the joint image constructed of the plurality of images is placed onto the spherical model without loss of any pixels shifted to the outside the image region. This ensures to improve the integrity of the resulting image.

For example, when applying shift to a panoramic image constructed of 4 column×7 row background images stitched together, it is not necessary to store the entire panoramic image to the memory. Thus, this configuration serves to reduce the required amount of memory.

Optionally, the image rendering device may further include: a display region buffer; an out-of-region buffer; and a texture memory operable to store a piece of background image data already processed by the pixel shifting. Of the plurality of pieces of background image data constructing the joint image data, a piece of background image data currently subjected to the pixel shifting is designated as a current piece of background image data. The pixel shifting may be carried out by: storing the current piece of background image data in the display region buffer; shifting, on the display region buffer, coordinates of respective pixels in the current piece of background image data in the row direction; and extracting out-of-region pixels shifted to outside a display region of the current piece of background image data and storing the extracted out-of-region pixels in the out-of-region buffer. The boundary processing may be carried out by: reading the out-of-region pixels from the out-of-region buffer; and writing the read out-of-region pixels at the edge of the piece of already processed background image data stored in the texture memory. The capacity of the display region buffer needed for applying shift is sufficient as long as data of a single background image, rather than the entire joint image, can be stored. Since the capacity of memory required for pixel shifting is minimized, the image rendering device can be implemented in digital home appliances without the risk of cost increase.

Optionally, the joint image data may be joint Mercator image data obtained by stitching together one edge and another edge of a single piece of Mercator image data. The boundary processing may be carried out by: extracting out-of-region pixels which are pixels to be located outside a display region of the Mercator image data as a result of the pixel shifting applied to respective pixel in the joint Mercator image data based on the depth image data; and writing the extracted out-of-region pixels into the joint Mercator image at the opposite edge from the edge where the out-of-region pixels are extracted. When one Mercator image is placed onto the inner surface of a spherical model, the two edges of that one Mercator image comes to be placed next to each other. In this case, pixels shifted to the outside the display region are added to the other edge, which is opposite from the shift direction. This approach ensures that the image with greater integrity is placed onto the spherical model. Thus, occurrence of blank regions is avoided.

Optionally, the image rendering device may further include: a position and direction determination unit operable to determine, in accordance with a user operation, a current viewpoint location on a map and a current line-of-sight direction; and an acquisition unit operable to generate an image acquisition request using geographic information corresponding to the current viewpoint location on the map and transmit the image acquisition request to an image collection server, thereby to download a street view file. The street view file downloaded from the image collection server may have a location attribute matching the geographic information included in the image acquisition request. The joint image data may be contained in the downloaded street view file. Since the background images are transmitted in response to an image acquisition request that uses global geographic information, the user staying at home is allowed to download images of any desired location over the world and composite the downloaded images with user's photograph. This serves allows the user to have a virtual experience of traveling all over the world.

Optionally, the joint image data may be a panoramic image and constructed of the plurality of pieces of background image data stitched together in the row direction to represent a view of surroundings as seen from a geographic location corresponding to the geographic information included in the image acquisition information. As above, a desired street view file is acquired by causing the server to conduct a search for background images, using the geographic information contained in the photograph file as a keyword. Consequently, by integrating the image rendering device into a digital television receiver, a new service is provided through a combined use of the digital television receiver and a stereoscopic camera. This provides product differentiation against competing products when selling digital television receivers packaged with a stereoscopic camera.

Optionally, the joint image data may be a panoramic image and constructed of the plurality of pieces of background image data stitched together in the row direction to represent a view of surroundings as seen from a geographic location corresponding to the geographic information included in the image acquisition information. This allows the user to freely change the line-of-sight within the angular range covered by the panoramic view image, so that richer past-experience simulation is provided.

BRIEF DESCRIPTION OF DRAWINGS

FIGS. 6A and 6B each illustrate the spherical model onto which a left-shifted or right-shifted panoramic image is applied.

FIG. 14A illustrates an example of a panoramic image acquired from a network interface 3 or a local storage 4, and FIG. 14B illustrates an example of a depth image associated with the panoramic image.

FIG. 25 is a flowchart illustrating the process of generating a horizontal 360-degree stereo image.

FIGS. 26A and 26B illustrate, for comparison, a panoramic image obtained exclusively through DIBR and a panoramic image obtained through pixel shifting and boundary processing.

DESCRIPTION OF EMBODIMENTS

The invention pertaining to an image rendering device having the means to solve the above problem may be implemented as a digital home appliance for playing back street views, whereas the invention pertaining to an integrated circuit may be implemented as a system LSI embedded in such a digital home appliance. The invention pertaining to an image rendering method may be implemented as a series of steps performed in proper time sequence by such a digital home appliance. The invention pertaining to an image rendering program may be implemented as an executable program that is stored on a non-transitory computer-readable recording medium for installation into a digital home appliance. Prior to the description of an image rendering device, the following describes the overall configuration of a stereoscopic global view search service, which is the environment in which the image rendering device is used.

Figure 1:
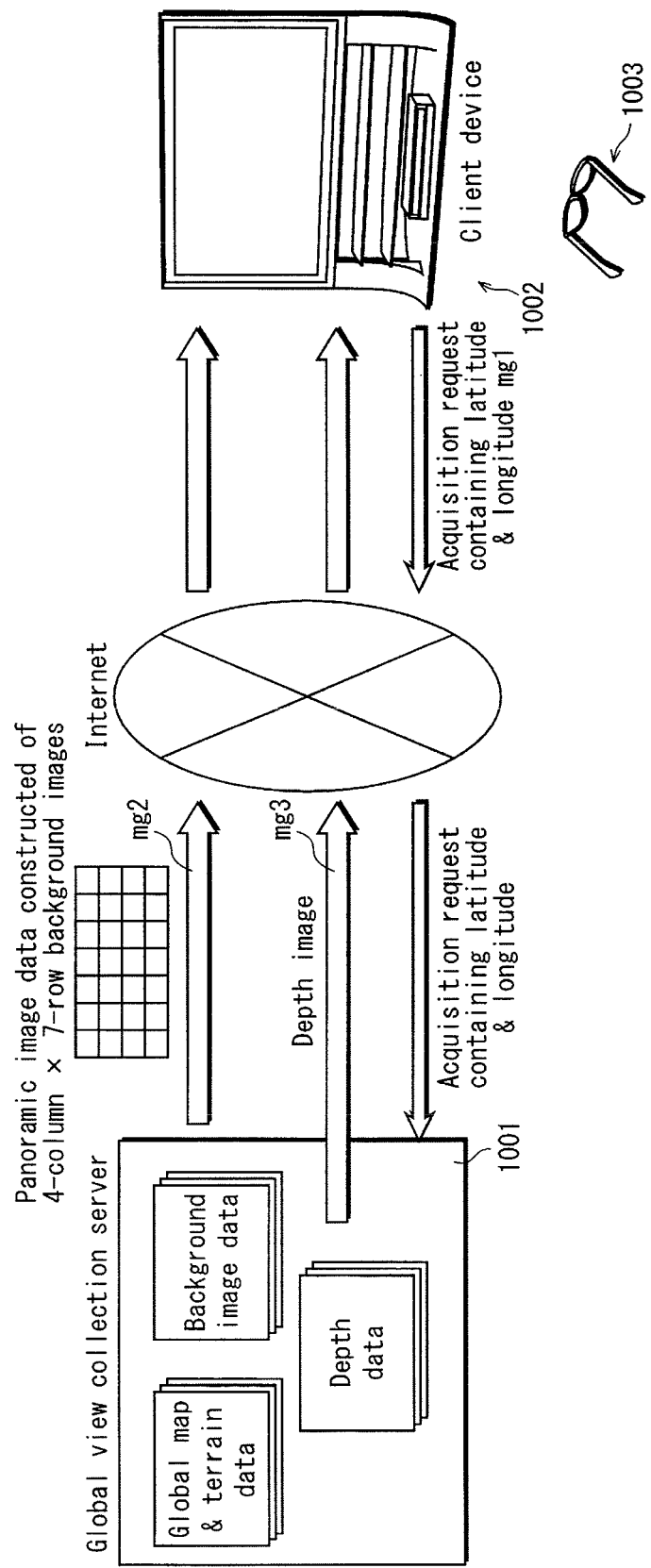
FIG. 1 illustrates the overall configuration of a stereoscopic global view search service.

FIG. 1 illustrates the overall configuration of the stereoscopic global view search service. A global view collection server 1001 stores background images collected around the world, and also stores depth data and terrain data of each background image. Upon request from client devices, the global view collection server 1001 transmits panoramic viewpoint images along with the associated depth images and terrain data. Background images are taken by cameras mounted atop a passing vehicle dedicated for image capturing. Depth data represents the depths to landmarks appearing in a captured image. Panoramic viewpoint images represent a view of surroundings as seen from a geographic location that matches the geographic information specified in an image acquisition request transmitted to the global view collection server 1001. A panoramic viewpoint image presents a view covering a relatively wide angle, such as 90°, 120°, 180°, and 360°, for example. Specifically, a panoramic viewpoint image covering 360° may also be referred to as a full view panoramic image or wraparound image. For the sake of convenience, the following description is given on the assumption that panoramic viewpoint images are 360-degree panoramic images, which are simply referred to as "panoramic images". A vehicle for image capturing is equipped with multiple cameras and captures four images in a vertical direction and seven images horizontally around (4 columns×7 rows) for each current location of the vehicle. A depth image represents depths in a background image by showing pixel luminance in proportion to the distance to surfaces of landmarks from the viewpoint. That is, each pixel in a depth image is a piece of depth information indicating the depth to a corresponding pixel in the background image.

A client device 1002 is a network home appliance, such as a digital television receiver, and transmits a download request mg1 to a server and receives a panoramic image mg2 and a depth image mg3 from the server. With the use of panoramic images, the client device 1002 presents a 3D street view. A download request includes information specifying the latitude, longitude, and altitude of a desired location on the Earth to request a panoramic image of the location to be transmitted.

A pair of eyeglasses 1003 is for use by a user to see street views stereoscopically. Stereoscopic viewing of a street view is realized by using multi-viewpoint images. The multi-viewpoint images refer to a set of viewpoint images as seen from two or more viewpoints for realizing stereoscopic viewing, such as left-, right-, central-, upper-right-, lower-right-, upper-left-, and lower-left-view images. Yet, describing each and every possible combination of multi-viewpoint images is rather complicated. For the sake of brevity, in the following description, multi-viewpoint images are assumed to be a minimal set of viewpoint images, namely a left-view image and a right-view image making up a stereo pair.

Figure 2:
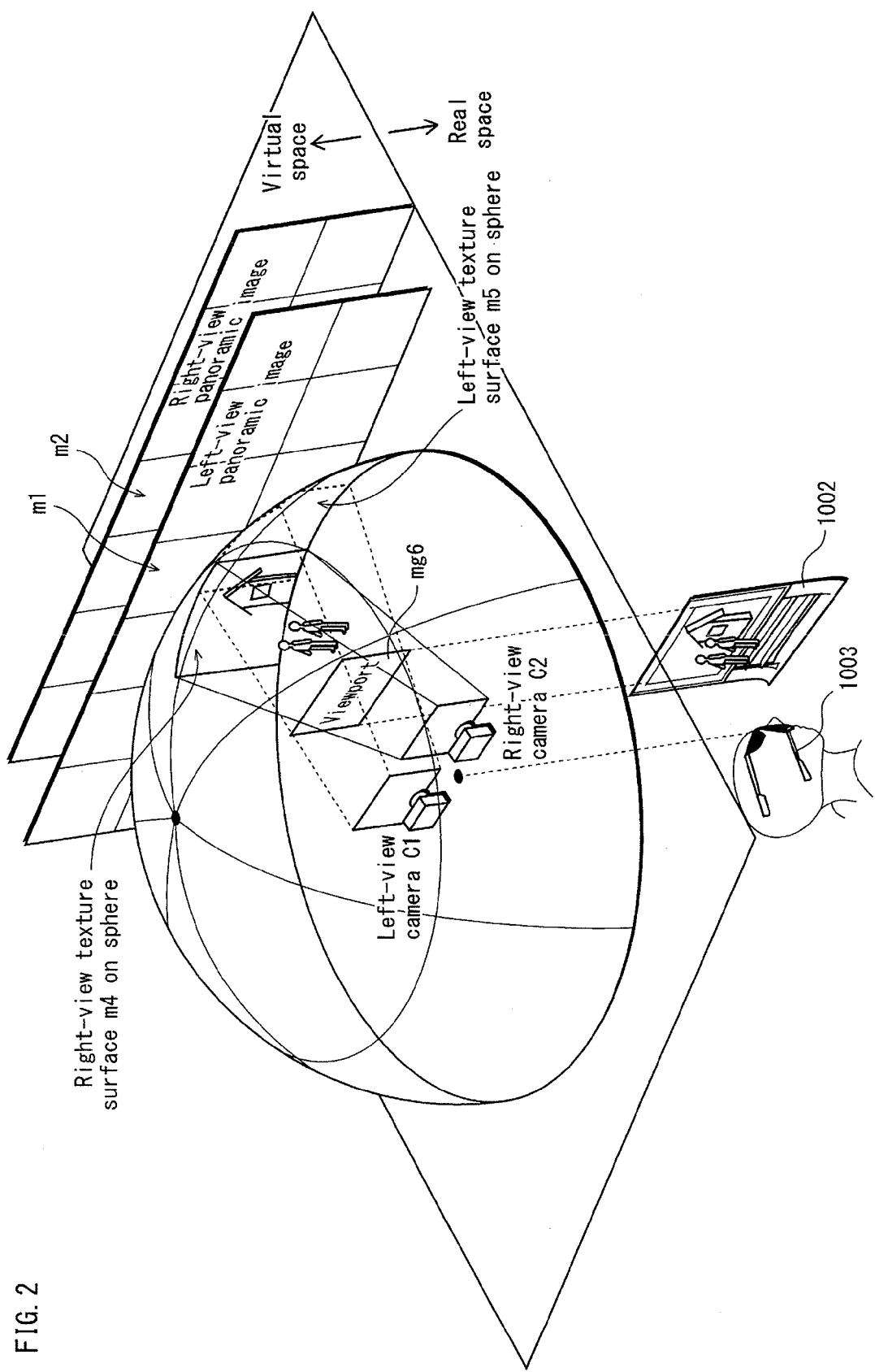
FIG. 2 schematically illustrates a virtual space pertaining to a street view.

FIG. 2 schematically illustrates a stereoscopic street view system. The upper half of the figure represents a virtual space in which a model is present, whereas the lower half of the figure represents a real space in which the client device 1002 and the eyeglasses 1003 are physically present.

First, a description of the virtual space is given. A virtual space is a three-dimensional modeling space defined on a coordinate system for describing the geometric shape of a three-dimensional model. A three-dimensional model may be of an object having any shape. A three-dimensional model may be of any shape, including a cylinder, a circular cone, a delta cone, and a spheroid. For purposes of convenience, the following description is given using a spherical model. The center of a sphere, which is a three-dimensional model, coincides with the camera position. For simplicity, the figure illustrates only one spherical model. However, for stereoscopic viewing, separate spherical models are used for the left-view and right-view. In the figure, the camera CL is located at a position offset to the right from the center of the sphere by the distance p. The camera CR is located at a position offset to the left from the center of the sphere by the distance p. Each of the cameras CL and CR is at the center of the corresponding spherical model used when capturing left- or right-view images.

Angularly upwardly from the three-dimensional model, a panoramic image composed of 4 columns×7 rows background images is applied. Panoramic images include a right-view panoramic image ml and a left-view panoramic image m2, and right-view texture and left-view texture are applied to different locations in the three-dimensional modeling space. Although the figure illustrates only the upper half of the spherical model, the spherical model also has a lower half. Similarly, although the figure illustrates only the upper half of the panoramic image, the panoramic image has a lower half.

The following is a description of the spherical model. The inner surface of the sphere has a region defined as a right-view texture surface m4 and as a left-view texture surface m5. A texture surface in a spherical model refers to a grid defined by four or three intersection points on the spherical model. Such a grid has the same curvature as the spherical model and defined as part or whole of a triangular strip having each vertex at a point specified by the polar coordinates of the spherical model. In texture mapping, graphics are rendered by designating a triangle strip as a geometry type and by assigning the coordinates of the texture buffer storing the background image. A display plane is present at a position closer toward the front than the texture, and a viewport mg6 is defined on the display plane. A viewport indicates the region in the three-dimensional modeling space used for display. Images projected on the viewport are supplied for playback. The viewport is located at the position where the image projection regions of the left-view and the right-view overlap. That is, the viewport for the left-view and the viewport for the right-view are commonly located at the same position.

The texture image applied inside the spherical model is a panoramic image, so that a 360-degree panorama is provided. By developing the spherical model in the three-dimensional modeling space into a Mercator image, a panoramic image is obtained. The number of 2 (column)×7 (row) grids in the semi-sphere is equal to the number of 2 (column)×7 (row) background images stitched into the panoramic image. In other words, the texture mapping is carried out on the individual background images making up the panoramic image, by converting each background image into a texture and applies the texture to a corresponding grid in the spherical model.

This concludes the description of the virtual space. The following now describes the real space.

In the figure, the client device 1002 and a user's head with the eyeglasses 1003 on are illustrated directly below the sphere representing the three-dimensional model. The display screen of the client device 1002 is located directly, below the viewport in the spherical model. The eyeglasses 1003 are located slightly farther back from the position that is directly below the cameras CL and CR for the following reason. That is, the cameras CL and CR need to coincide in position to the user's right-view and left-view, so that the eyeglasses 1003 need to be located in the vicinity.

As described above, the positions of the cameras CL and CR coincide with the user's right-view and left-view, while the viewport coincides with the screen of the client device 1002. Thus, stereoscopic images appear between the client device 1002 and the user. In the virtual space, a house illustrated as a plane figure. However, in the real space, the house appears as popping out of the screen of the client device 1002.

Figure 3:
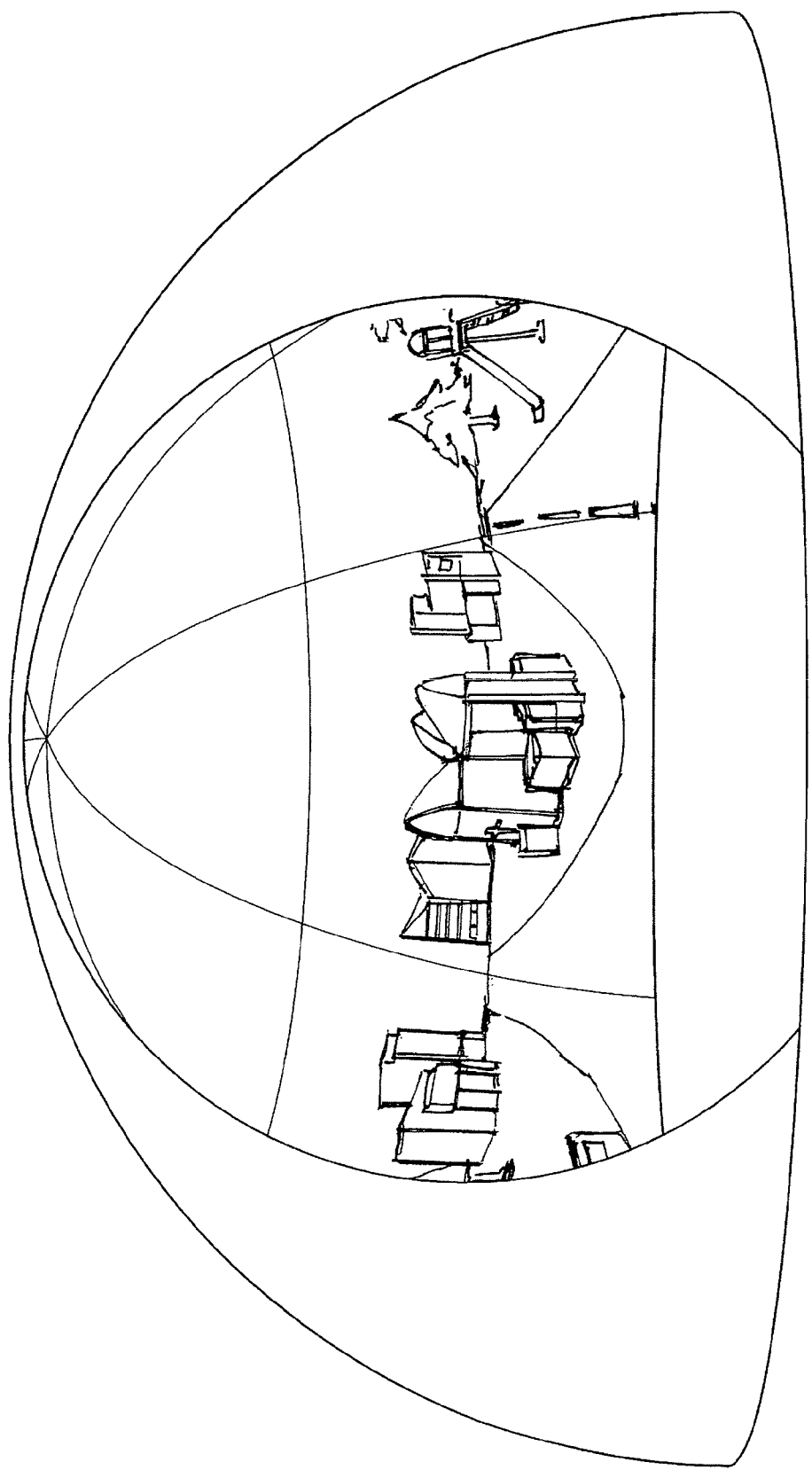
FIG. 3 illustrates a spherical model having background images applied in the row direction on the inner surface.

FIG. 3 illustrates the texture applied to the inner spherical surface, as seen from the center of the spherical model. More specifically, FIG. 3 illustrates the inner surface of the spherical model where a plurality of background images are applied in the row direction. In the background images illustrated in FIG. 3, there is a modern-looking church in the front and a playground slide on the right hand side. Since the background images are applied to the inner surface of the sphere, the background images fully surround the camera when seen from the camera located at the center of the circular cross section. The texture applied to the spherical model varies with the location of the viewpoint that is determined by the latitude, longitude, and altitude on Earth. That it, in response to a user operation for changing the viewpoint, the image rendering device updates the current viewpoint determined by the world's geographic information (latitude, longitude, altitude, and so on), downloads a panoramic image matching the updated current viewpoint, and applies the panoramic image to the spherical model to carry out re-rendering.

Figure 4A:
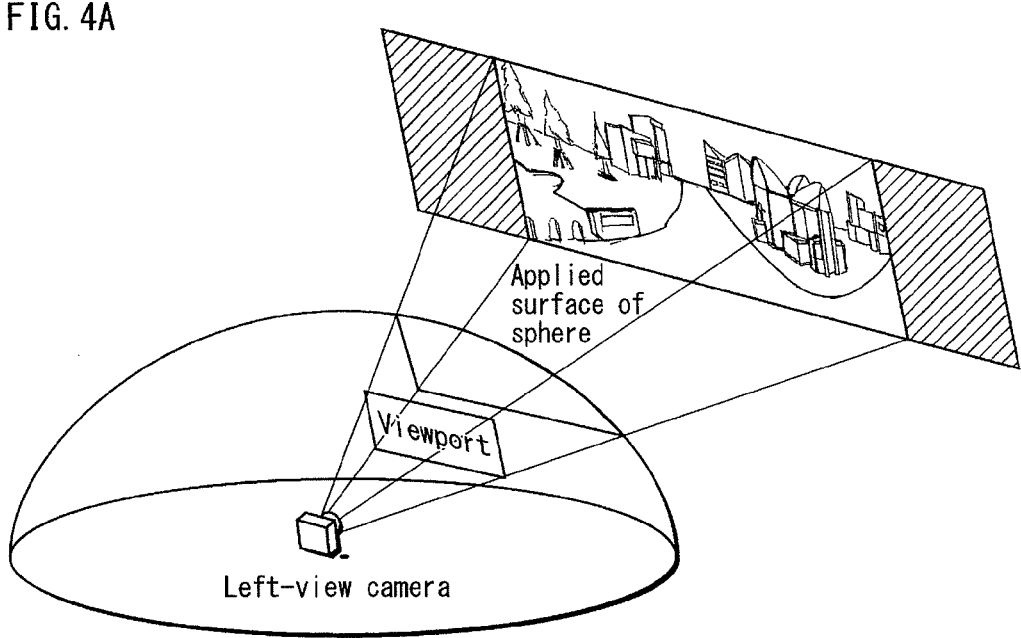
FIGS. 4A and 4B illustrate two spherical models created in a three-dimensional modeling space at the time of executing stereoscopic playback.
Figure 4B:
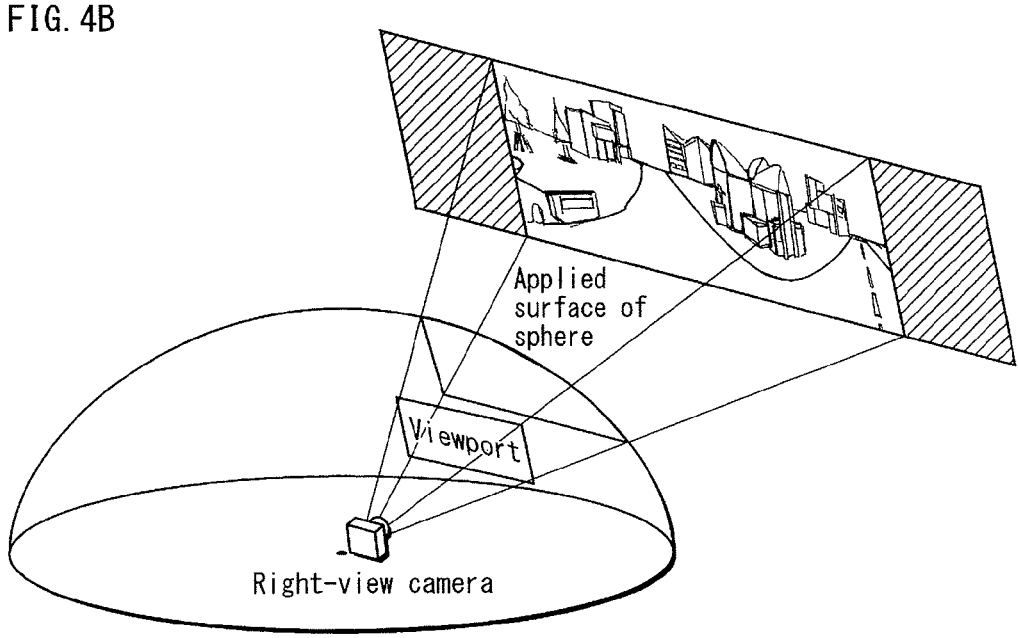

Note that the camera position at the center of the spherical model illustrated in FIG. 2 is for planar viewing and different from the camera position for stereoscopic viewing. For stereoscopic viewing, the camera position is shifted by the distance p from the center of the spherical model, which results in two spherical models in total. FIGS. 4A and 4B illustrate two spherical models created in the three-dimensional modeling space at the time of executing stereoscopic playback. FIG. 4A illustrates a spherical model for left-view. A left-view image generated by DIBR on a combined image constructed of seven background images aligned in the row direction is applied to the inner surface of the spherical model.

FIG. 4B illustrates a right-view image generated for the image illustrated in FIG. 4A, by depth based image rendering using the associated depth image as the base. The right-view image thus generated by performing depth image based rendering of an image constructed of seven background images in the row direction is placed onto the inner surface of the spherical model.

Figure 5A:
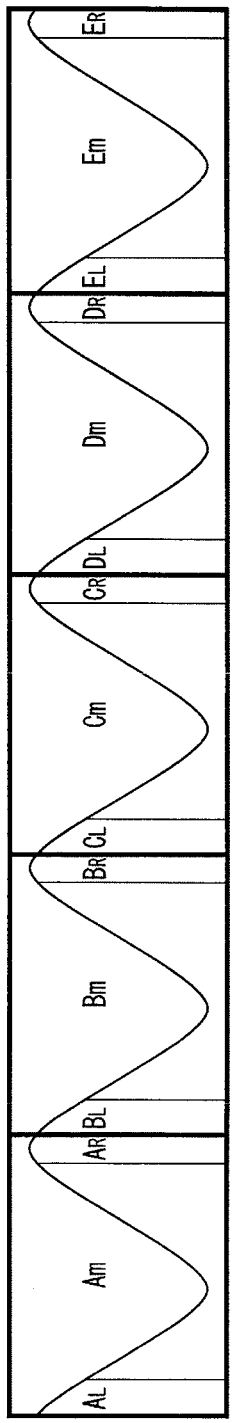
FIGS. 5A-5C illustrate the processes for generating multi-viewpoint images from background images applied to the inner surface of a sphere.
Figure 5B:
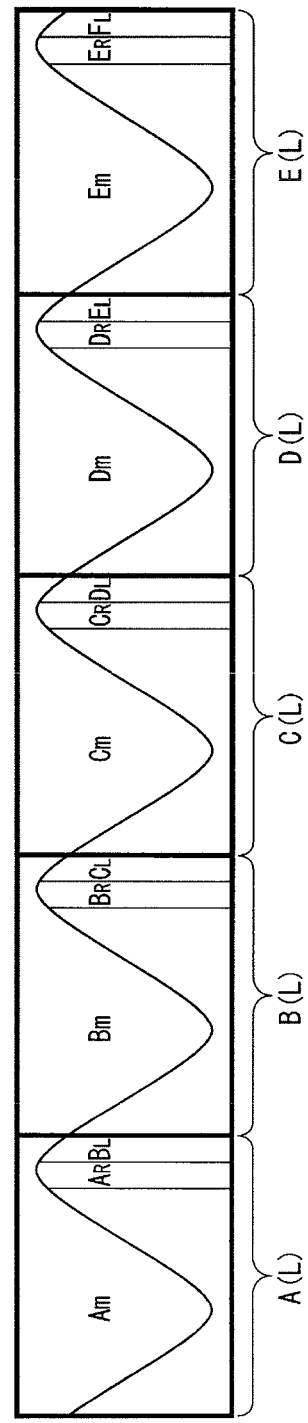
Figure 5C:
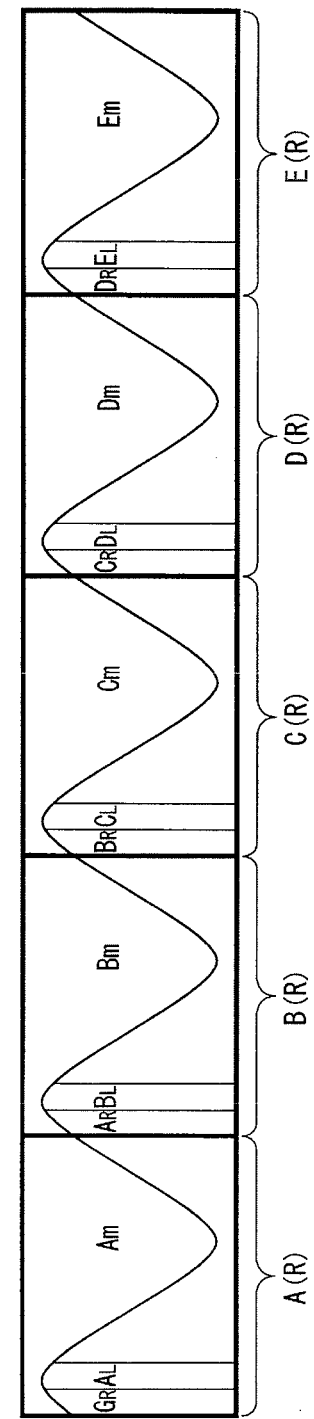

Here, images A, B, C, D, E, F, and G denote the seven images arranged in the row direction to constitute a panoramic image. The following describes how right- and left-view textures are generated from the images A-G. FIGS. 5A-5C illustrate the processes for generating multiple viewpoint images from the background images placed onto the inner surface of the sphere. FIG. 5A illustrates an example in which five of the seven background images constructing the panoramic image are placed onto seven divided regions of the spherical internal surface. To be more precise, the background images A, B, C, D, and E are sequentially applied in the order of A→B→C→D→E. The following is a description of the images A, B, C, D, and E illustrated in FIG. 5A. In the image A, each of AL, AM and AR denotes a group of pixels which undergo coordinate change as a result of shift by DIBR. In the image B, each of BL, BM, and BR denotes a group of pixels which undergo coordinate change as a result of shift by DIBR. In the image C, each of CL, CM, and CR denotes a group of pixels which undergo coordinate change as a result of shift by DIBR. In the image D, each of DL, DM, and DR denotes a group of pixels which undergo coordinate change as a result of shift by DIBR. In the image E, each of EL, EM, and ER denotes a group of pixels which undergo coordinate change as a result of shift by DIBR. The groups of pixels in each image together define "V" shapes.

To create a left-view texture, the images A-E are stitched together and then DIBR is performed. As a result, the pixels located at the left edge of each image fall outside the display region. Thus, the pixel groups BL, CL, DL, EL, and FL illustrated in FIG. 5A are added to the right edge of a neighboring image, which is a corresponding one of the images A, B, C, D, and E. FIG. 5B illustrates the result. As illustrated in FIG. 5B, the left-view texture is composed of an image A(L) containing the pixel groups AM, AR, and BL, an image B(L) containing the pixel groups BM, BR, and CL, an image C(L) containing the pixel groups CM, CR, and DL, an image D(L) containing the pixel groups DM, DR, and EL, and an image E(L) containing the pixel groups EM, ER, and FL. For the purpose of convenience in the description, FIG. 5 do not include any figures illustrating the images F and G. Yet, the images F and G are also processed in the same manner.

To create a right-view texture, the images A-E are stitched together and then DIBR is performed. As a result of the image stitching, the pixels located at the right edge of each image fall outside the display region. Thus, the pixel groups GR, AR, BR, CR, DR illustrated in FIG. 5A are added to the left edge of a neighboring image, which is a corresponding one of the images A, B, C, D, and E. FIG. 5C illustrates the result. As illustrated in FIG. 5C, the right-view texture is composed of an image A(R) containing the pixel groups GR, AL, and Am, an image B(R) containing the pixel groups AR, BL, and Bm, an image C(R) containing the pixel groups BR, CL, and Cm, an image D(R) containing the pixel groups CR, DL, and Dm, and an image E(R) containing the pixel groups DR EL, and Em.

FIG. 6A illustrates the texture placed onto the inner spherical surface, when the image after the left-shift as illustrated in FIG. 5B is used. FIG. 6B illustrates the texture placed onto the inner spherical surface, when the image after the right-shift as illustrated in FIG. 5C is used.

Figure 7A:
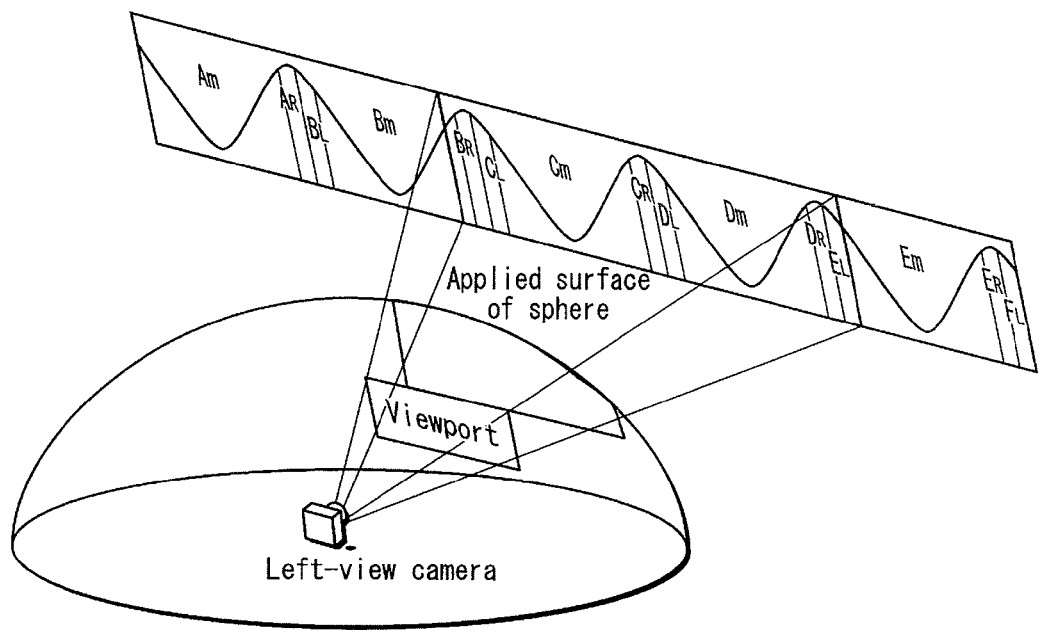
FIGS. 7A and 7B illustrate the left- and right-view texture arrangements, respectively.
Figure 7B:
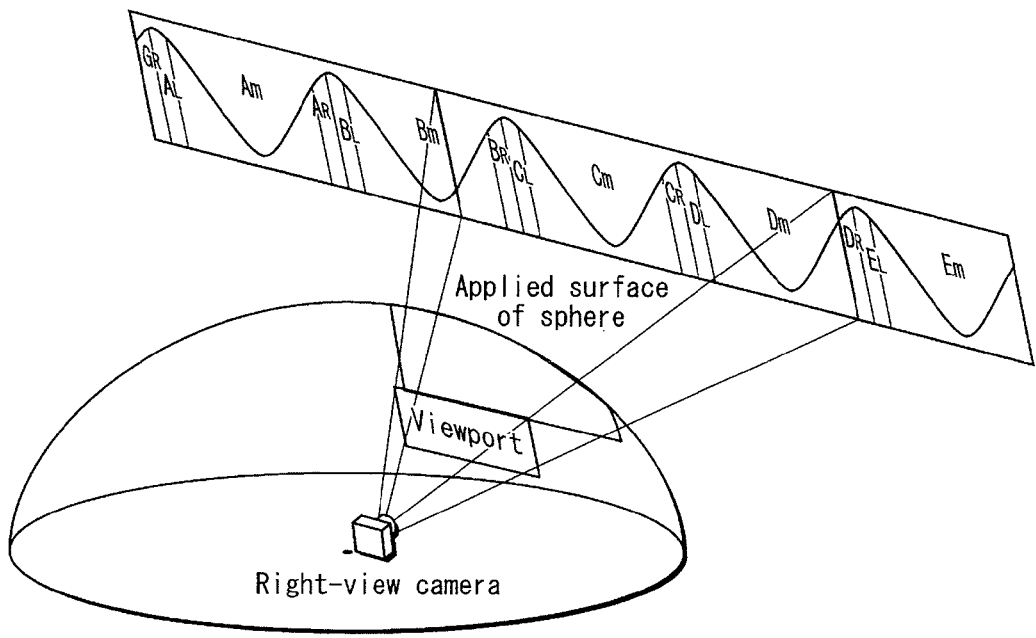

FIG. 7A illustrates the relation between the viewport and the left-view texture or the right-view texture in the three-dimensional modeling space illustrated in FIG. 1. FIG. 7A illustrates the arrangement of the left-view texture. In the figure, the left-view texture is located at a position corresponding to the view vector of the left-view camera and applied to the inner surface of the spherical model. As a result, a portion corresponding to the viewport is used for display. FIG. 7B illustrates the arrangement of the right-view texture. In the figure, the right-view texture is located at a position corresponding to the view vector of the right-view camera and applied to the inner surface of the spherical model. As a result, a portion corresponding to the viewport is used for display.

Figure 8B:
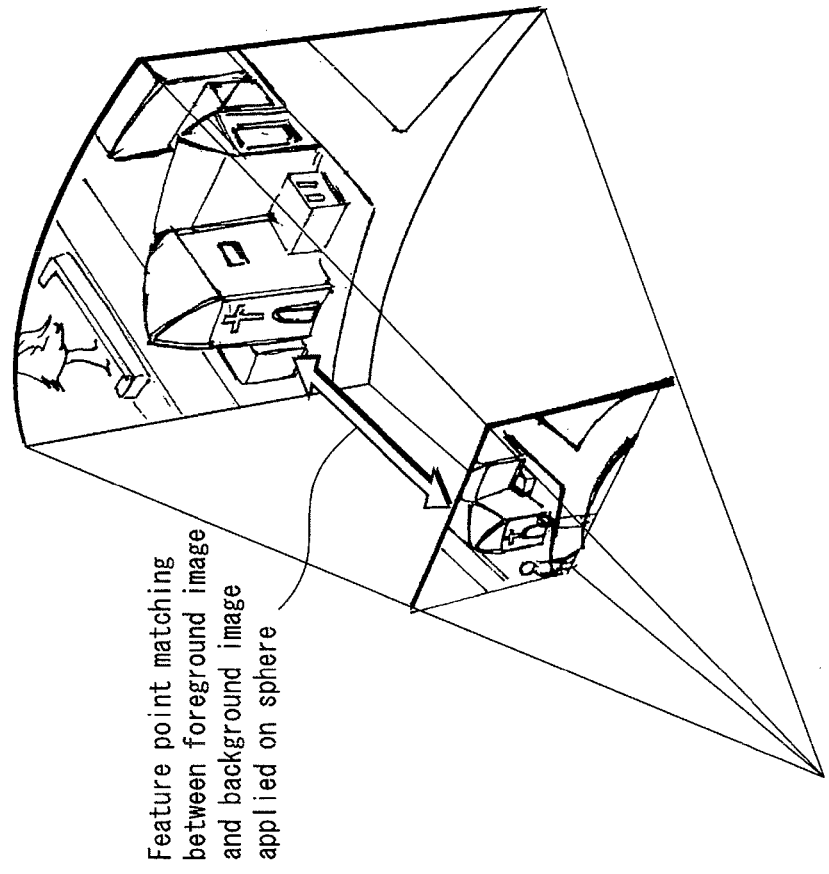
FIGS. 8A and 8B illustrate compositing of a foreground image and a background image.
Figure 8A:
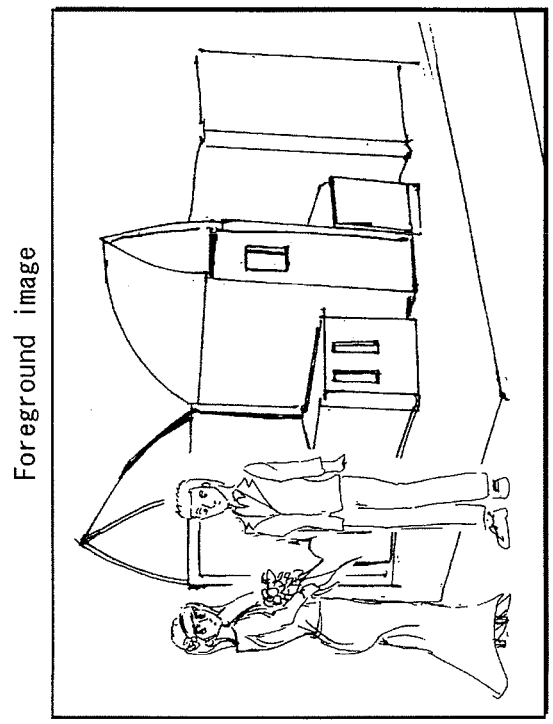

FIGS. 8A and 8B illustrate the composition of a foreground image and a background image. FIG. 8A illustrates the foreground image subjected to the image composition. The foreground image is a snapshot of a bride and groom standing face to face in front of a modern-looking church. Since the modern-looking church is also appears in the background image, the shape defined by the outline of the church is a common feature in both the foreground image and the background image. FIG. 8B illustrates the matching between the foreground image and the background image. By the process of matching, a transformation matrix representing the relation between the background image and the foreground image is obtained. According to the resulting matrix, the depth image for the foreground image is converted prior to DIBR. This ensures that the foreground image is merged into the background image without causing depth disparities.

Figure 9:
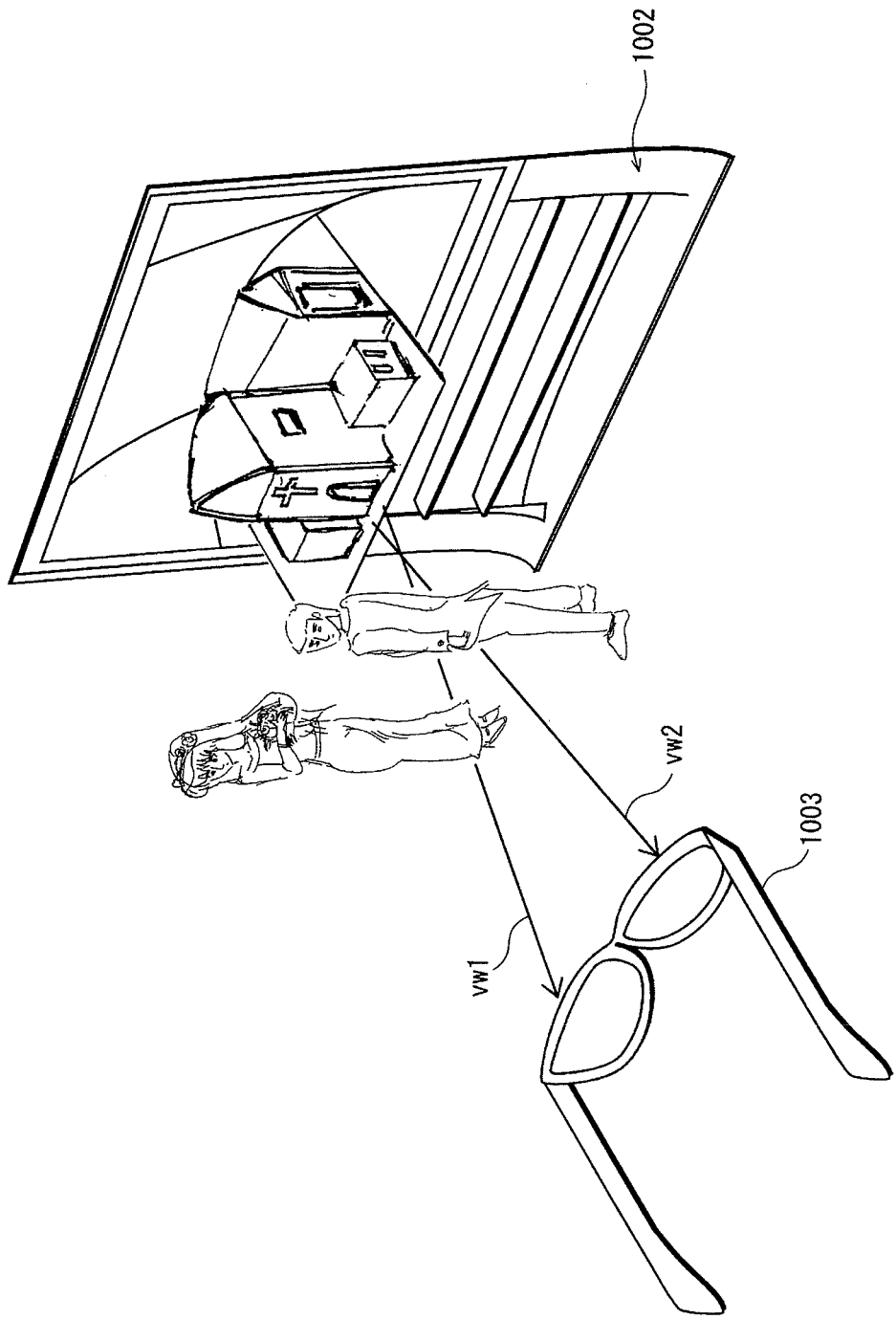
FIG. 9 illustrates one example of a past-experience image.

The image composition illustrated in FIGS. 8A and 8B allows the user to enjoy past experience simulation. FIG. 9 illustrates an example of image composition. A line-of-sight vw1 indicates an image perceived by the user when the eyeglasses 1003 block the right-eye's view. A line-of-sight vw2 indicates an image perceived by the user when the eyeglasses 1003 block the left-eye's view. A left-view image is viewed along the line-of-sight vw1. On the other hand, a right-view image is viewed along the line-of-sight vw2. By wearing the eyeglasses 1003, the user views right-view images and left-view images alternately one by one, so that stereoscopic images are perceived. The image illustrated in FIG. 9 is a stereoscopic image perceived as a result of compositing the foreground image and the background image obtained on the viewports by following the transformation matrix. Since the image of the people appears with the plurality of background images that are appropriately placed onto the inner spherical surface, rich and realistic stereoscopic images are perceived. As described above, if a panoramic image of a global location matching that of a photograph is obtained from a server, the photograph is ensured to be composited with a panoramic image appropriately matching the photograph.

Figure 10:
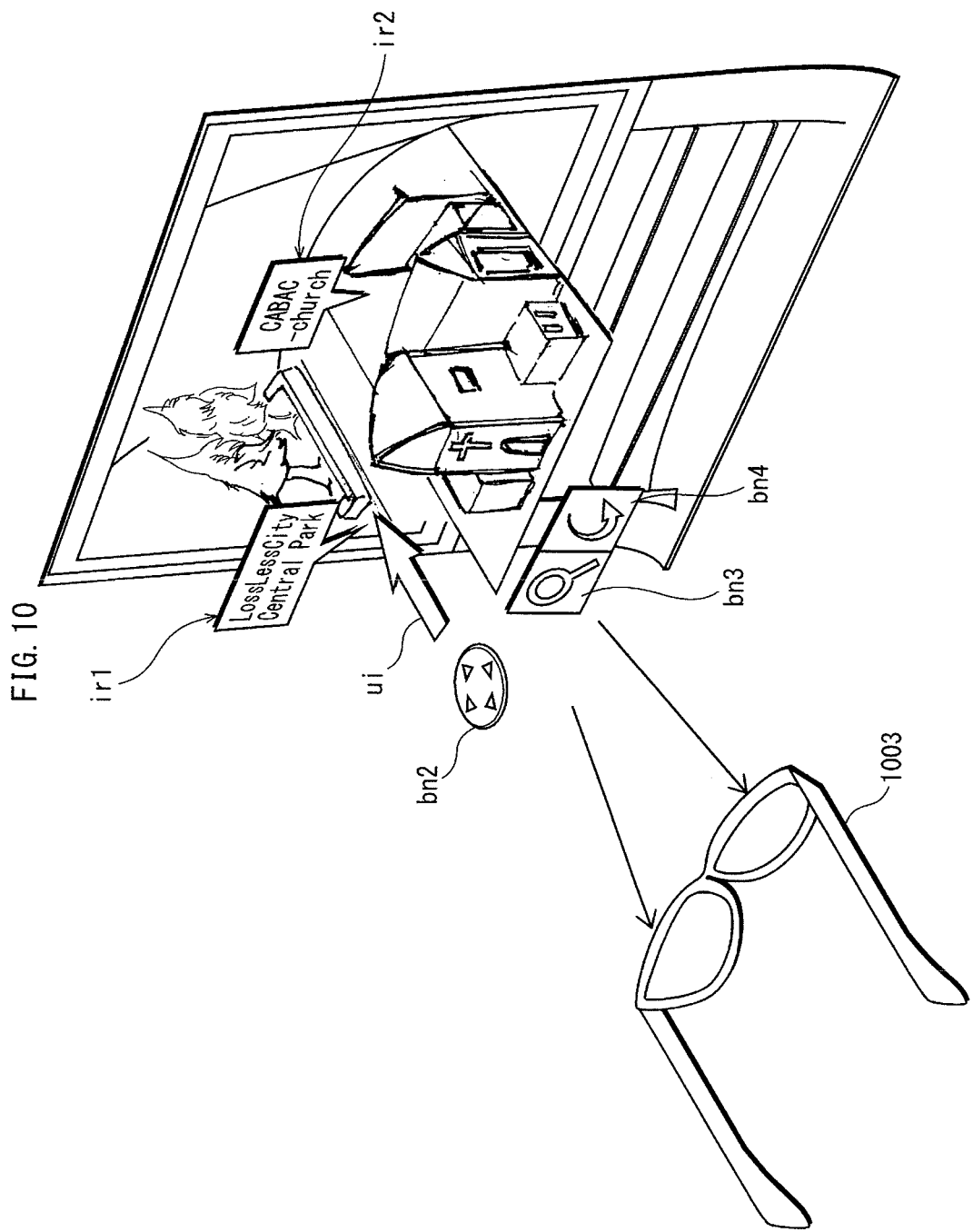
FIG. 10 illustrates one example of a street view navigation screen.

In addition, an UI object may be composited with a street view. FIG. 10 illustrates a street view presented with UI objects. A directional navigator ui is a visual representation of the current line-of-sight direction. Indicators ir1 and ir2 shows the place name (such as, loss-Less City central park) and the building name (such as CABAC church) associated with the location of the current viewpoint. A cross button bn2 is for receiving a user operation of selecting a direction in which the current viewpoint is to be moved. A zoom-up button bn3 is used to receive a user operation of selecting a zoom up or down, without changing the viewpoint and the line-of-sight direction. An angle button bn4 is for receiving a user operation of turning the current direction of the line-of-sight to the right or left. These GUI elements are allocated to keys of a remote control, so that user operations on the remote control enables control on street views, such as moving or rotating the street views. This concludes the description of the global view search service.

(Embodiment 1)

Embodiment 1 is directed to an improvement on a technique for suitably handing, at the time of applying pixel shifting to the individual background images constructing a joint background image, "out-of-region pixels" resulting from the pixel shifting.

Figure 11:
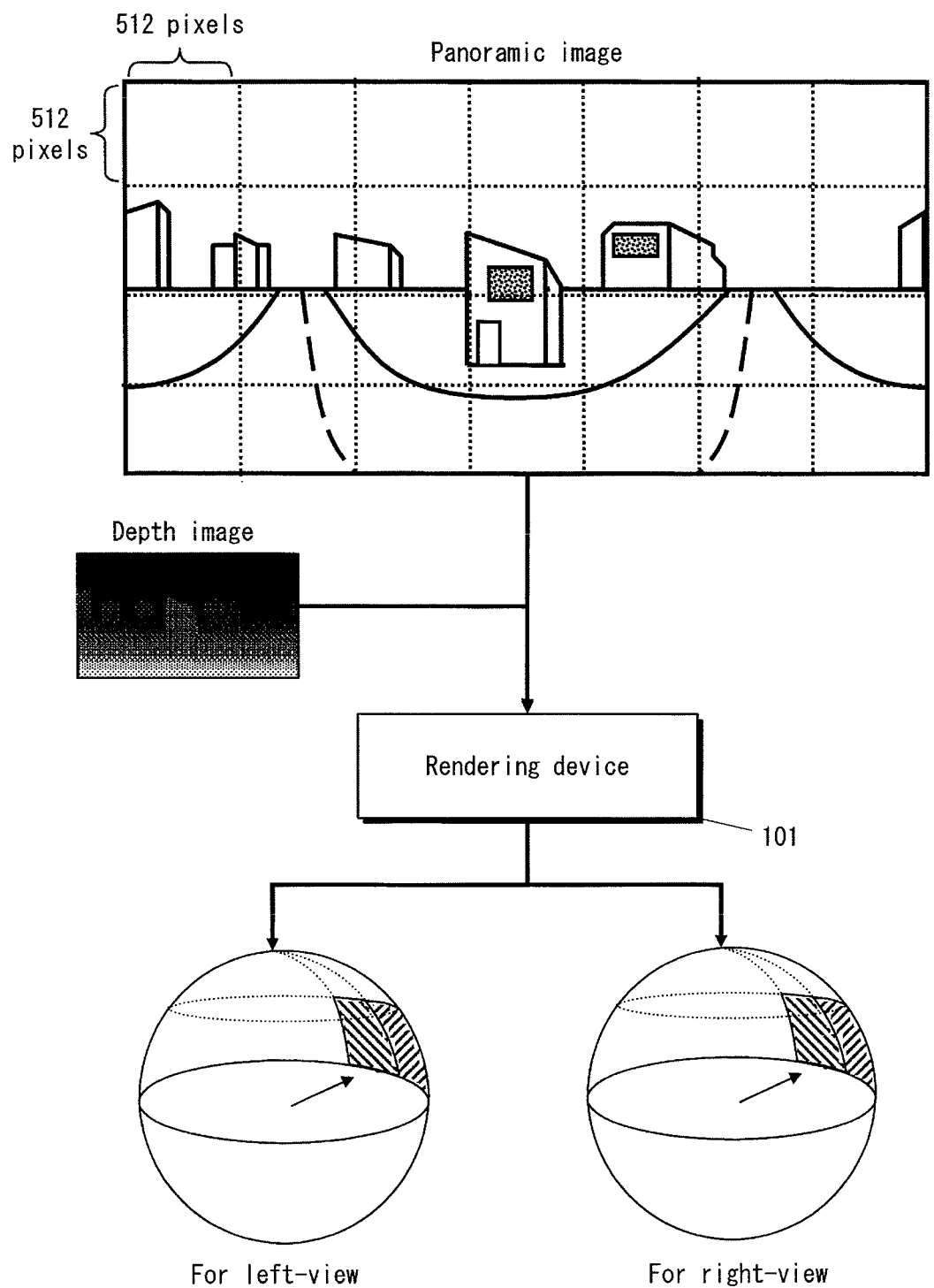
FIG. 11 illustrates one example of input and output of a rendering device according to Embodiment 1.

FIG. 11 illustrates one example of input and output of an image rendering device according to Embodiment 1. A rendering device 101 receives, as input, a panoramic image and a depth image (depth map) associated with the panoramic image and outputs a left-view image and a right-view image. The left- and right-view images are sequentially output and rendered in synchronization on a screen in a stereoscopic compatible display so that a viewer is made to perceive stereoscopic images.

A panoramic image seen from one location is constructed of four partial images high (i.e., the column direction) by seven partial images wide (i.e., the row direction), for a total of 28 partial images. One partial image is 512 pixels high by 512 pixels wide. The depth image (depth map) indicates the depth of each pixel in a three-dimensional space. A pixel in a darker color indicates a depth to an object surface located further back in the a three-dimensional space, whereas a pixel in a blighter color indicates a depth to an object surface located closer toward the front.

The rendering device uses a depth image to generate a right-view image and a left-view image from each partial image. That is, as many right-view images and left-view images as the input partial image are generated (28 right-view images and 28 right-view images). The generated right- and left-view images are each applied to a spherical surface. A stereoscopic image of a full panoramic view is displayed by outputting on the screen, in synchronization, a left view and a right view of the region as viewed from the center of the sphere towards the surface of the sphere in a 3D modeling space.

Figure 12:
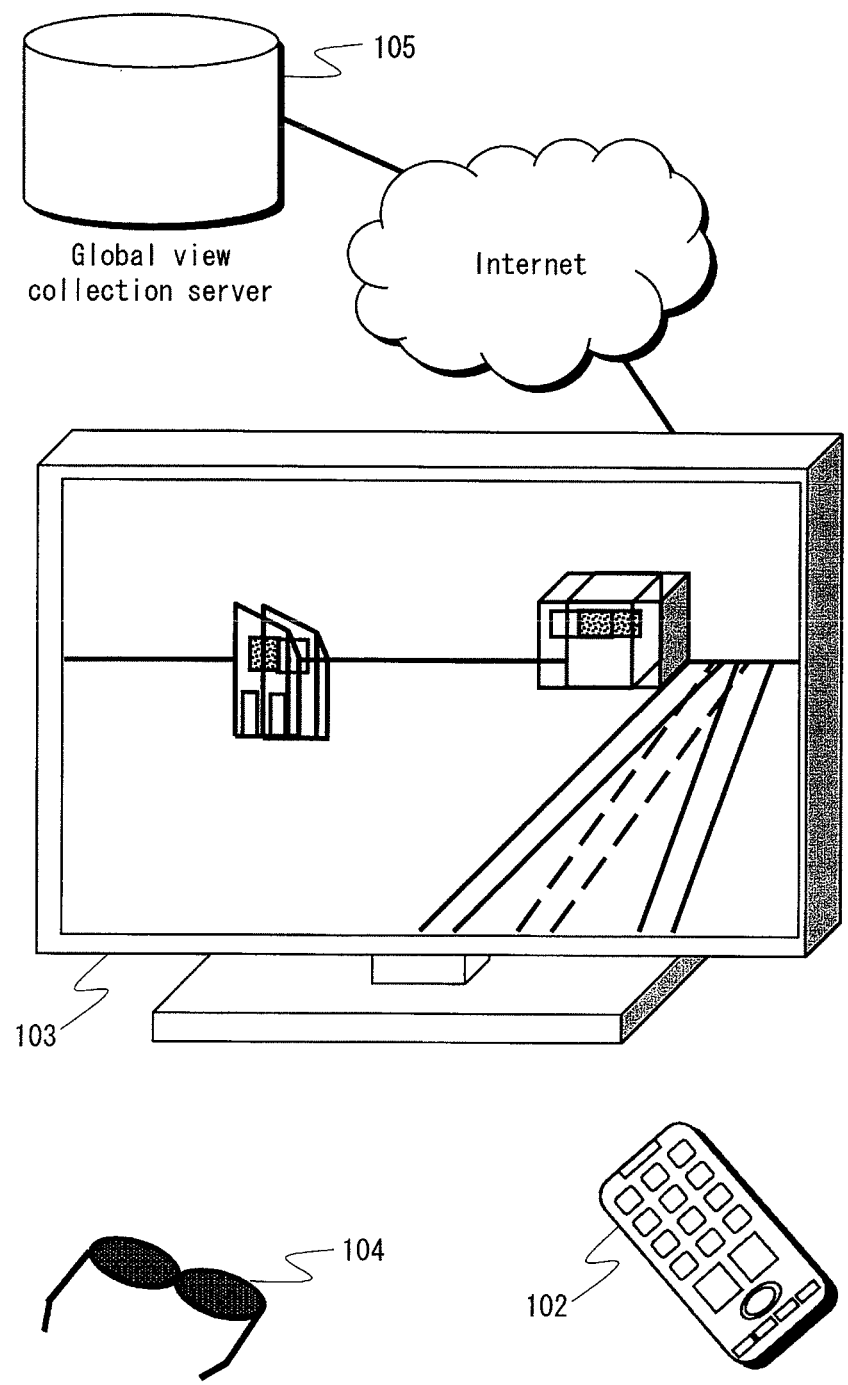
FIG. 12 illustrates an example of usage of the image rendering device.

FIG. 12 illustrates an example of usage of the image rendering device. A user can view a panoramic image stereoscopically from any position or angle by designating the desired viewing location and angle using a remote control 102 and by viewing the images output on a stereoscopic compatible display 103 through liquid crystal shutter glasses 104.

The stereoscopic compatible display 103 is either connected to the rendering device 101 or has the functions of the rendering device 101 embedded therein. In the example of usage illustrated in FIG. 12, the stereoscopic compatible display 103 has the functions of the rendering device 101 embedded therein, and the stereoscopic compatible display 103 is connected to a server 105 over the Internet. The stereoscopic compatible display 103 downloads a panoramic image and a depth image corresponding to the user designated location, generates a right-view image and a left-view image, and displays the right-view image and the left-view in synchronization on a screen.

Figure 13:
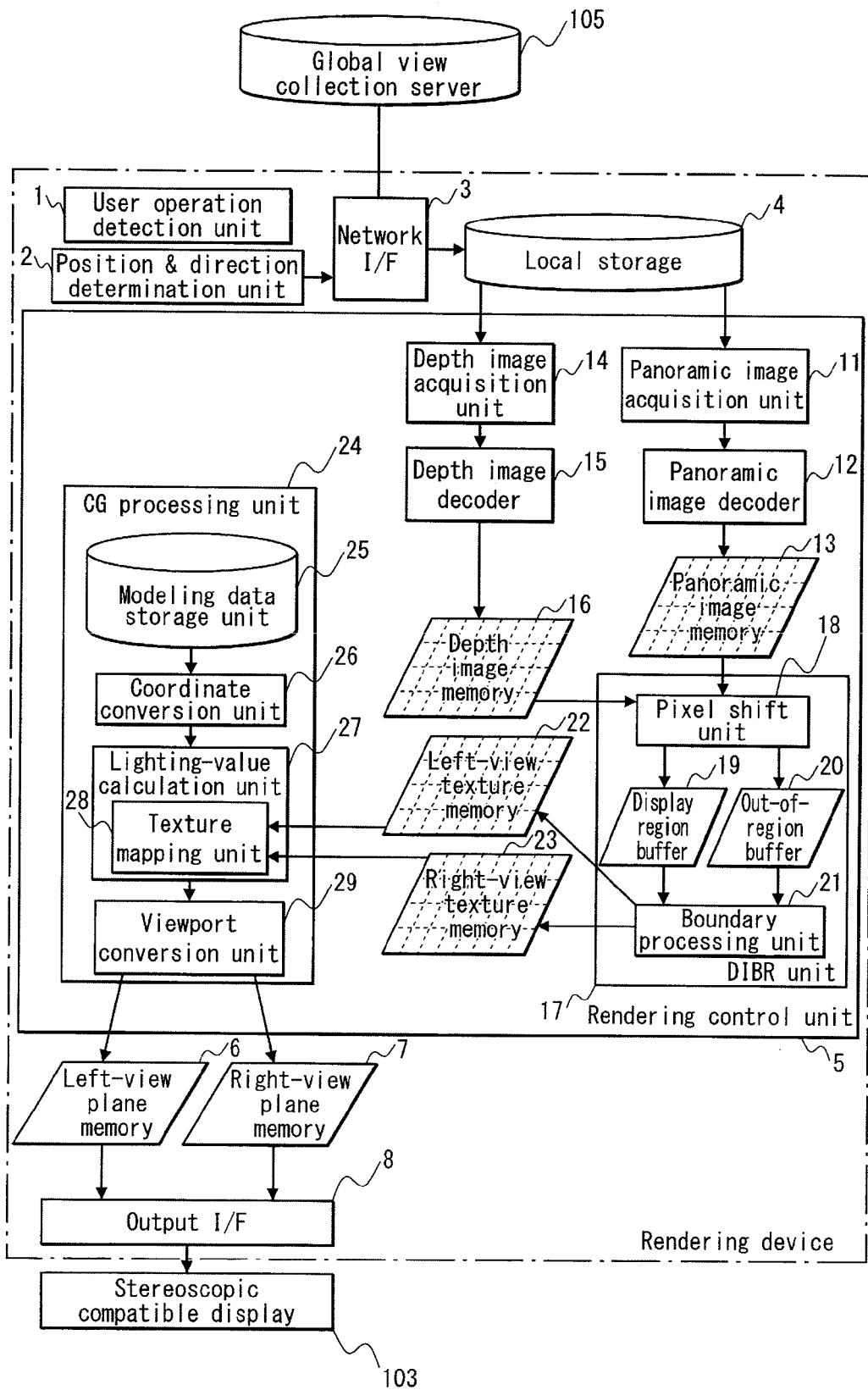
FIG. 13 is a functional block diagram of the image rendering device.

FIG. 13 is a functional block diagram of the image rendering device. As illustrated in FIG. 13, the rendering device 101 includes a user operation detection unit 1, a position and direction determination unit 2, a network interface 3, a local storage 4, a rendering control unit 5, a left-view plane memory 6, a right-view plane memory 7, and an output interface 8.

(User Operation Detection Unit 1)

The user operation detection unit 1 detects user operation of the remote control, a keyboard, a mouse, or the like and transmits a corresponding operation code (a code indicating the user operation such as pressing of an arrow key, a right click, or the like) to the position and direction determination unit 2.

(Position and Direction Determination Unit 2)

The position and direction determination unit 2 determines, based on the received operation code, which position on the map of the panoramic image and which view direction of the image are to be displayed. The position on the map is denoted as the current viewpoint and specified by geographic information that includes the latitude and longitude. In addition, the view direction is denoted as the current view direction and specified by a horizontal angle and a vertical angle. The horizontal angle is represented in a range from 0° to 360°, measured clockwise with north as 0°. The vertical angle is represented in a range from −90° to 90°, with the horizon as 0°, directly above as −90°, and directly below as 90°. The position and direction determination unit 2 specifies the latitude, longitude, horizontal angle, and vertical angle based on the received operation code and transmits the specified values to the rendering control unit 5.

(Network Interface 3)

The network interface 3 has a request sender and a response receiver. The request sender transmits an image acquisition request specifying, as the current viewpoint, a global location to the global view collection server 1001. Note that the request sender generates such an image acquisition request at the time when a user operation on the map image is made and transmits the image acquisition request to the global view collection server 1001. When generating the image acquisition request specifying the current viewpoint, the request sender uses the geographic information corresponding to the user specified location. The response receiver receives a stereoscopic street view viewpoint file (hereinafter "stereoscopic SV viewpoint file") that is transmitted from the global view collection server 1001 in response to the image acquisition request. The stereoscopic SV viewpoint file transmitted from the global view collection server 1001 has location attributes matching geographic information included in the image acquisition request.

The street view file thus downloaded contains a panoramic image and a depth image. The street view file is temporality stored in the local storage 4 of the stereoscopic image rendering device. When the panoramic image and the depth image need to be displayed immediately, the panoramic image downloaded to the memory of the device is passed to the image acquisition unit without being stored into the local storage 4.

(Local Storage 4)

The local storage 4 is a recording medium attached to the rendering device, such as a hard disk drive (HDD), USB memory, SD memory card, or the like. The local storage 4 is used for purposes of, for example, caching the street view file downloaded from the server, using, on the rendering device, a street view file created on an external device other than the server. To facilitate better understanding of the local storage 4, the following describes a street view file, which is the stored content of the local storage 4. A street view file is for reproducing views from a viewpoint at a desired global location and stores: a compressed Mercator image of a full panoramic view; a compressed Mercator depth image associated with the Mercator image; the time and date of the image capturing; and the data size, along with the location attributes associated with the viewpoint. In this example, the location attributes include the latitude, longitude, altitude, direction, and inclination angle. A street view file has a common data structure with a stereoscopic photograph file. Therefore, a street view file optimally matching a given viewpoint is retrieved quickly, by searching street view files stored in the database for a street view file having the location attributes matching the latitude, longitude, and altitude of the given photograph. In this way, a street view file as desired by the user is promptly retrieved. This concludes the description of the local storage 4.

(Rendering Control Unit 5)

Based on the position on the map indicated by the position and direction determination unit 2 and also on the panoramic image and depth image acquired from the network interface 3 or from the local storage 4, the rendering control unit 5: generates two panoramic images, one for right-view and the other for left-view, to be applied on a spherical surface in the 3D modeling space; extracts viewport images to be displayed as images viewed from the center of the sphere in the view direction indicated by the position and direction determination unit 2; and outputs the left-view viewport to the left-view plane memory 6 and the right-view viewport image to the right-view plane memory 7.

(Left-View Plane Memory 6)

The left-view plane memory 6 is for storing one image to be presented to the left eye for realizing stereoscopic display.

(Right-View Plane Memory 7)

The right-view plane memory 7 is for storing one image to be presented to the right eye for realizing stereoscopic display.

(Output Interface 8)

The output interface 8 outputs, in synchronization, images stored in the left-view plane memory 6 and the right-view plane memory 7 frame by frame to the stereoscopic compatible display 103. Specifically, images are read alternately from the left and right plane memories at 120 Hz, and left and right images are transmitted to the display at 60 frames per second. The user viewing the images wears the liquid crystal shutter glasses 104, which repeatedly and alternately open and close at 120 Hz. The user thus sees 60 frames per second of the left view in the left eye and 60 frames per second of the right view in the right eye, thereby perceiving depth due to the parallax between the left and right images.

This concludes the description of the basic configuration of the image rendering device. Next, the internal configuration of the rendering control unit 5 is described. The rendering control unit 5 additionally includes a panoramic image acquisition unit 11, a panoramic image decoder 12, a panoramic image memory 13, a depth image acquisition unit 14, a depth image decoder 15, a depth image memory 16, a DIBR unit 17 (a pixel shift unit 18, a display region buffer 19, an out-of-region buffer 20, and a boundary processing unit 21), a left-view texture buffer 22, a right-view texture buffer 23, and a CG processing unit 24 (a modeling data storage unit 25, a vertex conversion unit 26, a lighting-value calculation unit 27, a texture mapping unit 28, and a viewport conversion unit 29).

(Panoramic Image Acquisition Unit 11)

Figure 15:
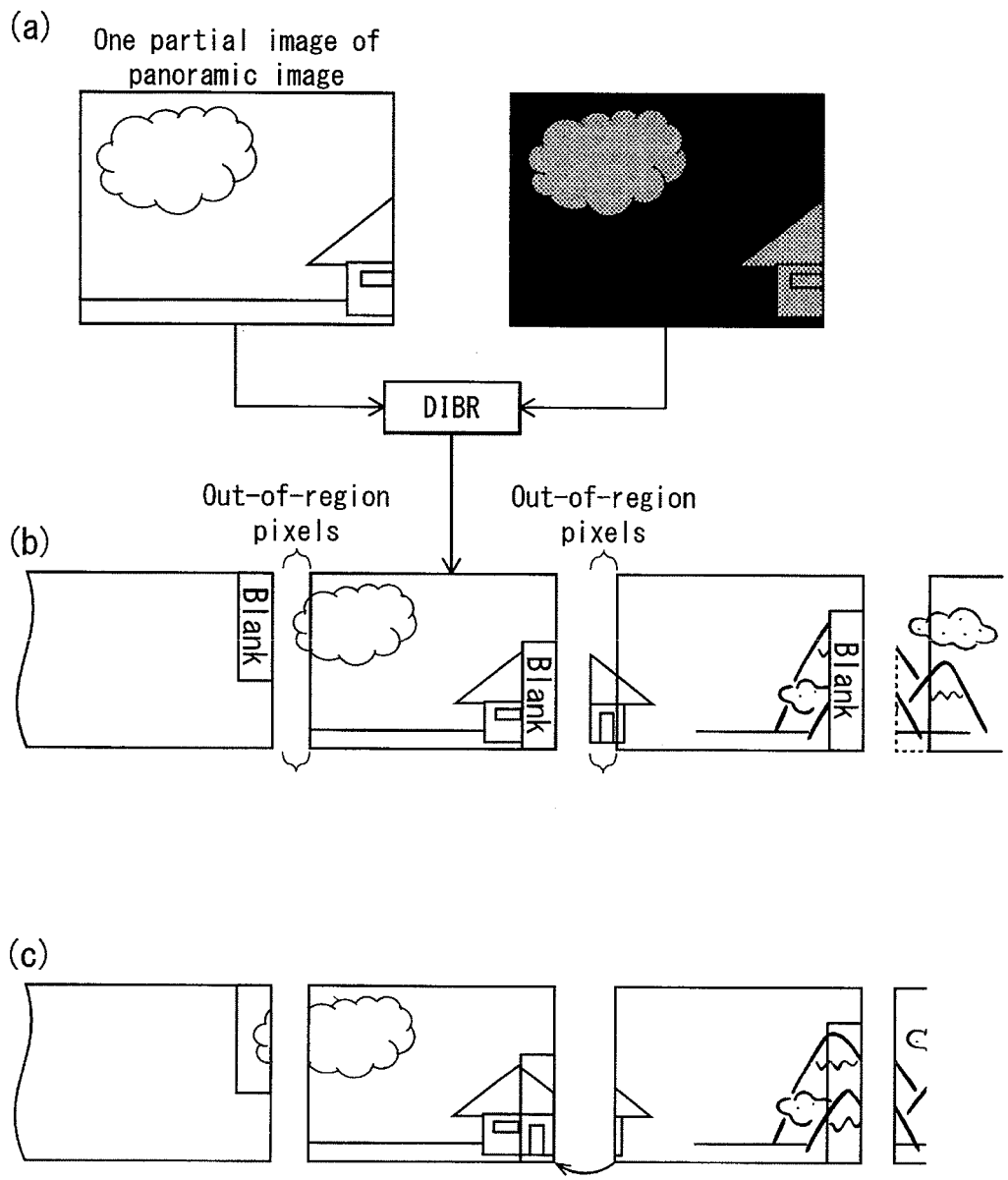
FIG. 15 illustrates the process of generating an image seen from another viewpoint, by shifting pixels of a panoramic image based on the associated depth image.

The panoramic image acquisition unit 11 acquires, either by downloading from the server 105 over the network interface 3, or from the local storage 4, the panoramic image corresponding to the position (specified as a latitude and a longitude) on the map indicated by the position and direction determination unit 2. A panoramic image as seen from one location is constructed of 28 partial images in total, which are four partial images in the vertical direction and seven partial images in the row direction. Each partial image is 512 pixels high by 512 pixels wide. FIG. 15(*a*) illustrates an example panoramic image.

(Panoramic Image Decoder 12)

The panoramic image decoder 12 is a JPEG decoder for developing a compressed Mercator image 802 and storing resulting uncompressed data to the panoramic image memory 19.

(Panoramic Image Memory 13)

The panoramic image memory 13 stores a Mercator image developed by the panoramic image decoder 12.

(Depth Image Acquisition Unit 14)

The depth image acquisition unit 14 acquires, from the street view file stored in the local storage 4, the depth image associated with the panoramic image acquired by the panoramic image acquisition unit 11.

(Depth Image Decoder 15)

The depth image decoder 15 is a PNG decoder. The depth image decoder 15 develops a compressed Mercator depth stored in a stereoscopic street viewpoint and stores the resulting uncompressed data to the depth image memory 16.

(Depth Image Memory 16)

The depth image memory 16 is for storing a depth image generated by the depth image decoder 15. The depth image shows the depth of each pixel in a three-dimensional space, representing the depth of each pixel by an eight-bit intensity value. An intensity value of zero (black) indicates that the corresponding pixel is the farthest away, and an intensity value of 255 (white) indicates that the corresponding pixel is closest. That is, while a panoramic image appears as a color image, a depth image is recognized as a grayscale image expressed only in terms of luminance. Similarly to a panoramic image, a grayscale image being a depth image for one location is constructed of a total of 28 partial images (i.e., 4 partial images in the vertical direction and 7 partial images in the row direction) and each partial image is 512 pixels high by 512 pixels wide (where each pixel only holds a 8-bit intensity value).

FIG. 14A illustrates an example of a panoramic image acquired from the network interface 3 or the local storage 4, and FIG. 14B illustrates an example of a depth image associated with the panoramic image. Eight-bit (256-level) depth information is allocated to each pixel in a panoramic image. A depth value of zero indicates a position furthest back in the 3D space, whereas a depth value of 255 indicates a position closest to the viewer in the 3D space. These depth values are assigned as eight-bit intensity values. A depth image is thus represented as a grey-scale image (depth map) as shown in FIG. 14.

Each pixel in the depth image represents the depth value of a corresponding pixel in the base panoramic image. For example, if a pixel at the coordinates X=100, Y=100 on the depth map image has an intensity of 50, the depth value of the pixel P at coordinates X=100, Y=100 in the corresponding panoramic image is 50. If a pixel at the coordinates X=200, Y=200 on the depth map image has an intensity of 100, the depth value of the pixel Q at coordinates X=200, Y=200 in the corresponding panoramic image is 100.

Therefore, since the depth value of points P (X=100, Y=100) and Q (X=200, Y=200) in the panoramic image are respectively 50 and 100, point P is located further back in the 3D space than point Q.

<DIBR Unit 17>

The DIBR unit 17 acquires a base left-view panoramic image and a depth image associated with the base image: the former from the panoramic image acquisition unit 11 and the latter from the depth image acquisition unit 14, and performs DIBR to generate a right-view image. A DIBR (Depth Image Based Rendering or Depth Image Based Representations) refers to a process of shifting pixels of the base image to the right or left with reference to the depth image (depth map) thereby to generate an image seen from another viewpoint. When a left-view image is used as the base panoramic image, pixels shifted to the right in a viewpoint image as seen from another view point (i.e. right-view image) appear farther back in the 3D space. Conversely, pixels shifted to the left in the viewpoint image appear closer toward the front in the 3D space. These shifts are due to stereoscopy generated by a difference in angle of convergence between the viewer's eyes. By shifting the pixels in the right-view image to the left with respect to the base left-view image, the angle of convergence decreases, yielding a so-called cross-eyed image. The object represented by these pixels is thus perceived as being positioned closer. Conversely, by shifting the pixels in the right-view image to the right with respect to the base left-view image, the angle of convergence increases. The object represented by these pixels is thus perceived as being positioned further back. As described above, by shifting pixels of the base left-view image to the right or left according to the depth values of corresponding pixels shown in the depth image, a right-view image making up a stereo pair with the left-view image is generated.

However, the right-view image generated by DIBR is yet incomplete. The pixels that are shifted near the center of the image cause no problem. On the other hand, pixels that are shifted at the edges of the image may end up falling outside the image region, depending on the coordinates of the pixel and the shift amount. Furthermore, shifting pixels at the edges of an image towards the center of the image causes the problem of an absence of pixels in the position before shifting.

These problems are described in detail with reference to FIG. 15. FIG. 15 illustrates the process of generating a viewpoint image seen from another viewpoint, by shifting pixels of a panoramic image based on the associated depth image.

The example shown in FIG. 15 is directed to the simplest pattern in which the standard value with a shift amount of zero is determined as a depth of zero and pixels are shifted to the left at a greater amount as the depth value increases. For the sake of convenience, each increment of one in the depth value corresponds in this example to an increase of one in the shift amount. In other words, a depth value of zero indicates no shift in the pixel, whereas a depth value of 50 indicates that the pixel is shifted 50 pixels to the left.

The image shown at the top left in FIG. 15(a) is a panoramic image constructed of a plurality of background images stitched together. A cloud is shown at the left edge of this image, whereas the right edge shows part of a house that is continued in the adjacent image. The image shown at the top right in FIG. 15(a) is the associated depth image. This depth image shows that the portion of the image corresponding to the background, which represents the sky, is positioned furthest back (depth value of zero), whereas a cloud and a house are positioned closer than the sky. In FIG. 15(a), the depth value of the cloud is assumed to be 50, and the value of the house is assumed to be 100. During DIBR, a standard value with a shift amount of zero is first determined. The shifts are then determined in response to the depth values.

In FIG. 15, the portion corresponding to the sky has a depth value of zero and thus is not shifted. On the other hand, pixels for the cloud are shifted, since the depth value is one or greater for these pixels. As the depth value of the building is 50, the pixels forming the cloud are shifted to the left by 50 pixels. As the depth value of the building is 100, the pixels forming the building are shifted to the left by 100 pixels. FIG. 5(b) shows the results of the pixel shifting applied to the individual pixels of the panoramic image. Since the cloud was originally positioned near the left edge of the image, the cloud protrudes beyond the edge of the image as a result of shifting. Conversely, since the house is positioned at the right edge of the image and overlaps with the adjacent image, part of the house is missing after the left shifting, since the corresponding pixels of the house are located in the adjacent image. It is shown that pixels forming the left edge part of the cloud, the center portion of the house, and the center portion of the mountains are shifted off the edge of the respective images. That is, those pixels are "out-of-region pixels". In view of the above, the DIBR unit 17 is provided with the boundary processing unit 21 to perform processing for complementing the blanks resulting from the pixel shifting. FIG. 15(c) illustrates the result. The blank in each image shown in FIG. 15(b) is overwritten with the out-of-region pixels that fall out of the adjacent image.

(Pixel Shift Unit 18)

The pixel shift unit 18 fetches image data composed of 512 (wide)×512 (high) pixels from the panoramic image memory 13 and also fetches depth data composed of 512 (wide)×512 (high) pixels from the panoramic image depth memory 16. Based on the 512×512-pixel depth data, the pixel shift unit 18 applies shift to the 512×512 pixels. The following describes the parallax settings of each pixel for pixel shifting. Suppose that the depth from a specific viewpoint to a pixel located at the coordinates (x, y) in a depth image is denoted as Depth(x, y), then the conversion from the intensity Y(x, y) to Depth(x, y) of the pixel is made by the following formula, for example.

$$Y(x, y)=255-(\log(\text{Depth}(x, y)+1)\times 100) \quad \text{(Formula)}$$

The thus obtained Depth(x, y) is then converted into the number of pixels denoted as offset(x, y) correspondingly to the screen size of a display, which enables the intensity values of pixels to be converted to appropriate parallax values.

Figure 16:
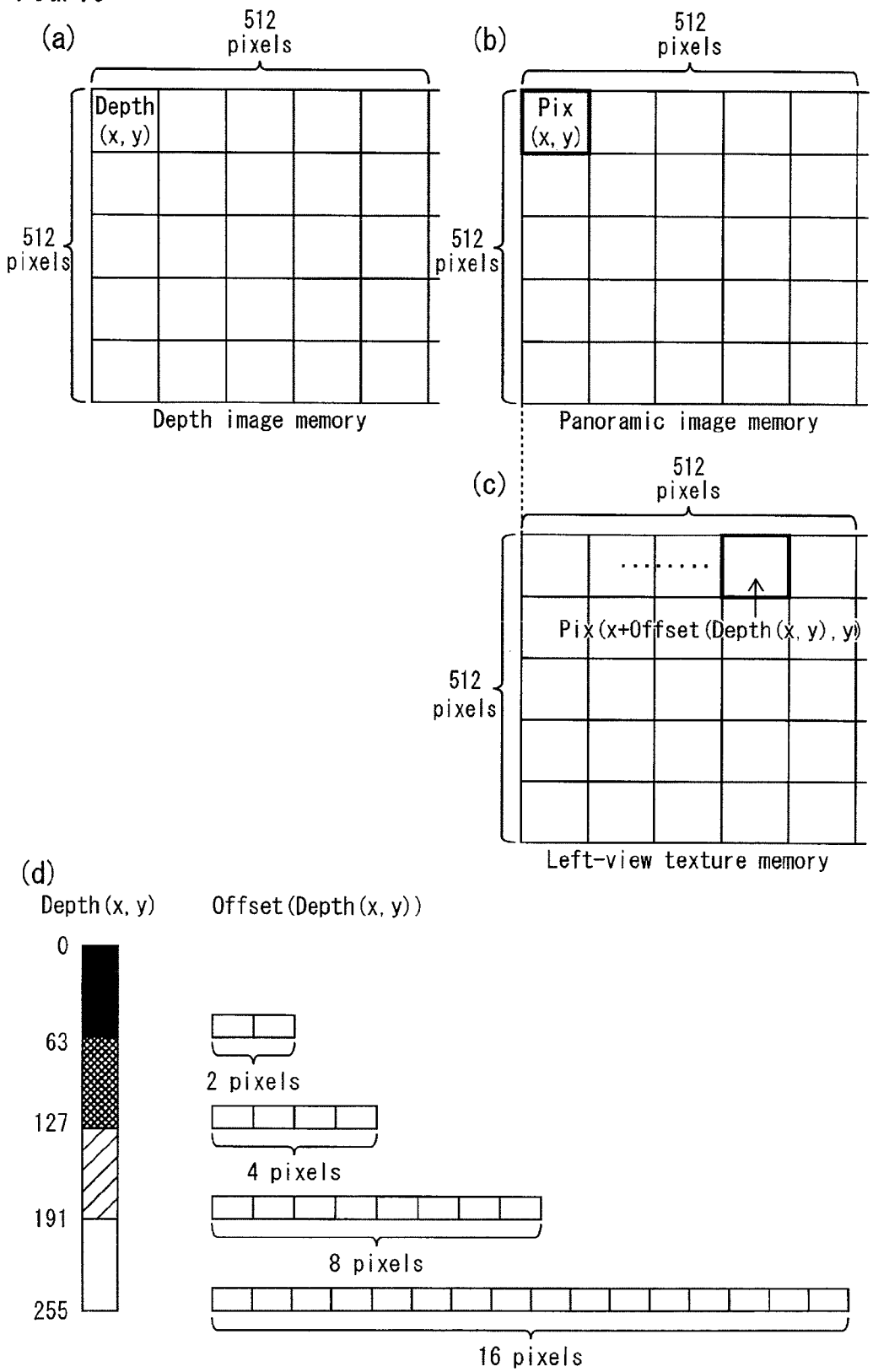
FIG. 16 illustrates a pixel Pix(x, y) located at the coordinates (x, y) in an image, and a pixel depth(x, y) located at the coordinates (x, y) in a depth image.

In the DIBR, an image as seen from another viewpoint is obtained by shifting each pixel of an image subjected to DIBR by an appropriate shift amount in the following manner. That is, to shift a pixel located at given coordinates (x, y), an offset (Depth(x, y), y) is calculated uniquely for the coordinates (x, y) from the Depth(x, y) derived from the intensity Y(x, y) of the pixel located at the coordinate (x, y) in the associated depth image. The thus derived offset (Depth(x, y), y) is used as the shift amount. FIG. 16(a) illustrates the depth Depth(x, y) of the pixel located at the coordinates (x, y) in the depth image. Note that Depth(x, y) corresponds in position to Pix(x, y) illustrated in FIG. 16(b). FIG. 16(b) illustrates a pixel Pix(x, y) located at the coordinates (x, y) in the image memory. FIG. 16(c) illustrates the amount of shift made to the pixel Pix(x, y) for generating a left-view texture. In FIG. 16(c), Pix(x, y) is shifted horizontally in the panoramic image memory 18 by the amount shown by Offset (Depth(x, y)). Therefore, the pixel Pix after the shift is located at the confidantes (x+Offset (Depth(x, y)), Y). Offset(Depth(x, y) denotes an offset that is unique to a pixel at the coordinates x, y in a panoramic image and is set according to Depth(x, y) derived from the intensity value of a corresponding pixel in the depth image.

To prepare images as seen from two or more different viewpoints, the amount of horizontal shift to be made to generate an image as seen from a viewpoint differs for each pixel in the image. The relation between the intensity level of a pixel in a depth image and the number of pixels serving as a corresponding shift amount is given by the formula listed above. In one example of the relation, the settings illustrated in FIG. 16(c) are possible.

FIG. 16(c) illustrates the intensity levels of a pixel Y(x, y) ranging from 0 to 255, each along with a corresponding offset indicated by the number of pixels ranging from 1 to 16. In the figure, the offset range from 0 to 2 pixels is assigned to the intensity range from 0 to 63, the offset range from 3 to 4 pixels is assigned to the intensity range from 64 to 127, the offset range from 5 to 8 pixels is assigned to the intensity range from 128 to 191, and the offset range from 9 to 16 pixels is assigned to the intensity range from 192 to 255. That is, non-linear correspondence is established such that the intensity range corresponding to brighter pixels are assigned with a larger parallax, and the indentify level range corresponding to darker pixels are assigned with a smaller parallax.

Figure 17:
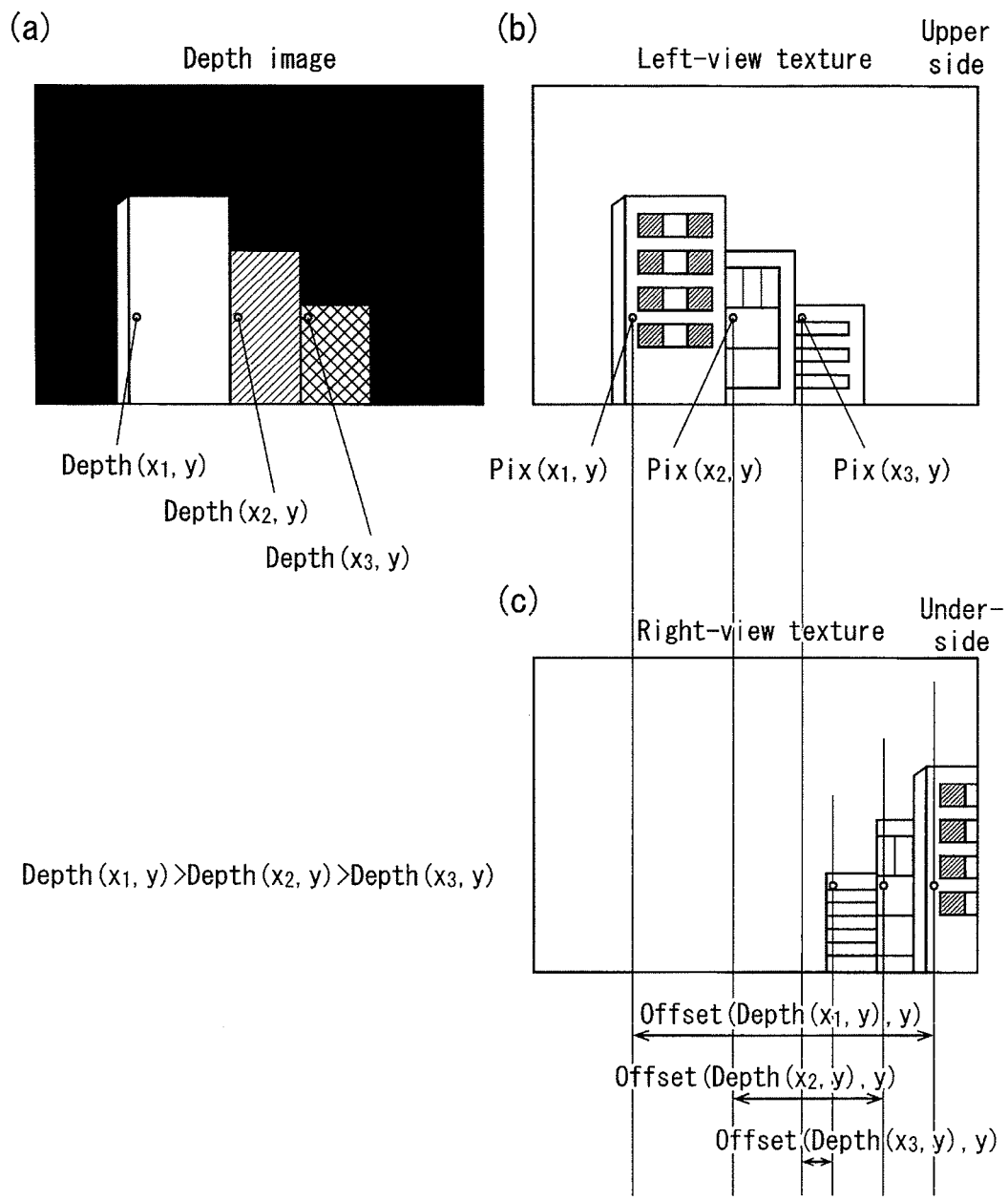
FIG. 17 illustrates the parallax provided in the left-view texture and the right-view texture as a result of pixel shifting.

FIG. 17 illustrates the parallax provided in the left-view texture and the right-view texture as a result of pixel shift. FIG. 17(a) illustrates a depth image, FIG. 17(b) illustrates the stored content of the left-view texture memory, and FIG. 17(c) illustrates the stored content of the right-vie texture memory.

In FIG. 17(b), Pix(x1, y) is a pixel that belongs to the building appearing closest toward the front, out of the three buildings in the image. Pix(x2, y) is a pixel belonging to the second building, out of the three buildings. Pix(x3, y) is a pixel belonging to the third building, out of the three buildings.

FIG. 17(a) is an example of a depth image and illustrates the depths to respective pixels Pix(x1, y), Pix(x2, y), and Pix(x3, y) in the left-view texture. Depth(x1, y) indicates the depth to Pix(x1, y) in the left-view texture. Depth(x2, y) indicates the depth to Pix(x2, y) in the left-view texture. Depth(x3, y) indicates the depth to Pix(x3, y) in the left-view texture.

At the bottom, FIG. 17(c) illustrates the offset given to each pixel in DIBR. Specifically, Offset (Depth(x1, y), y) indicates the offset given to Pix(x1, y) in the left-view texture. Similarly, Offset(Depth(x2, y), y) indicates the offset given to Pix(x2, y) in the left-view texture, and Offset(Depth(x3, y), y) indicates the offset given to Pix(x3, y) in the left-view texture. As shown in the figure, the relation Depth(x1, y)>Depth(x2, y)>Depth(x3, y) is true, so that pixels of the building closest toward the front are given the largest parallax. As a result, the building appears to largely pop out of the screen. As described above, in DIBR, the shift amount of each pixel differ depending on the intensity value of a corresponding pixel in the depth image. Thus, by employing arithmetic operation units to calculate an appropriate offset value from the intensity value of a corresponding pixel in the depth image, the pixel shift unit 18 is duly implemented by hardware components. This concludes the description of the pixel shift unit 18. The following describes the details of the display region buffer 19.

(Display Region Buffer 19)

The display region buffer 19 stores each pixel having the coordinates falling inside the display region, as a result of DIBR by the pixel shift unit 18. Suppose that the original image data has a resolution of M (wide)×N (high) pixels. Then, in the coordinates system having the origin (0, 0) at the top left pixel of the image data, the "display region" is defined to cover pixels located at the X coordinate from 0 to M-1 and at the Y coordinate from 0 to N-1. Therefore, any pixel having the X coordinate after the shift equal to M or larger is excluded, and the pixels having the X coordinate from 0 to M-1 are stored in the display region buffer 19. When considering the case where the image subjected to shift is composed of 512 (wide)×512 (high) pixels, any pixel is excluded if the X coordinate of the pixel after the shift is equal to 512 or larger. Thus, pixels shifted to have the X coordinate from 0 to 511 are stored in the display region buffer 19.

(Out-of-Region Buffer 20)

The out-of-region buffer 20 stores pixels having the coordinates falling outside the display region as a result of DIBR by the pixel shift unit 18. In other words, the out-of-region buffer 20 stores "out-of-region pixels". Suppose that the original image data has a resolution of M (wide)×N (high) pixels, any pixel is regarded as an out-of-region pixel if the X coordinate of the pixel after the shift is equal to M or larger and thus stored in the out-of-region buffer 20.

(Boundary Processing Unit 21)

On the image that is made incomplete as a result of pixel shifting by DIBR, the boundary processing unit 21 conducts processing to correct boundaries between partial images. The boundary processing refers to the process of filling in missing pixels at the edge of the image using the out-of-region pixels stored in the out-of-region buffer 20 and is performed at the time when the pixel shift unit 18 processes the next piece of image data adjacent to the previously processed piece of image data.

(Left-View Texture Memory 22 and Right-View Texture Memory 23)

The right-view texture memory 22 and the left-view texture memory 23 respectively store left- and right-view textures obtained as a result of DIBR performed by the street view DIBR processing unit 17.

(CG Processor 24)

The CG processor 24 allocates the three-dimensional coordinates describing modeling data to their corresponding coordinates in the three-dimensional modeling space and projects the three-dimensional coordinates in the three-dimensional modeling space onto the viewport. The processing by the CG processor 30 involves coordinate and field-of-view conversion, lighting value calculation (texture mapping process), and viewport processing.

(Modeling Data Storage Unit 25)

The modeling data storage unit 25 stores modeling data defining the spherical model and the shape of each GUI element.

(Coordinate Conversion Unit 26)

The coordinate conversion unit 26 specifies the camera direction and zoom level for determining a screen for projecting three-dimensional objects as seen from the camera as the viewpoint. Thereafter, coordinate conversion is performed to convert the three-dimensional coordinates describing the modeling data on the spherical model to world coordinates in the three-dimensional modeling space. The coordinate conversion is to convert the three-dimensional coordinates describing the model data to the coordinates in the world coordinate system with the camera position in the three-dimensional modeling space as its origin and thus to obtain a view as seen from the camera position.

(Lighting-Value Calculation Unit 27)

The lighting-value calculation unit 27 calculates lighting values at each vertex of a three-dimensional object as a result of ray casting from a light source position set in the three-dimensional modeling space.

(Texture Mapping Unit 28)

The texture mapping unit 28 prepares two spheres, one for the left-view and the other for the right-view, in the 3D modeling space. The texture mapping unit 28 maps two or more left- and right-view textures, which are obtained by converting a background image, to the inner surface of a corresponding one of the left-view spherical model and the right-view spherical model.

(Viewport Conversion Unit 29)

The viewport conversion unit 29 performs coordinate conversion according to display information that includes information about the display resolutions and so on, so that the coordinates describing vertex positions in the three-dimensional modeling space are converted to two-dimensional screen coordinates. In this way, the viewport conversion unit 29 extracts viewport images. The images extracted include a left-view viewport image and a right-view viewport image. The viewport conversion unit outputs the extracted images to a corresponding one of the left-view plane memory 6 and the right-view plane memory 7. An instruction given by the position and direction determining unit 2 may be for changing the current line-of-sight direction without changing the current viewpoint. In that case, the texture mapping unit skips the texture mapping process, whereas the viewport conversion unit operates to re-do the process of extracting viewport images in order to reflect the change in the line-of-sight direction and outputs the results to the plane memories.

This concludes the description of the rendering control unit 5.

Figure 18:
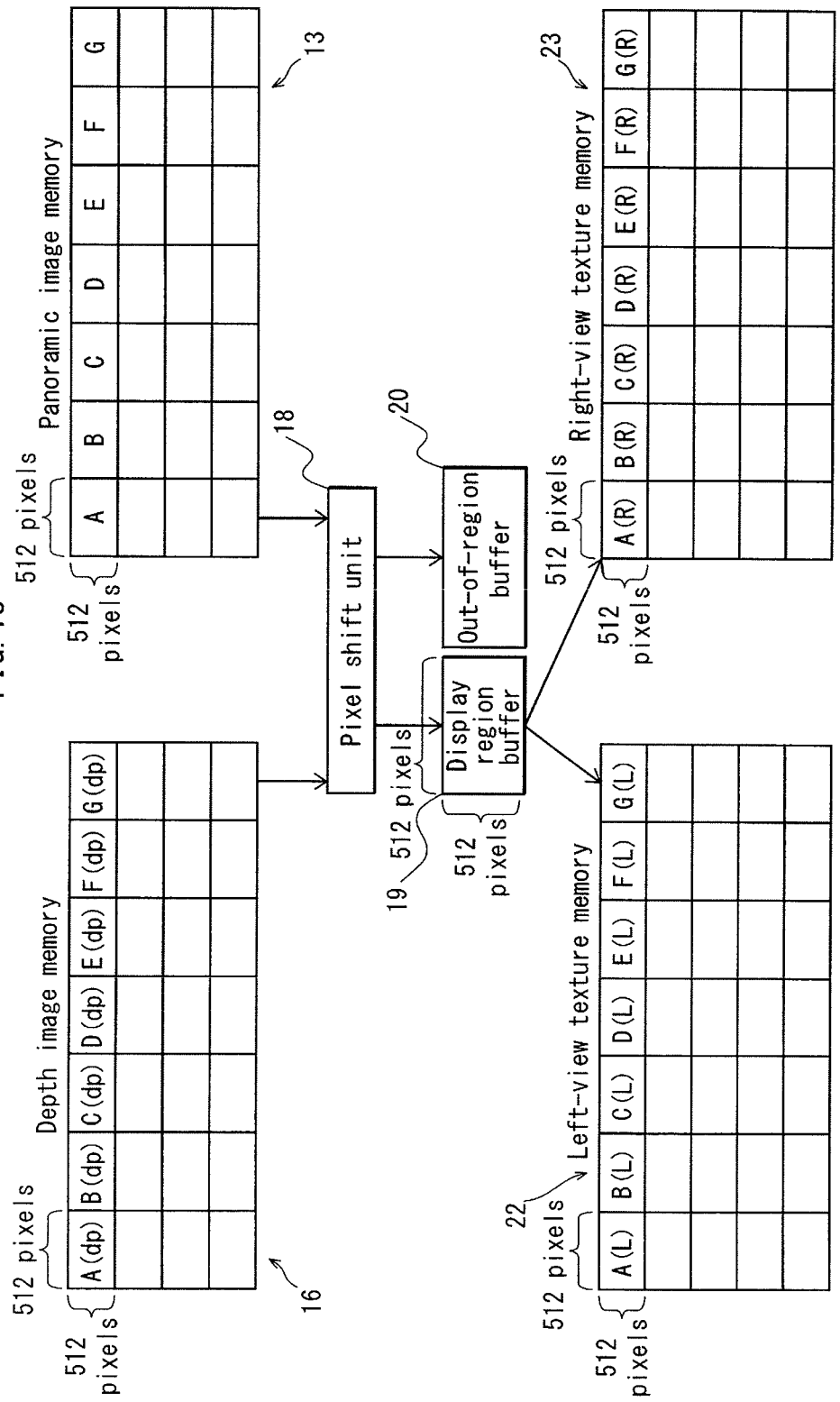
FIG. 18 illustrates the internal configuration of a panoramic image memory 13, depth image memory, left-view texture memory 22, and right-view texture memory 23, along with the relation between a pixel shift unit 18, a display region buffer 19, and an out-of-region buffer 20.

FIG. 18 illustrates the internal configuration of the panoramic image memory 13, the depth image memory, the left-view texture memory 22, and the right-view texture memory 23, along with the relation between the pixel shift unit 18, the display region buffer 19, $^{and}$ the out-of-region buffer 20. In the figure, the memory area is illustrated as a grid pattern. The cells of the grid represents the contents sorted in the memory elements of the memory. A pixel value is the content stored in a memory element. The pixel value is composed of luma Y, red chroma Cr, blue chroma Cb, and transparency α.

In the figure, the depth image memory 16 and the panoramic imaged memory 13 are illustrated on the first level, the left-view texture memory 22 and the right-view texture memory 23 are illustrated in the lower level, and the pixel shift unit 18, the display region buffer 19, and the out-of-region buffer 20 are illustrated in the middle level. The letters A, B, C, D, E, F, and G in the panoramic image memory 13 represents seven images combined in the row direction to construct a panoramic image. Each image is composed of 512 (wide)×512 (high) pixels. The letters A(dp), B(dp), C(dp), D(dp), E(dp), F(dp), and G(dp) in the left-view texture memory 22 illustrated at the upper left in the figure each represents a grey-scale image of 512 (wide)×512 (high) pixels. The letters A(L), B(L), C(L), D(L), E(L), F(L), and G(L) in the left-view texture memory 22 illustrated in the lower left in the figure each represents a result left shift. The letters A(R), B(R), C(R), D(R), E(R), F(R), and G(R) in the right-view texture memory 23 illustrated in the lower right in the figure each represents a result right shift.

From the panoramic image constructed of 4 (column)×7 (row) images stored in the panoramic image memory 13, one image composed of 512 (wide)×512 (high) pixels is fetched. From the depth image stored in the depth image memory, an associated grayscale image also composed of 512 (wide)× 512 (high) pixels is fetched. Then, DIBR is performed using the fetched image and the grayscale image. The image resulting from the DIBR is stored in an appropriate one of the left-view texture memory 22 and the right-view texture memory 23. By repeating this, left- and right-view textures are sequentially formed on the left-view texture memory 22 and the right-view texture memory 23, respectively.

Figure 19A:
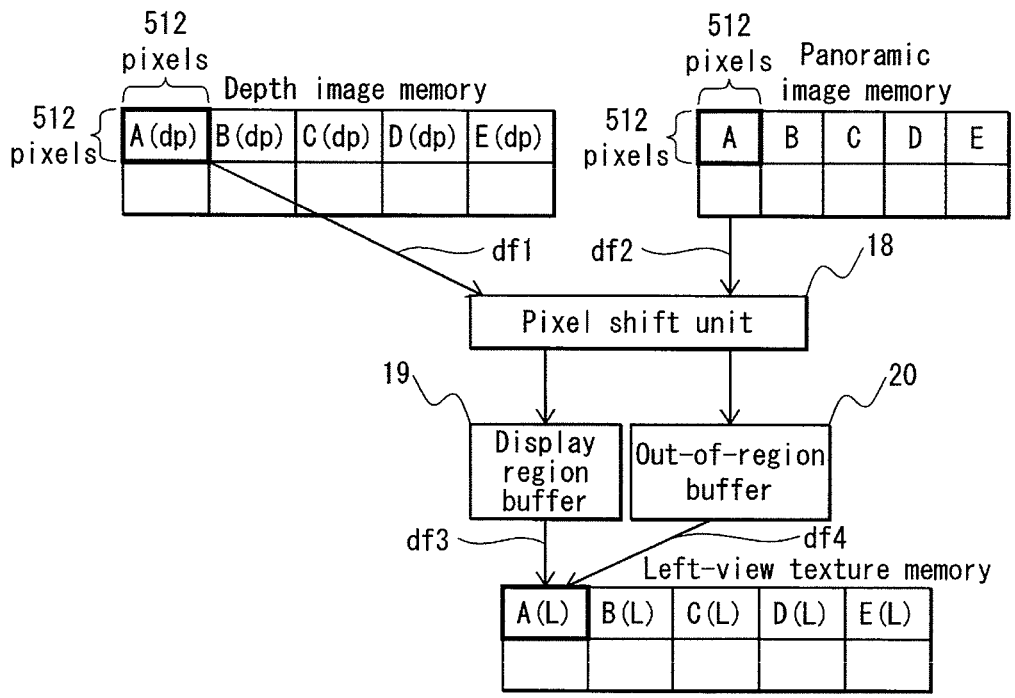
FIGS. 19A and 19B illustrate the data flow among the depth image memory, the panoramic image memory 13, and the left-view texture memory 22.
Figure 19B:
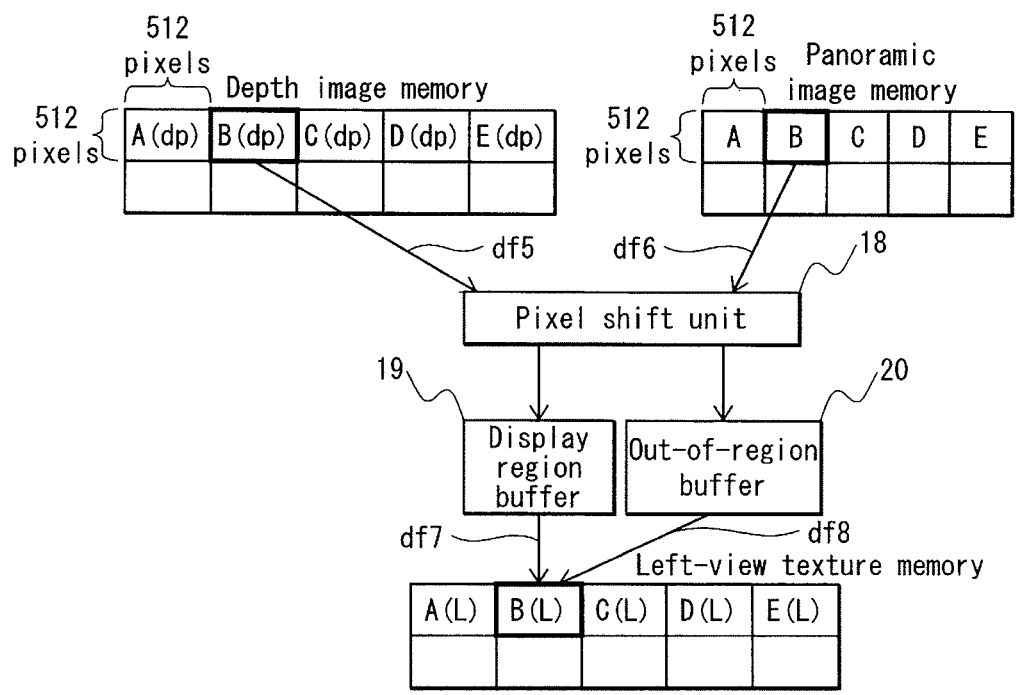

FIGS. 19A and 19B illustrate the data flow among the depth image memory, the panoramic image memory 13, and the left-view texture memory 22. The figure is drawn based on FIG. 18, and arrows indicating transfer of image data are additionally drawn. In FIG. 19A, the arrows df1 and df2 schematically indicate reading of Depth image A(dp) from the depth image memory and Image A from the panoramic image memory 13, respectively. The arrows df3 and df4 schematically indicate writing of Image A(L) to the left-view texture memory 22 from the display region buffer 19 and from the out-of-region buffer 20, respectively.

In FIG. 19B, the arrows df5 and df6 schematically indicate reading of Depth image B(dp) from the depth image memory and Image B from the panoramic image memory 13, respectively. The arrows df7 and df8 schematically indicate writing of Image B(L) to the left-view texture memory 22 from the display region buffer 19 and from the out-of-region buffer 20, respectively.

Figure 20A:
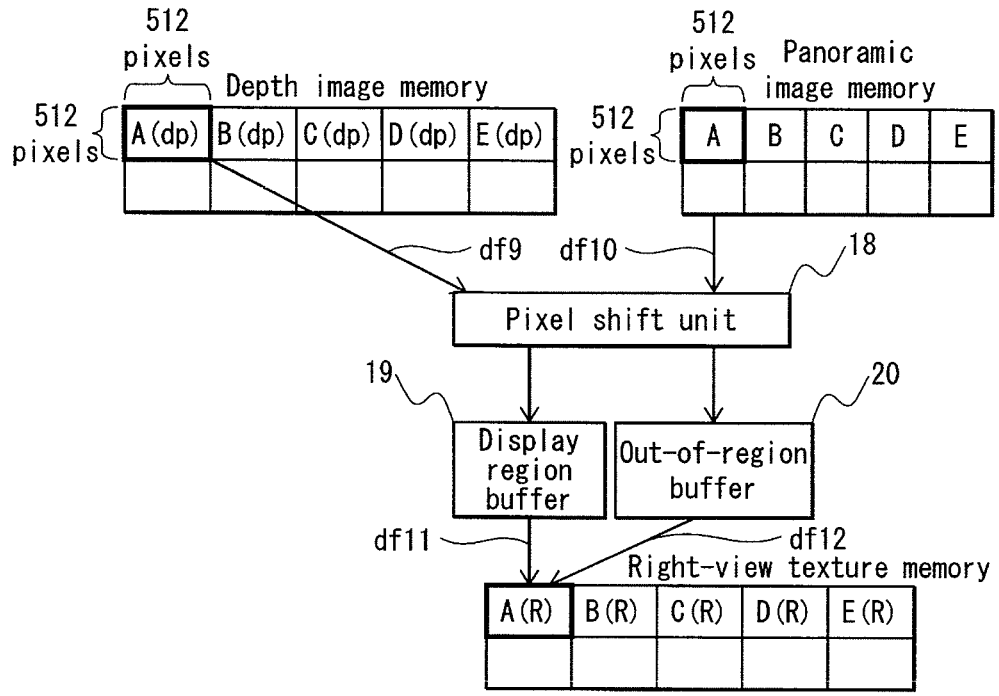
FIGS. 20A and 20B illustrate the data flow among the depth image memory, the panoramic image memory 13, and the left-view texture memory 22.
Figure 20B:
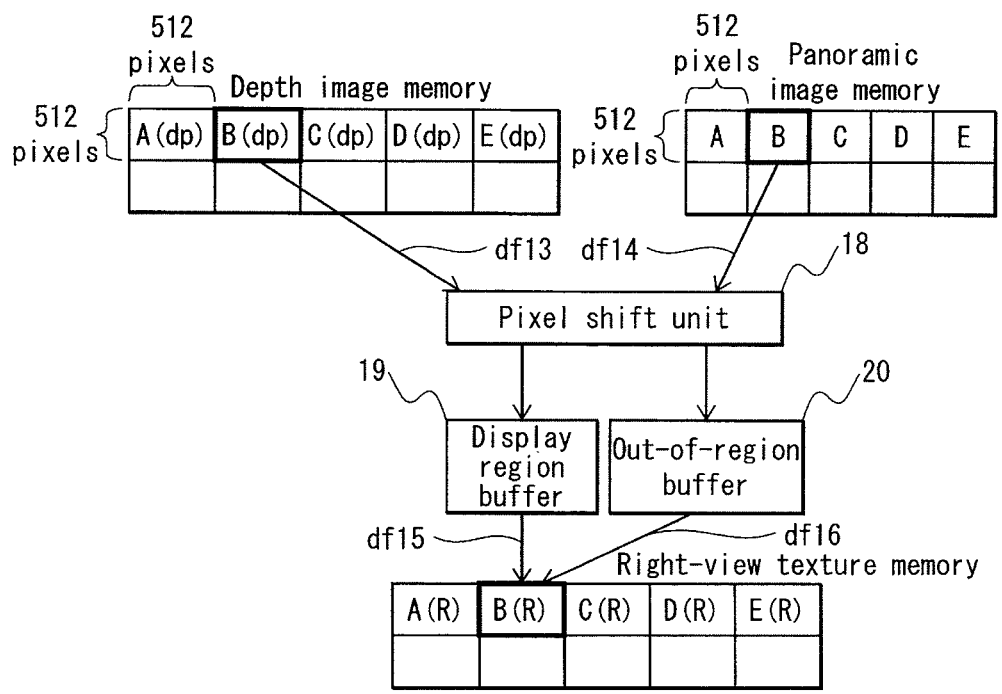

FIGS. 20A and 20B illustrate the data flow among the depth image memory, the panoramic image memory 13, and the left-view texture memory 22. The figure is drawn based on FIG. 18, and arrows indicating transfer of image data are additionally drawn. In FIG. 20A, the arrows df9 and df10 schematically indicate reading of Depth image A(dp) from the depth image memory and Image A from the panoramic image memory 13, respectively. The arrows df11 and df12 schematically indicate writing of Image A(R) to the right-view texture memory 23 from the display region buffer 19 and from the out-of-region buffer 20, respectively.

In FIG. 20B, the arrows df13 and df14 schematically indicate reading of Depth image B(dp) from the depth image memory and Image B from the panoramic image memory 13, respectively. The arrows df15 and df16 schematically indicate writing of Image B(R) to the right-view texture memory 23 from the display region buffer 19 and from the out-of-region buffer 20, respectively. As described above, the panoramic image stored in the panoramic image memory 13 is read in units of 512 (wide)×512 (high) pixels and supplied to the pixel shift unit 18 where DIBR is performed in units of 512 (wide)×512 (high) pixels.

With reference to FIGS. 21-23, the following describes how a blank occurs in each partial image constructing a panoramic image as a result of DIBR of the partial image and how the blank is complemented.

A blank resulting from pixel shifting is complemented in the following manner. First, when pixel shifting is applied to one image, out-of-region pixels that shifted out of the display region of the image are temporality stored in the out-of-region buffer 20. Then, when pixel shifting is applied to the next image, the buffered out-of-region pixels are used to fill the blank of the currently processed image resulting from the pixel shifting.

(Process of Generating Left-View Texture and Right-View Texture)

Through the above processing by the components described above, left-view textures and right-view textures are obtained. FIGS. 21-23 schematically illustrate intermediate results obtained in the process of obtaining the final image from raw material.

Figure 21A:
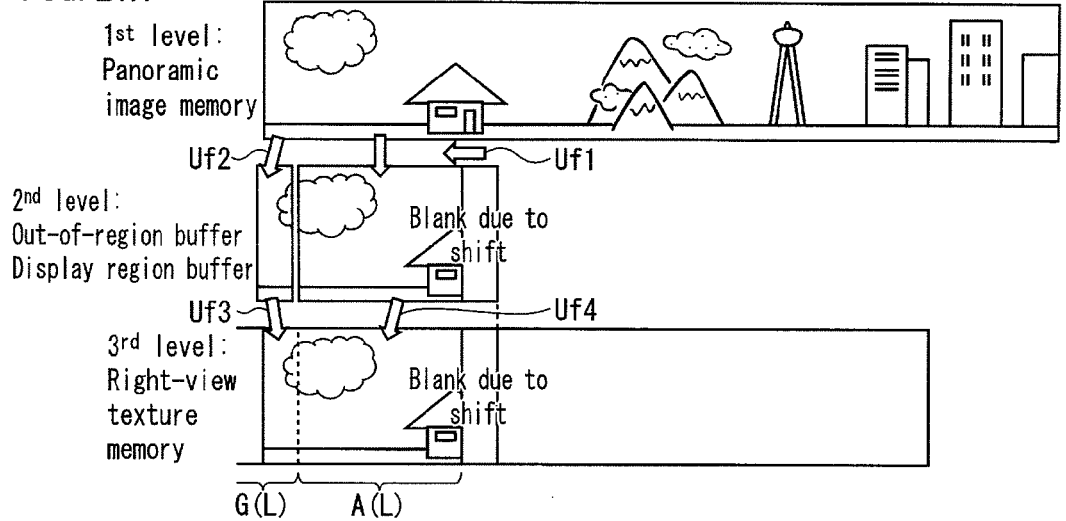
FIGS. 21A-21C illustrate the process of generating a left-view texture.
Figure 21B:
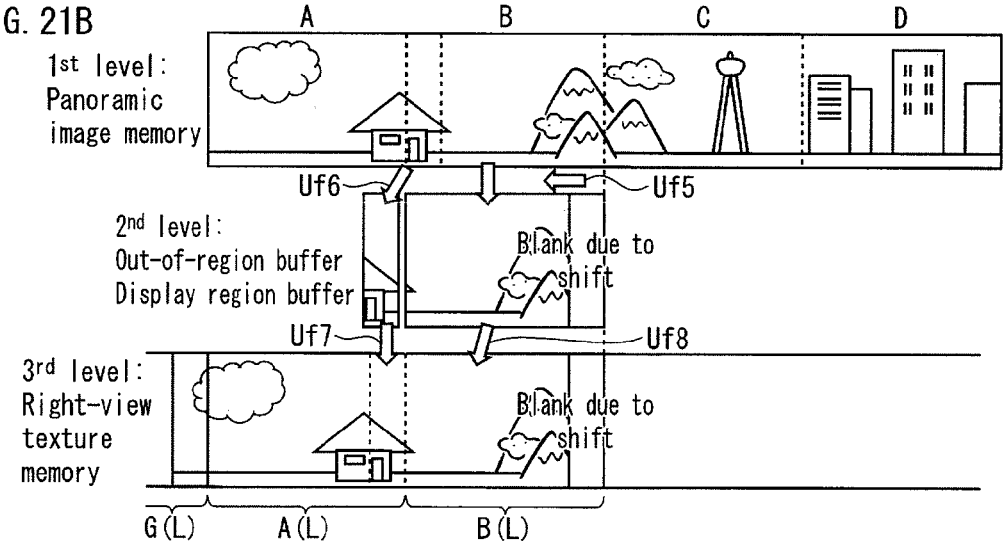
Figure 21C:
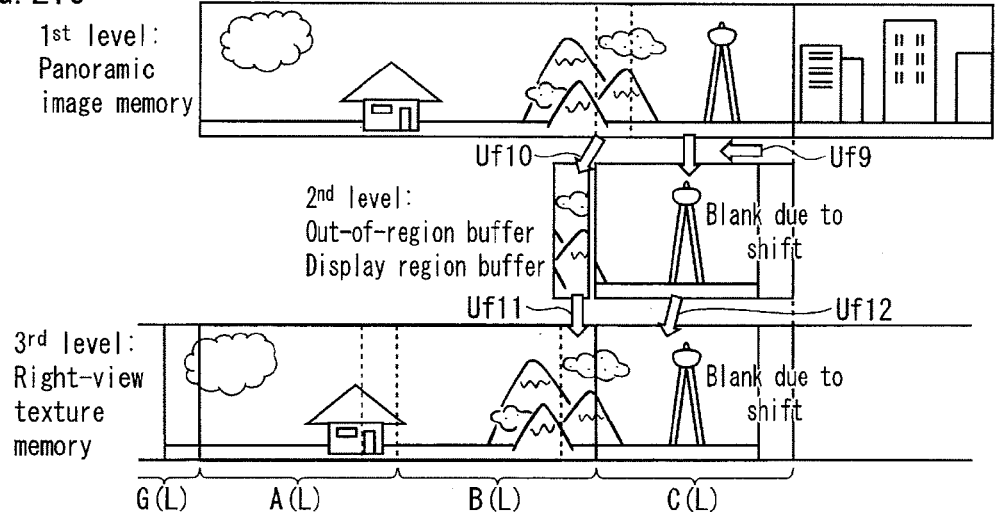

FIGS. 21A-21C illustrate the data flow from the panoramic image memory 13 to display region buffer 19 and from the out-of-region buffer 20 to the left-view texture memory 22 at the time of applying left shift. In FIG. 20A, the arrow uf1 indicates pixel shifting applied in DIBR. Consequently, the entire Image A is shifted to right and thus a blank occurs at the right edge of Image A. The arrow uf2 indicates writing of out-of-region pixels, which are not stored in the display region buffer 19 as a result of DIBR, to the out-of-region buffer 20. The arrow uf3 indicates wiring of pixels from the out-of-region buffer 20 to the left-view texture memory 22. That is, pixels buffered in the out-of-region buffer 20 are stored in the left-view texture memory 22 as part of Image G(L). The arrow uf4 indicates wiring of pixels from the display region buffer 19 to the left-view texture memory 22. Consequently, the main portion of Image A buffered in the display region buffer 19 is stored in the left-view texture memory 22 as part of Image A(L), i.e., as Image A(L) with a blank.

In FIG. 21B, the arrow uf5 indicates pixel shifting applied in DIBR. As a consequence, the entire Image B is shifted to right and thus a blank occurs at the right edge of Image B. The arrow uf6 indicates writing of out-of-region pixels, which are not stored in the display region buffer 19 as a result of DIBR, to the out-of-region buffer 20. The arrow uf7 indicates wiring of pixels from the out-of-region buffer 20 to the left-view texture memory 22. That is, pixels buffered in the out-of-region buffer 20 are written to the left-view texture memory 22 as part of Image A(L). The arrow uf8 indicates wiring of pixels from the display region buffer 19 to the left-view texture memory 22. As a consequence, the main portion of Image B buffered in the display region buffer 19 is stored in the left-view texture memory 22 as part of Image B(L), i.e., as Image B(L) with a blank.

In FIG. 21C, the arrow uf9 indicates pixel shifting applied in DIBR. Consequently, the entire Image C is shifted to right and thus a blank occurs at the right edge of Image C. The arrow uf10 indicates writing of out-of-region pixels, which are not stored in the display region buffer 19 as a result of DIBR, to the out-of-region buffer 20. The arrow uf11 indicates wiring of pixels from the out-of-region buffer 20 to the left-view texture memory 22. That is, pixels buffered in the out-of-region buffer 20 are written to the left-view texture memory 22 as part of Image B(L). The arrow uf12 indicates wiring of pixels from the display region buffer 19 to the left-view texture memory 22. As a consequence, the main portion of Image C buffered in the display region buffer 19 is stored in the left-view texture memory 22 as part of Image C(L), i.e., as Image C(L) with a blank.

Figure 22A:
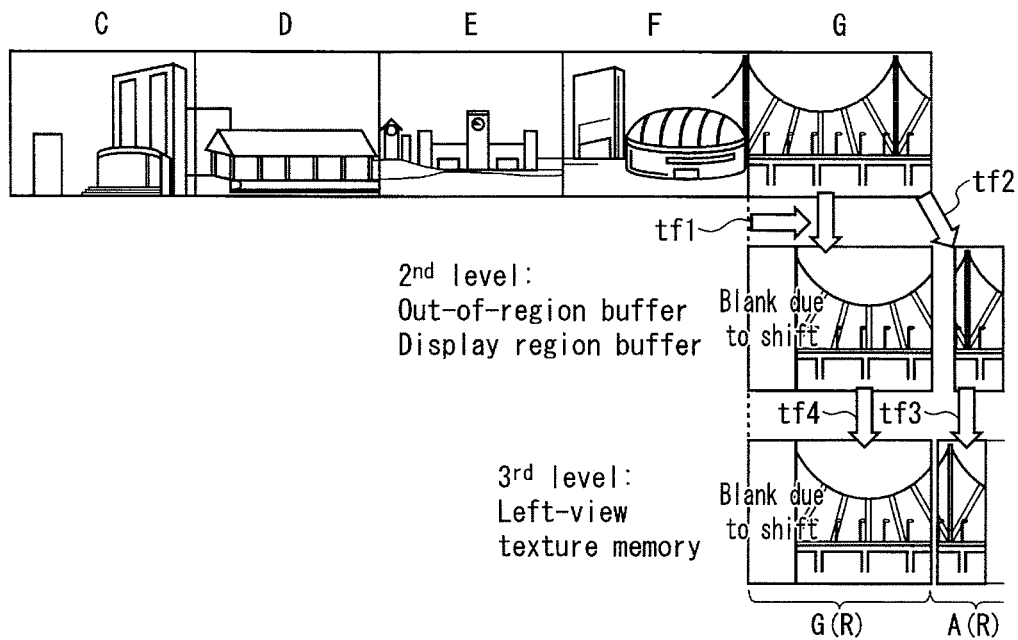
FIGS. 22A and 22B illustrate the process of generating a right-view texture.
Figure 22B:
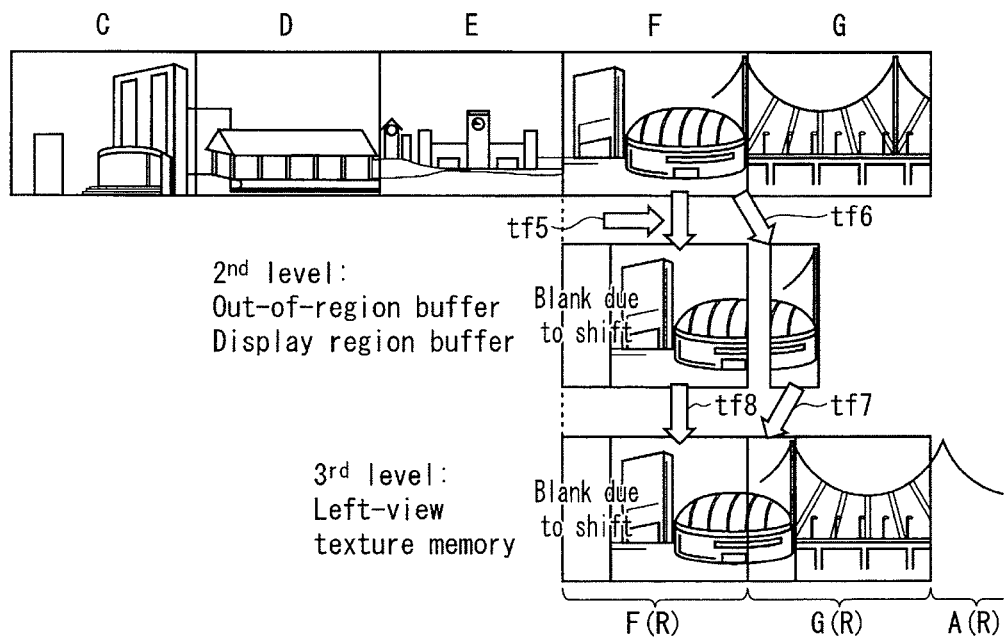
Figure 23A:
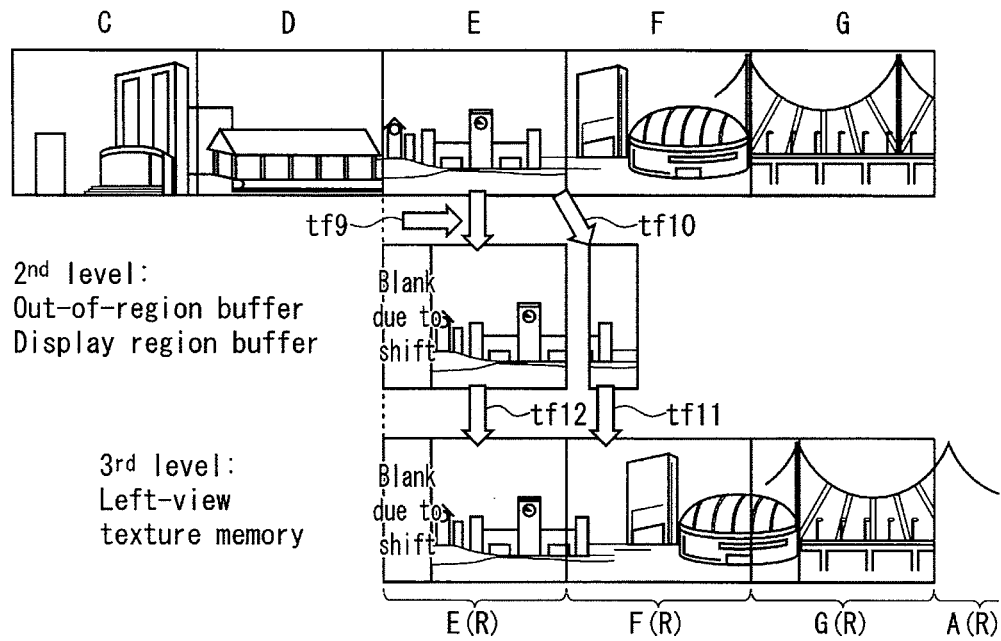
FIGS. 23A and 23B illustrate the process of generating a right-view texture.
Figure 23B:
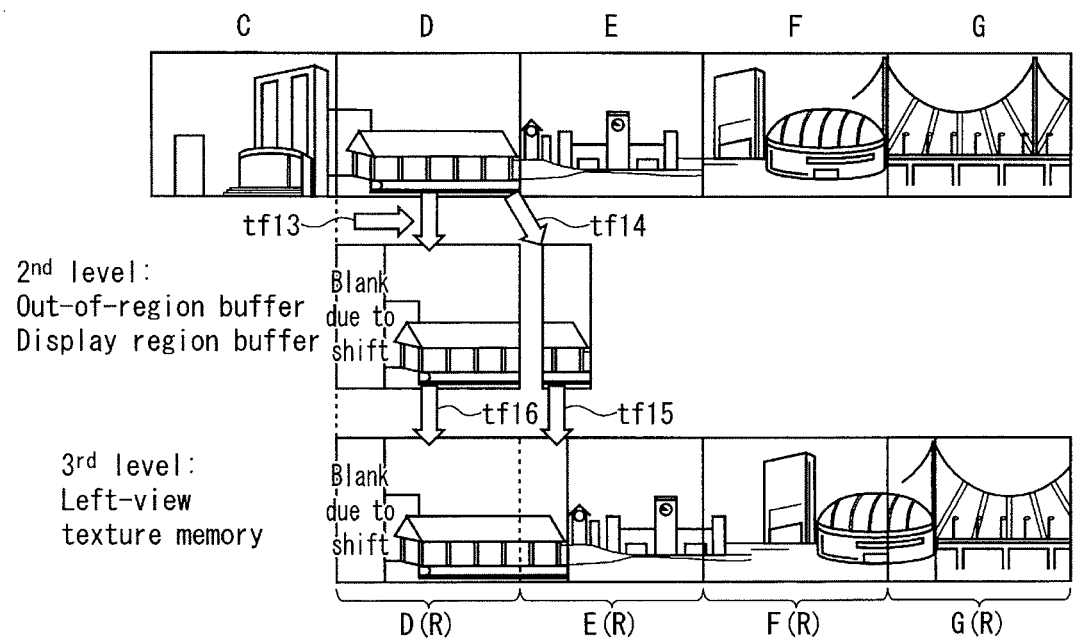

FIGS. 22A and 22B illustrate the process of generating a left-view texture in the left-view texture memory 22, whereas FIGS. 23A and 23B illustrate the process of generating a right-view texture in the right-view texture memory 23. On precondition for the texture generation, five images illustrated in FIG. 22A are selected as processing target. FIG. 22A illustrates the processing step where DIBR of Image G is performed to generate Image G(R). FIG. 22B illustrates the processing step where DIBR of Image F is performed to generate Image F(R). FIG. 22A illustrates the processing step where DIBR of Image E is performed to generate Image E(R). FIG. 22B illustrates the processing step where DIBR of Image D is performed to generate Image D(R). FIGS. 22A and 22B as well as FIGS. 23A and 23B are common in that the first level illustrates the stored content of the panoramic image memory 13, the second level illustrates the stored content of the display region buffer 19 and of the out-of-region buffer 20, and the third level illustrates the stored content of the left-view texture memory 22.

As illustrated on the second level, the blank resulting from shift in DIBR appears at the edge opposite from the shift direction. The out-of-region buffer 20 stores pixels shifted to fall out of the display region. As illustrated on the third level, the out-of-region pixels buffered in the out-of-region buffer 20 are used to overwrite the blank occurred at the image subjected to the immediately subsequent shift processing.

That is, in the in-process stage, Images G(R), F(R), E(R), and D(R) each have a blank due to pixel shifting. The blank occurred in each image as a result of pixel shifting is overwritten with pixels that are shifted off the right edge of the image display region in DIBR of a subsequent image.

FIGS. 22A and 22B illustrate the data flow from the panoramic image memory 13 to display region buffer 19 and from the out-of-region buffer 20 to the left-view texture memory 22 at the time of applying left shift. In FIG. 20A, the arrow tf1 indicates pixel shifting applied in DIBR. Consequently, the entire Image G is shifted to left and thus a blank occurs at the left edge of Image G. The arrow tf2 indicates writing of out-of-region pixels, which are not stored in the display region buffer 19 as a result of DIBR, to the out-of-region buffer 20. The arrow tf3 indicates wiring of pixels from the out-of-region buffer 20 to the left-view texture memory 22. That is, pixels buffered in the out-of-region buffer 20 are written to the left-view texture memory 22 as part of Image A(R). The arrow tf4 indicates wiring of pixels from the display region buffer 19 to the left-view texture memory 22. As a consequence, the main portion of Image G buffered in the display region buffer 19 is stored in the left-view texture memory 22 as part of Image G(R), i.e., as Image G(R) with a blank.

In FIG. 22B, the arrow tf5 indicates pixel shifting applied in DIBR. Consequently, the entire Image F is shifted to left and thus a blank occurs at the left edge of Image F. The arrow tf6 indicates writing of out-of-region pixels, which are not stored in the display region buffer 19 as a result of DIBR, to the out-of-region buffer 20. The arrow tf7 indicates wiring of pixels from the out-of-region buffer 20 to the left-view texture memory 22. That is, pixels buffered in the out-of-region buffer 19 are written to the left-view texture memory 22 as part of Image G(R). The arrow tf8 indicates wiring of pixels from the display region buffer 19 to the left-view texture memory 22. As a consequence, the main portion of Image F buffered in the out-of-region buffer 20 is stored in the left-view texture memory 22 as part of Image F(R), i.e., as Image F(R) with a blank.

In FIG. 23A, the arrow tf9 indicates pixel shifting applied in DIBR. Consequently, the entire Image E is shifted to left and thus a blank occurs at the left edge of Image E. The arrow tf10 indicates writing of out-of-region pixels, which are not stored in the display region buffer 19 as a result of DIBR, to the out-of-region buffer 20. The arrow tf11 indicates wiring of pixels from the out-of-region buffer 20 to the left-view texture memory 22. That is, pixels buffered in the out-of-region buffer 20 are written to the left-view texture memory 22 as part of Image F(R). The arrow tf12 indicates wiring of pixels from the display region buffer 19 to the left-view texture memory 22. As a consequence, the main portion of Image E buffered in the display region buffer 19 is stored in the left-view texture memory 22 as part of Image E(R), i.e., as Image E(R) with a blank.

In FIG. 23B, the arrow tf13 indicates pixel shifting applied in DIBR. Consequently, the entire Image D is shifted to left and thus a blank occurs at the left edge of Image D. The arrow tf14 indicates writing of out-of-region pixels, which are not stored in the display region buffer 19 as a result of DIBR, to the out-of-region buffer 20. The arrow tf15 indicates wiring of pixels from the out-of-region buffer 20 to the left-view texture memory 22. That is, pixels buffered in the out-of-region buffer 20 are written to the left-view texture memory 22 as part of Image E(R). The arrow tf16 indicates wiring of pixels from the display region buffer 19 to the left-view texture memory 22. As a consequence, the main portion of Image D buffered in the display region buffer 19 is stored in the left-view texture memory 22 as part of Image D(R), i.e., as Image D(R) with a blank.

<Software Implementation by Operation on General-Purpose CPU>

The image rendering device according to this embodiment can be industrially manufactured by implementing the components of the image rendering device with hardware integrated components, such as ASIC. The architecture of a general-purpose computer system, such as a CPU, code ROM, and RAM, may be employed for the hardware integrated component. In that case, it is necessary to write a program in computer code for realizing the processing steps carried out by the respective components of the image processing device and store the program on code ROM in advance. Then, the processing steps described in the program need to be executed by the CPU included in the hardware integrated component.

The following describes the processing steps that need to be realized in software implementation employing the architecture of a general-purpose computer system.

Figure 24:
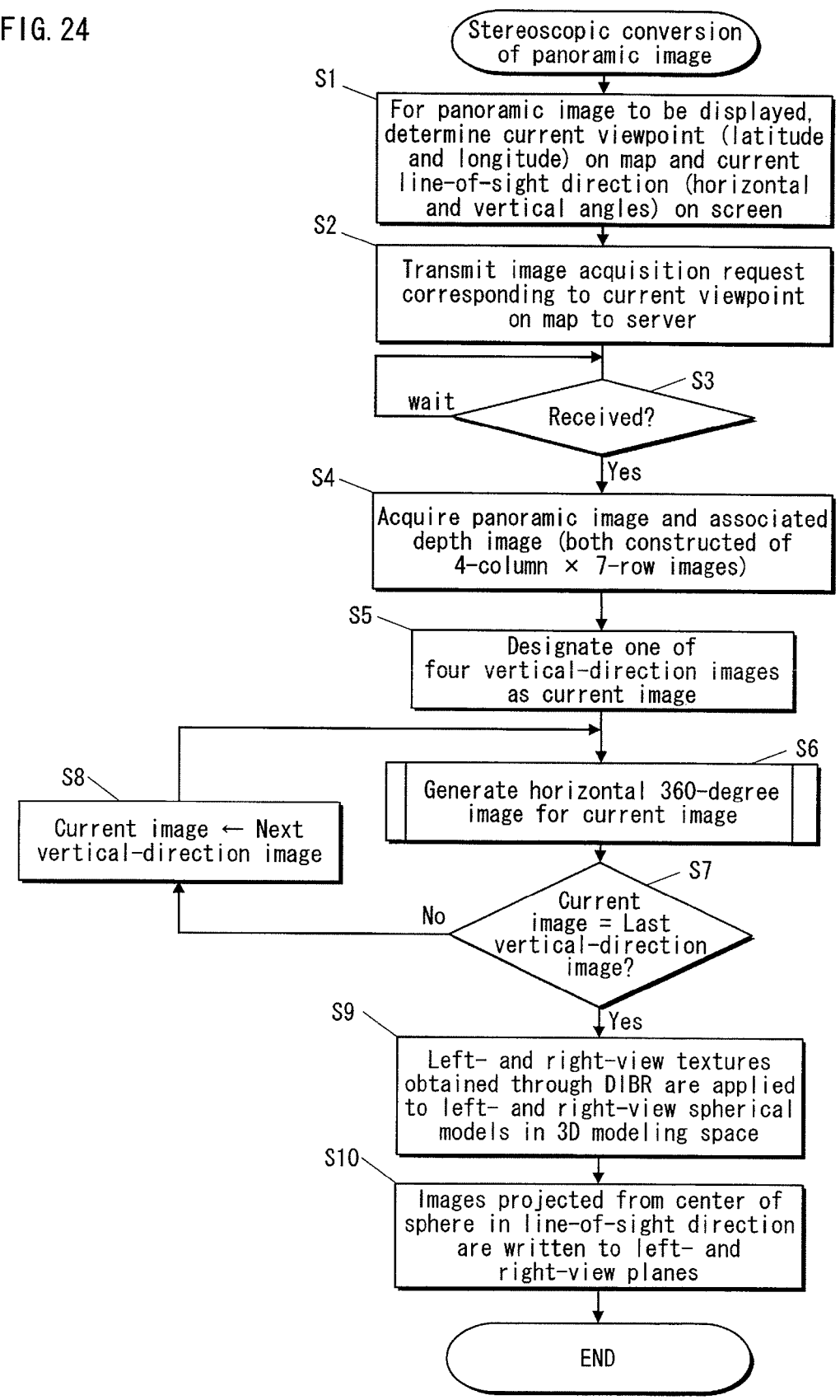
FIG. 24 is a flowchart showing the processing steps for stereoscopic conversion of a panoramic image.

FIG. 24 is a flowchart showing the processing steps for stereoscopic conversion of a panoramic image. Main flow. In Step S1, the current viewpoint (latitude and longitude) on the map and the current line-of-sight direction (horizontal and vertical angles) of display on the screen are determined. In Step S2, an image acquisition request corresponding to the current viewpoint on the map is generated and transmitted to the server 1001. In Step S3, the processing is placed in wait state for reception of a street view file. Upon receipt of a street view file, a panoramic image and an associated depth image are acquired in Step S4.

In Step S5, one of the four images aligned in the vertical direction is designated as a current image. Then, the processing moves onto the loop of Steps S6-S8. The loop is to perform the following steps for the current image. First, a horizontal 360-degree multi-viewpoint images are generated for the current image (Step S6), a determination is made as to whether the current image is the last image in the vertical direction (Step S7), and if the current image is not the last image, then the next image in the vertical direction is designated as the new current image (Step S8) to repeat the loop. When the current image is the last image in the vertical direction, Step S7 results in Yes, so that the processing exits the loop.

Thereafter, in Step S9, left-view textures and right-view textures obtained through DIBR are applied to the left-view spherical model and the right-view spherical model prepared in the 3D modeling space. In Step S8, images projected from the center of the spherical model in the line-of-sight direction are written to the left-view plane and the right-view plane.

FIG. 25 is a flowchart illustrating the process of generating a horizontal 360-degree image. In Step S13, out of the seven images aligned in the row direction, the image located in the current line-of-sight direction is selected as a base image. In Step S14, the base image is designated as the current image. In Step S15, the current image and a depth image associated with the current image are extracted. In Step S16, each pixel of the current image is horizontally shifted to have a depth of a corresponding pixel in the depth image. In Step S17, the pixels having coordinates falling out of the region as a result of the shift are written to the out-of-region buffer. Then, the loop between Steps S18 and S22 is executed. In the loop, the following steps are repeated. First, in Step S18, an image adjacent to the current image in the shift direction is designated as the new current image. In Step S19, each pixel of the current image is horizontally shifted to have a depth of a corresponding pixel in the depth image. In Step S20, pixels moved to fall outside of the region as a result of the shift are written to the out-of-region buffer. Thereafter, in Step S21, the pixels buffered in the out-of-region buffer are added to the current image at the edge located opposite the shift direction. Step S22 is to make a loop exit decision, and a determination is made as to whether the current image is equal to the base image. If the two images are not equal, Step S22 results in No, so that the loop is repeated. On the other hand, if the two images are equal, the processing moves onto Step S23 to add pixels buffered in the out-of-region buffer to the current image at the edge located opposite the shift direction. Then, the processing moves onto Step S12.

By following the flowchart to generate a right-view panoramic image from the left-view panoramic image used as the base, the resulting right-view panoramic image is ensured to be constructed of 28 partial images combined seamlessly with no missing pixels. Mapping these images as a texture on a spherical surface and outputting the projection image in any user-indicated direction to the left and right planes allows for seamless panoramic stereoscopic display.

The following describes operation of each component when executing the flowcharts illustrated in FIGS. 24 and 25. First, the user operation detection unit 1 and the position and direction determination unit 2 determine the position (latitude and longitude) on the map of the panoramic image to be displayed, as well as the direction of display on the screen (horizontal and vertical angles) (S1).Next, the panoramic image acquisition unit 11 acquires the panoramic image corresponding to the position on the map determined in Step S1 (Step S2). The panoramic image for one position acquired in step S2 is constructed of a total of 28 partial images, which are four images in the vertical direction and seven images in the row direction. Each partial image is 512 pixels high by 512 pixels wide. These images constitute the left-view panoramic image.

Next, the depth image acquisition unit 14 acquires a depth image associated with the panoramic image acquired in Step S2 (S3). The depth image shows the depth of each pixel in a three-dimensional space, representing the depth of each pixel by an eight-bit intensity value. The depth image itself also constitutes an image. Like the panoramic image, the depth image for one position is constructed of a total of 28 partial images, which are four images in the vertical direction and seven images in the row direction.

After the base panoramic image and the associated depth image are acquired in Steps S2 and S3, one of the four images in the vertical direction is selected for generating a horizontal 360° stereo image by following the flowchart shown in FIG. 18 (S5). When selecting one of the four vertical images, it is preferable to select an image that is close to the vertical angle at which the panoramic image is to be displayed. By first processing an image in the view direction, the panoramic image can be displayed on the screen while processing of remaining images is still in progress.

Since there are four images in the vertical direction, there are also four groups of horizontal 360-degree images. If it is determined that a horizontal 360-degree stereo image has been generated for every group (S7, Yes), then texture mapping is performed (Step S9). The texture mapping in this case refers to the process of placing the base panoramic image and the stereo image generated by the boundary processing unit 21 respectively onto a left-view spherical surface and a right-view spherical surface prepared in the 3D modeling space.

Once the texture mapping in Step S9 is complete, the image that is projected when looking from the center of the sphere in the view direction indicated by the position and direction determination unit 2 is written to the left-view plane and the right-view plane (Step S10), thus achieving stereoscopic display in the stereoscopic compatible display.

In FIG. 25, first, the panoramic image acquisition unit 11 extracts an image that serves as a base, from among horizontal 360° images, and the depth image acquisition unit 14 acquires a depth image associated with the extracted base image (Steps S13-S15). The base image is preferably an image located in the view direction as indicated by the position and direction determination unit 2. By first processing an image in the view direction, the panoramic image can be displayed on the screen while processing of remaining images is still in progress.

When the base image is determined, the DIBR unit 17 performs pixel shifting (i.e. DIBR) (Step S16). As has been described previously, some pixels may fall outside of the image region as a result of shift in DIBR. In that case, the boundary processing unit 21 temporality stores those out-of-region pixels in the buffer memory (Step S17). Once the out-of-region pixels are stored in the buffer memory, the panoramic image acquisition unit 11 subsequently extracts an image, and the depth image acquisition unit 14 acquires the depth image associated with the subsequently extracted image. At this point, an image adjacent on the left of the image subjected to the immediately previous DIBR is selected as the new current image (S18). Next, it is determined whether the current image extracted in step S18 matches the base image extracted in step S13 (Step S22). If it is determined that the image extracted in step S104 is not the base image (i.e., if processing has not yet been performed over one 360° horizontal revolution), DIBR is performed on the image extracted in step S18 to generate a right-view viewpoint image as seen from another view point (S19).

Next, the pixels currently stored in the out-of-region buffer memory are added to the right edge of the right-view viewpoint image generated for another view point in Step S19 (Step S20). Next, the pixels shifted off the region as a result of DIBR performed in Step S19 are stored into the out-of-region buffer memory (Step S21). Then, an image adjacent on the left of the image processed in Step S18 is selected to repeat Steps S18-S21 on the selected image.

In the above manner, Steps S18-S21 are repeated until it is determined in Step S22 that the adjacent image extracted in Step S18 is the same as the base image extracted in Step S14 (i.e., processing is complete over one 360° horizontal revolution). If such a determination is made in Step S22, the pixels currently stored in the out-of-area buffer memory are added to the right edge of the base image (Step S23). This completes the processing of pixel shifting over one 360° horizontal revolution and the boundary processing.

FIGS. 26A and 26B illustrate, for comparison, a panoramic image obtained exclusively through DIBR and a panoramic image obtained through pixel shift and boundary processing. FIG. 19A illustrates a panoramic image obtained by simply performing pixel shifting based on DIBR and stitching images together. At the locations where images are stitched together, the images look unnatural. This is because pixels are shifted beyond the image region due to DIBR, yielding missing pixels at the edges of images. Pixels are thus missing when images are stitched together, preventing display of a seamless image after image stitching.

FIG. 26B illustrates a panoramic image obtained by performing pixel shifts and boundary processing. As in FIG. 26, pixels shifted out of the screen region as a result of DIBR are used in generating an adjacent image, which prevents missing pixels at the locations where images are stitched together. Consequently, a seamless panoramic image is displayed even at edges between partial images.

(Embodiment 2)

The above description of the stereo panoramic image generation is given on precondition that a panoramic image is constructed of a plurality of partial images. In Embodiment 2, a description is given of generation of a stereo panoramic image on precondition that a panoramic image is constructed of a single image. To process such a panoramic image, the panoramic image acquisition unit 11, the depth image acquisition unit 14, the DIBR unit 17, the display region buffer 19, the out-of-region buffer 20, the boundary processing unit 21, and the texture mapping unit 28 all of which are the components already described in Embodiment 1 perform the following processing.

The panoramic image acquisition unit 11 acquires, either by downloading from the server 105 over the network interface 3, or from the local storage 4, a panoramic image corresponding to the position on the map indicated by the position and direction determination unit 2.

Figure 27A:
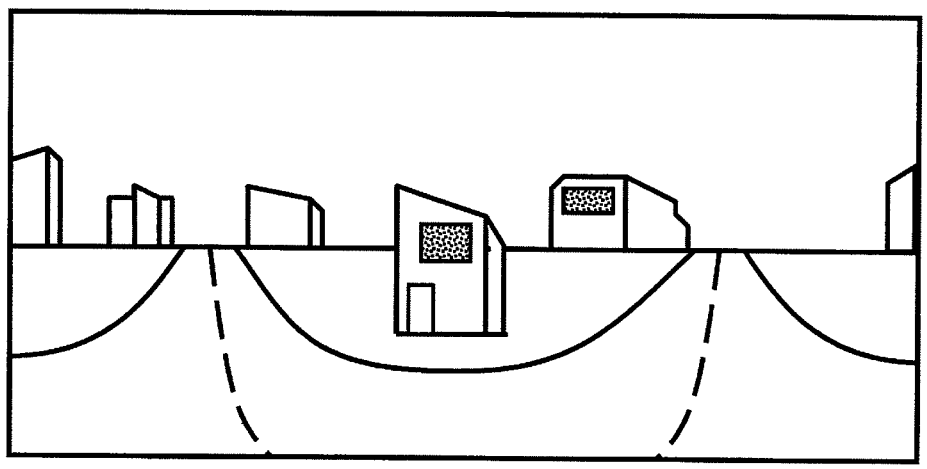
FIG. 27A illustrates a panoramic image according to Embodiment 2.
Figure 27B:
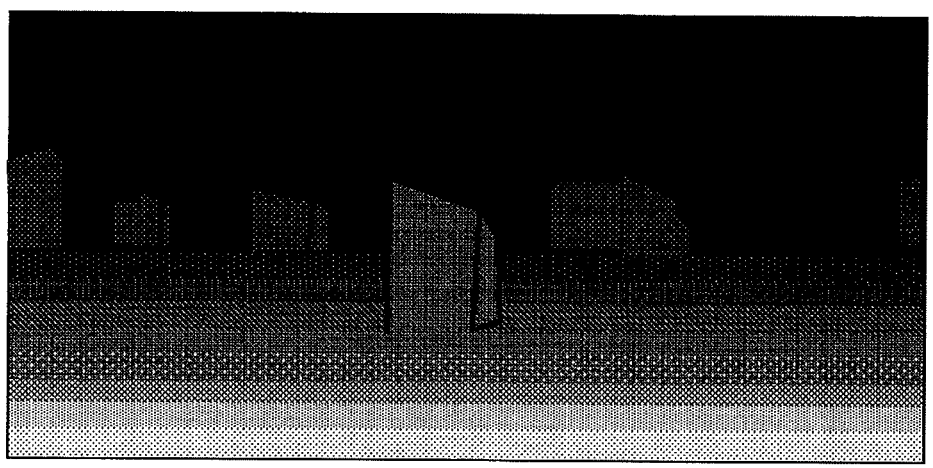
FIG. 27B illustrates a depth image associated with the panoramic image, according to Embodiment 2.

The depth image acquisition unit 14 acquires, from the street view file stored in the local storage 4, the depth image associated with the panoramic image acquired by the panoramic image acquisition unit 11. FIGS. 27A and 27B illustrate a panoramic image and a depth image according to Embodiment 2, the former being acquired by the panoramic image acquisition unit 11 and the latter by the depth image acquisition unit 14. The panoramic image illustrated in FIG. 27A is constructed of one large image composed of 2048 pixels high by 3584 pixels wide. The associated depth image is also constructed of one large grayscale image similarly composed of 2048 pixels high by 3584 pixels wide, as illustrated in FIG. 27B.

The DIBR unit 17 acquires a base left-view panoramic image and a depth image associated with the base image: the former from the panoramic image acquisition unit 11 and the latter from the depth image acquisition unit 14, and performs DIBR to generate a right-view image.

The display region buffer 19 stores a right-view image obtained as a result of pixel shifting.

The out-of-region buffer 20 stores pixels that are shifted to the outside the display region.

The boundary processing unit 21 performs the boundary processing to fill a position (at the same position in the vertical direction) that is ten pixels to the left of the right edge (i.e. towards the center of the image). In the case of a panoramic image constructed of one large image, the pixels shifted beyond an edge of the image in DIBR should be used to fill in pixels at the other edge of the same image. The reason is that when a panoramic image is constructed of one large image, the image makes a complete revolution on the spherical surface. Therefore, the pixels at the right edge and the left edge are ultimately displayed side-by-side on the spherical surface. As a result, the right edge and the left edge of the image can be considered continuous. Pixels shifted beyond the left edge of the image region should thus be used to fill in the opposite edge, i.e. the right edge of the image.

Figure 28A:
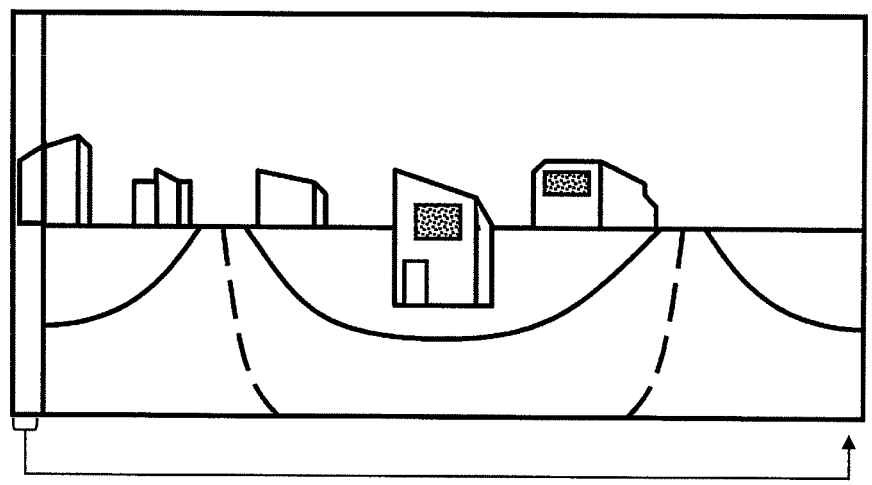
FIGS. 28A and 28B illustrate generation of a stereo image by correcting an image after pixel shifting, according to Embodiment 2.
Figure 28B:
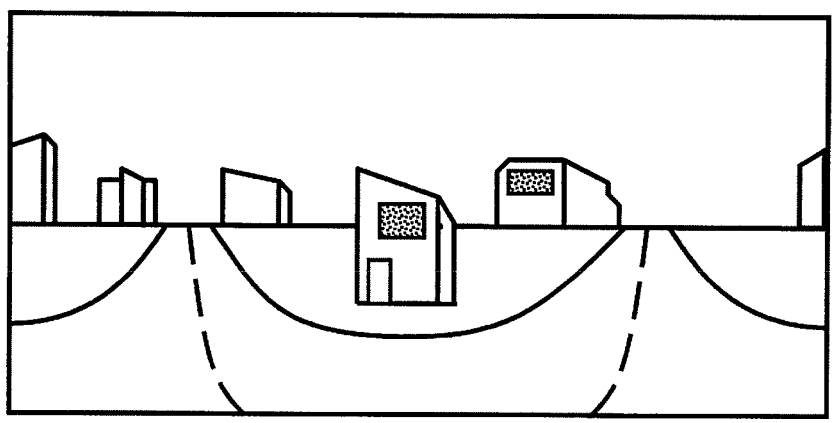

For example, a pixel shifted 10 pixels beyond the left edge in DIBR is used in the boundary processing by the boundary processing unit 21 to fill in a position (at the same position in the vertical direction) that is ten pixels to the left of the right edge (i.e. towards the center of the image). FIGS. 28A and 28B illustrate generation of a stereo image by correcting an image after pixel shifting, according to Embodiment 2. In the case of a panoramic image constituted by one large image, the pixels shifted beyond an edge of the image during DIBR should be used to fill in pixels at the other edge of the image. The reason is that when a panoramic image is constructed of one large image, the image makes a complete revolution on the spherical surface. Therefore, the pixels at the right edge and the left edge are ultimately displayed side-by-side on the spherical surface. As a result, the right edge and the left edge of the image can be considered continuous. Pixels projecting beyond the left edge of the image region should thus be used to fill in the opposite edge, i.e. the right edge of the image.

For example, a pixel shifted 10 pixels beyond the left edge in DIBR is used in the boundary processing to fill in a position (at the same position in the vertical direction) that is ten pixels to the left of the right edge (i.e. towards the center of the image).

Figure 29:
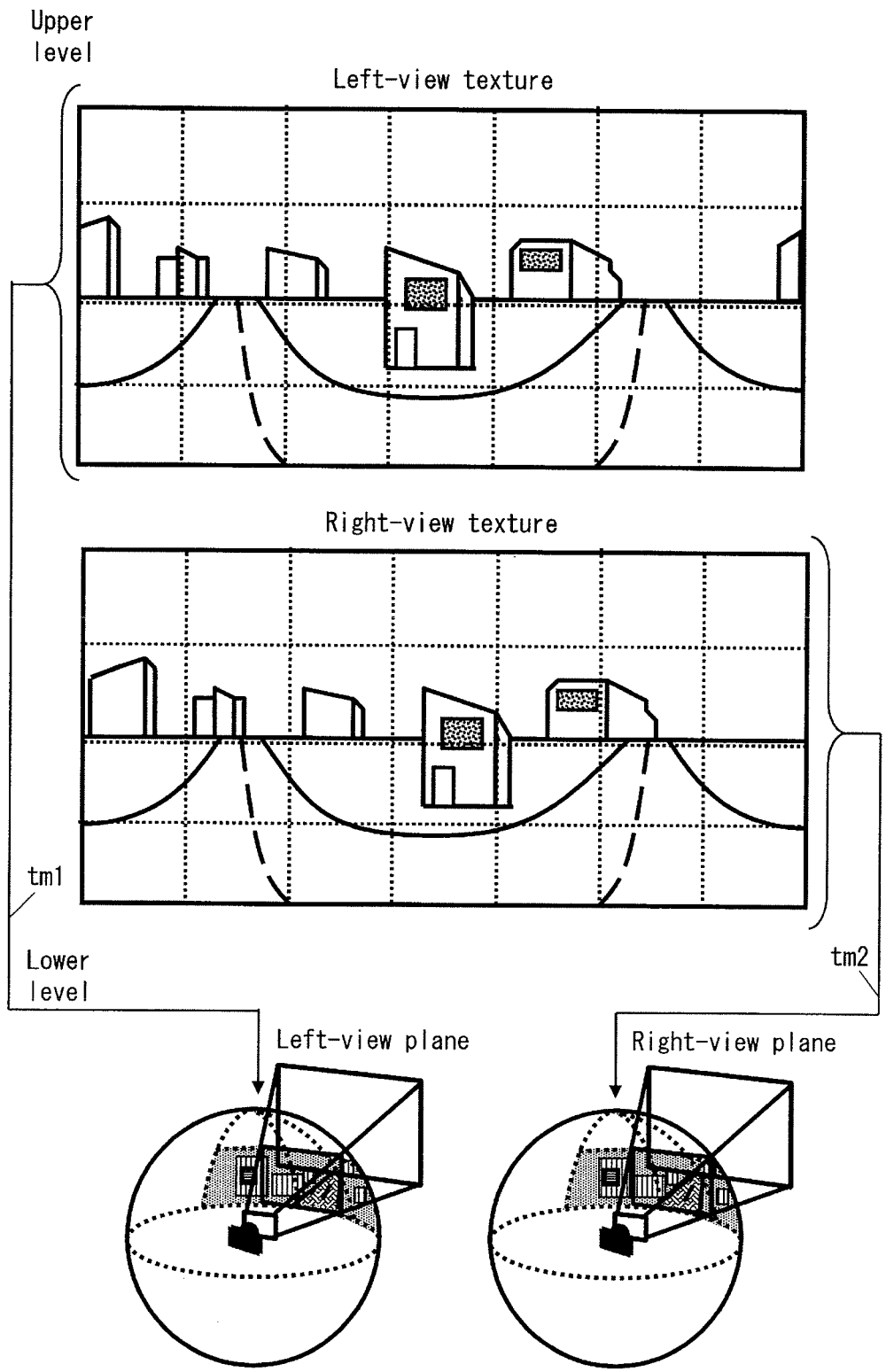
FIG. 29 illustrates texture mapping by a texture mapping unit 28.

The texture mapping unit 28 maps the left-view texture and the right-eye texture obtained by DIBR to the respective spherical models. FIG. 29 illustrates texture mapping by the texture mapping unit 28. The left- and right-view textures illustrated in the upper level of the figure are obtained as a result of DIBR by the DIBR unit 17. As indicated by the arrows tm1 and tm2, the textures are each applied to the inner surface of a corresponding one of the left- and right-view spherical models. The left- and right-view spherical models to which textures are applied are subjected to viewport extraction.

As the additional description of the improved components, the following describes operation of the existing components in the case where the improvement described above is made. That is, a description is given of how the panoramic image stored in the display region buffer 19 is processed according to the flowchart described in Embodiment 1.

When a panoramic image constructed of one image is subjected to the processing, the processing steps illustrated in FIG. 24 are performed in the following manner. First, the user operation detection unit 1 and the position and direction determination unit 2 determine the position (latitude and longitude) on the map of the panoramic image to be displayed, as well as the direction of display on the screen (horizontal and vertical angles) (S1). Next, the panoramic image acquisition unit 11 acquires the panoramic image corresponding to the position on the map determined in Step S401 (Step S2). The panoramic image for one position acquired in Step S402 is constructed of one large image composed of 2048 pixels high by 3584 pixels wide. These images constitute the left-view panoramic image. Next, the depth image acquisition unit 14 acquires a depth image associated with the panoramic image acquired in Step S402 (S3). The depth image shows the depth of each pixel in a three-dimensional space, representing the depth of each pixel by an eight-bit intensity value. The depth image itself also constitutes an image. Like the panoramic image, the depth image for one position is constructed of one large grayscale image composed of 2048 pixels high by 3584 pixels wide.

After the base panoramic image and the associated depth image are acquired a stereo image is generated according to the flowchart (S5). Subsequently after the stereo image is generated in Step S404, texture mapping is performed (Step S7). The texture mapping in this case refers to the process of placing the base panoramic image and the stereo image generated by the boundary processing unit 21 respectively onto a left-view spherical surface and a right-view spherical surface prepared in the 3D modeling space. Once the texture mapping in Step S7 is complete, the image that is projected when looking from the center of the sphere in the view direction indicated by the position and direction determination unit 2 is output to the left-view plane and the right-view plane (Step S8), thus achieving stereoscopic display in the stereoscopic compatible display.

Then, the panoramic image to be displayed is extracted and the depth image associated with the extracted image is acquired by the depth image acquisition unit 14 (Step S 15). Next, the DIBR unit 17 performs pixel shifting (DIBR processing) using the image and the depth information acquired in Step S2 (Step S16).

Some pixels may fall outside of the image region as a result of shift in DIBR. In that case, the boundary processing unit 21 temporality stores into the buffer memory the pixels that are shifted out of the image region (Step S17).

Since the panoramic image is constructed of one image, only one image is subjected to the processing. That is, the current image and the image adjacent to the current image are always one and the same image. That is, when Step S18 is performed after one panoramic image is determined as the base image and also as the current image, the same panoramic image is determined as being an adjacent image. As a result, the same panoramic image is again determined as the new current image. As a consequence, the current image subjected to the previous loop is newly determined as the current image. Then, the processing moves onto Step S22. In Step S22, it is determined whether the new current image is the base image. Since there is only one panoramic image, the newly determined current image is always equal to the base image. Thus, Step S22 results in Yes and thus the processing moves onto Step S23.

In Step S23, pixels currently stored in the out-of-area buffer memory are used to fill the right-view viewpoint image obtained by DIBR in Step S16. More specifically, the buffered pixels are used to fill in the opposite edge from the edge at which pixels are shifted off. The same processing is repeated for the left-view and right-view to complete the processing of pixel shifting and the boundary processing.

With the above processing, when a base left-view panoramic image is constructed of one large image, the generated right-view panoramic image is ensured to be seamless, with no missing pixels. Mapping these images as textures on a spherical surface and outputting the projection image in any user-indicated direction to the left and right planes allows for seamless panoramic stereoscopic display.

(Embodiment 3)

This embodiment discloses hardware implementation of the image rendering device described in the above embodiment.

Figure 30:
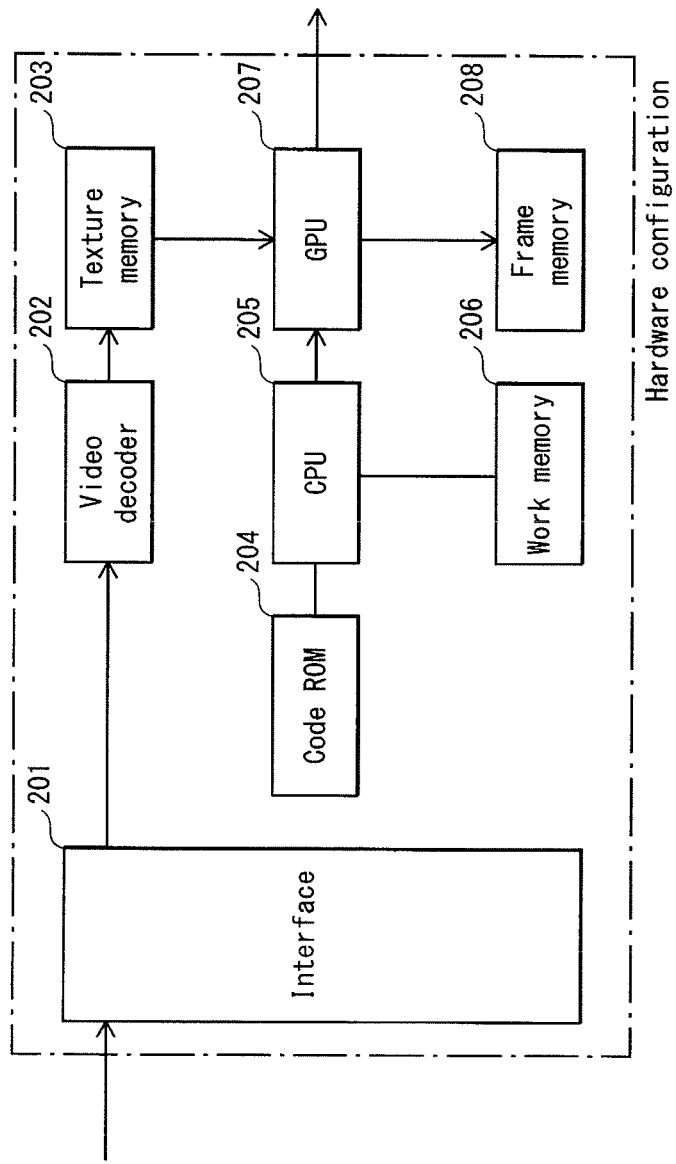
FIG. 30 illustrates the hardware configuration of an image rendering device.

First, the hardware configuration of the CG processor is described. FIG. 30 illustrates the hardware configuration of the CG processor. As illustrated in the figure, the image rendering device includes an interface 201, a video decoder circuit 202, a texture memory 203, a code ROM 204, a CPU 205, a work memory 206, a GPU 207, and a frame memory 208.

The interface 201 interfaces with a drive for a built-in medium or for a removable medium.

The video decoder 202 is a circuit dedicated for decoding background images and depth images read via the interface 201.

The texture memory 203 stores uncompressed background images decoded by the video decoder circuit 202.

The code ROM 204 stores a sequence of code of a program for realizing the processing steps shown in the above flowcharts.

The CPU 205 reads and executes a sequence of code stored on the code ROM 204 to realize the processing steps described in the above embodiment.

The work memory 206 is used as a memory area for variables and arrays used by the code ROM 204 during processing.

The GPU 207 is a circuit dedicated for graphics processing, such as texture mapping.

The frame memory 208 is memory used by the GPU 207 during processing.

Figure 31:
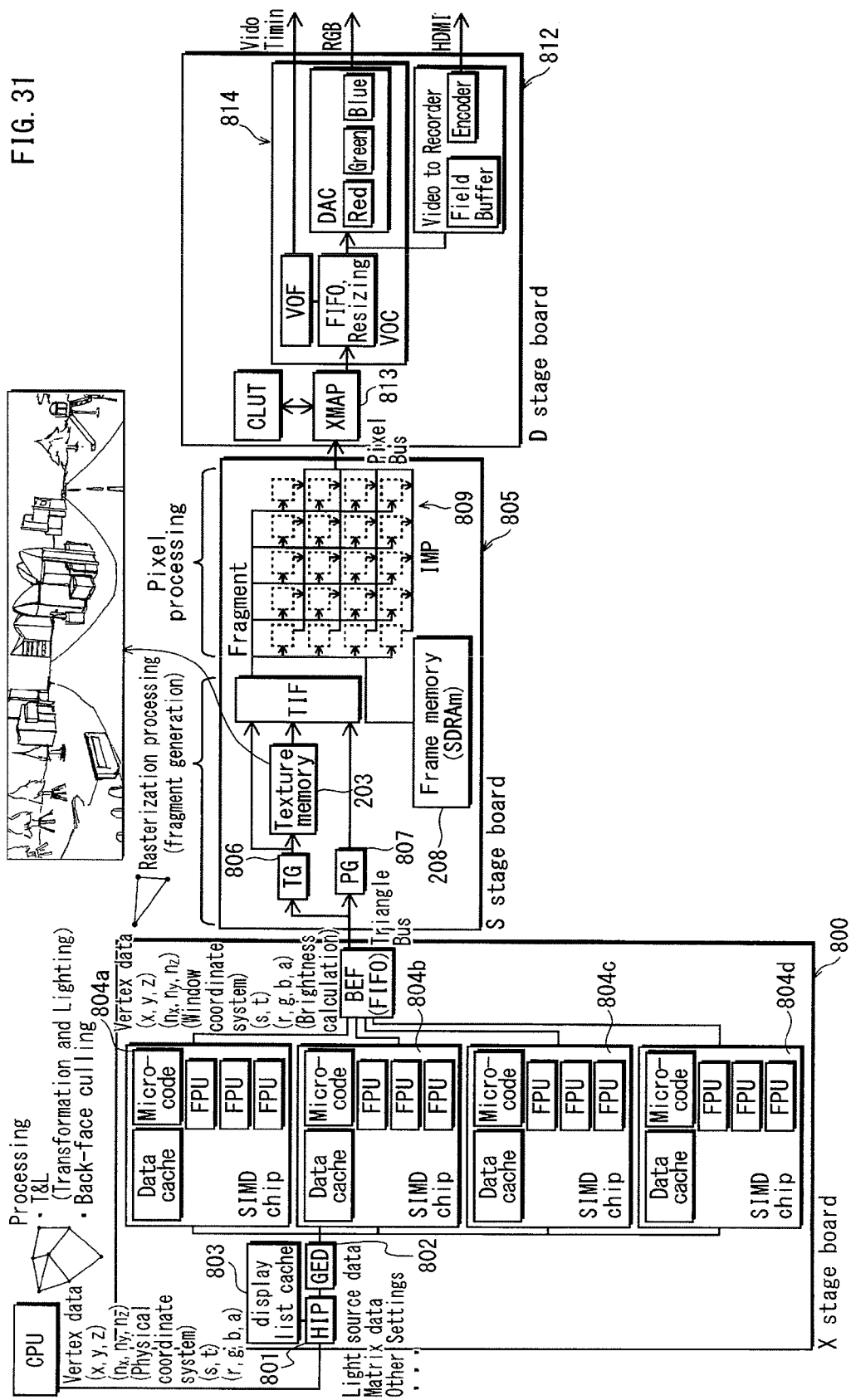
FIG. 31 illustrates the internal configuration of a GPU.

FIG. 31 illustrates the internal configuration of the GPU.

An X stage board 800 realizes processing in X (Transformation, Xformation) stage and includes an HIP 801, a GED 802, a display list cache 803, and SIMD chips 804a, 804b, 804c, and 804d. The processing of X (Transformation) stage roughly includes two processes. One is the transformation process of converting the coordinates (x, y, z) of each vertex in the three dimensional space to the coordinates on a two dimensional screen. The other is the lighting computation process for computing the brightness (color) and light casted on each vertex based on the information about the light source and texture. These two processes (Transformation and Lighting) are collectively referred to as "T & L process" or "TnL" process.

The HIP (Host Interface Processor) 801 is an ASIC (Application Specific Integrated Circuit) that interprets an OpenGL API call received as input and converts the call into a format suitable for computation.

The GED (Geometry Element Distributor) 802 plays the role of appropriately distributing the pieces of vertex data to the subsequent four SIMD chips by finding the chips in the standby state.

The display list cache 803 is cache memory for storing a display list in which OpenGL API calls are grouped. By preparing a series of, frequently used OpenGL API calls in a display list, the amount of data transferred from the CPU to the X stage board can be reduced significantly.

The SIMD chips 804a, 804b, 804c, and 804d are each a single-chip processor realized as ASIC having three FPUs (floating-point units), a cache for storing microcode and a data cache. One FPU includes the following two arithmetic units. One is a common floating-point ALU (Arithmetic Logic Unit), and the other is a floating-point multiplier. The board in this embodiment is equipped with the four SIMD chips described above. In the FPU, 12 systems operate in parallel. Thus, 12 pieces of vertex data (x, y, z) can be simultaneously processed in parallel.

The details of the processing to be performed by the SIMD chips (i.e., algorithms for the coordinate conversion and lighting computation) are described in the form of microcode. Each arithmetic circuit operates according to the microcode stored on the cache on the chip. The microcode is loaded to the cache upon system activation. The arithmetic results by the SIMD chips are collected to FIFO (First-In First-Out) memory and transferred to a bus called Triangle Bus as output of the overall X stage board. Each piece of vertex data includes coordinates (x, y) and depth information z in the screen coordinate system, lighting computation result (r, g, b), transparency information a, normal vector (nx, ny, nz), and texture coordinates (s, t).

In addition, this board also performs pre-processing for improving the computation efficiency in the subsequent S stage. One typical pre-processing is back-face culling. Back-face culling refers to a process of detecting any triangle that appears as facing away from the viewpoint when converted into the window coordinate system. Any piece of vertex data relating to such a triangle is caused not to output to the Triangle Bus. This concludes the description of the X stage board.

The following now describes the S stage board 805. The S stage board 805 is composed of four different types of ASIC chips (TG806, PG807, TF808, and IMP809). The processes performed in the S (Scan conversion) stage include rasterization to color each pixel located inside a triangle, hidden surface removal, stencil masking, and fogging.

One important function in the rasterization process is texture mapping of applying a panoramic image onto the spherical strips. In the texture mapping, the address within a texture image stored in the texture memory is specified not by interpolating the brightness (r, g, b) but by interpolating the texture coordinates (s, t) to read an appropriate pixel. The brightness (r, g, b) of the read pixel is determined as the brightness data of the fragment.

Input to the S stage board is fragments of each vertex of a triangle received from the X stage board via the Triangle Bus. Each fragment is a piece of data including the screen coordinates (x, y, z), texture coordinates (s, t), brightness (r, g, b), transparency a, and nominal vector (nx, ny, nz).

The TG (Texture Generator) chip 806 fills a triangle, outputs the interpolation result of the texture coordinates (s, t) for each pixel, specifies an address in the texture memory, and passes the texture pixel (called texel) to the TF (Texture Filter).

The PG (Pixel Generator) chip 807 performs the rasterization process, i.e., fills the triangle, and interpolates the brightness (r, g, b) for each pixel.

The TF (Texture Filter) chip 808 composites the output of the PG (i.e., the brightness modified for shading) with the output from the texture memory (i.e., texle), and passes a fragment for each pixel to the IMP (Image Memory Processor).

The IMP (Image Processor) 809 is a processor for realizing a flow of pixel processing, involving fogging, anti-aliasing, alpha test, stencil test, depth test, blending, masking, and selection of a write buffer. The IMP 809 then writes the resultant data to the frame memory 208.

The D stage board 812 is for performing D-stage processes and provided with XMAP 813 and VOC 814.

The XMAP (Pixel Mapping Asic) 813 receives image data from the Pixel Bus, applies conversion with the use of a look-up table as necessary, and displays a cursor. Then, the XMAP 813 sends the resulting image data on to the Video Packet Bus. Each VOC picks up an image according to the VOF data describing a rectangular region to be processed by the respective VOC and converts the data into a video signal by a DA converter.

The VOC (Video Output Channel) circuit 814 includes an output circuit for magnifying an image, and a filtering circuit for improving the image quality of the magnified image. When the processing load increases, the VOC circuit 814 renders an image at dynamically lowered resolution and enlarges the rendered image by a hardware function to restore the initial image. The stage board has eight output channels at maximum and also has an HDMI output encoder.

Next, a description is given of controls of the GPU, which is a hardware component, to be instructed by software.

Figure 32:
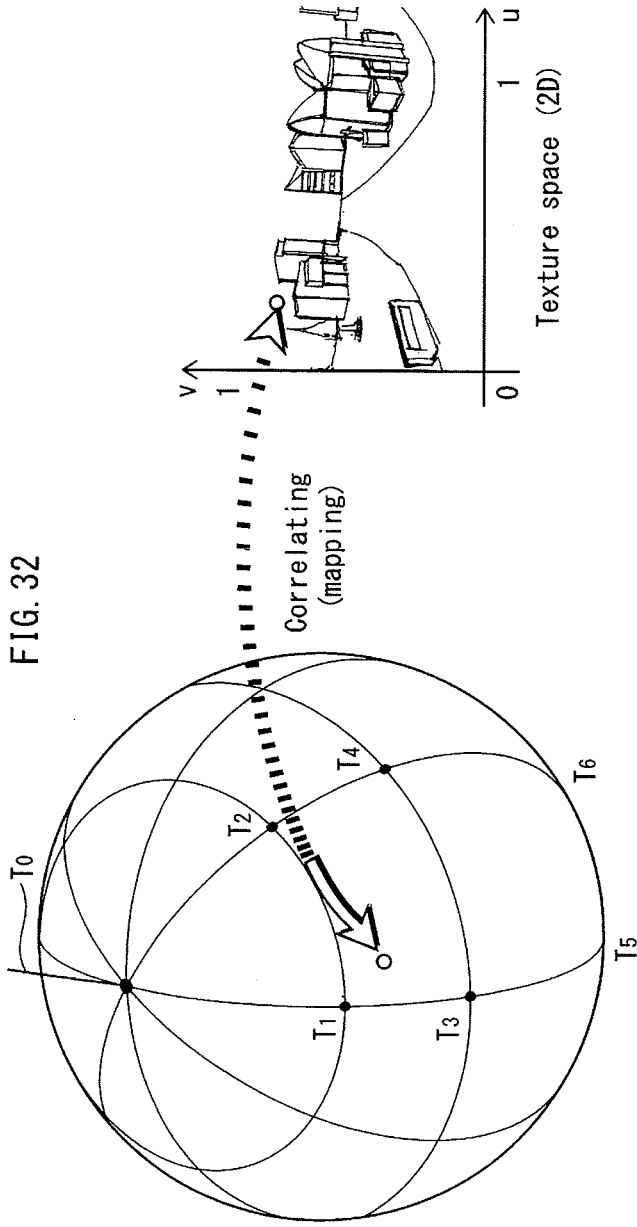
FIG. 32 illustrates mapping between a spherical model and texture and also illustrates an example description of an API call for realizing texture mapping.

FIG. 32A illustrates the mapping between the spherical model and texture. In left hand side of the figure illustrates the grid of the spherical model, and the right hand side shows the stored content (i.e., textures) of the texture buffer. The spherical model illustrated on the left hand side is divided into W regions along a lateral direction and a texture is to be applied to each region. In the present embodiment, a geometry subjected to texture mapping is a triangle strip. The entire or a portion of a triangle strip is subjected to texture mapping. The entire or portion of triangle strip is defined by a vertex grid. More specifically, a grid defined by points T1, T2, and T3 is subjected to texture mapping, and a grid defined by points T3, T4, T5, and T6 is subjected to another texture mapping. The coordinates describing each point defining the grids are designated as indices used in texture mapping.

FIG. 32B illustrates an example description of an OPEN-GL API call for realizing texture mapping.

The statement "glVertexPointer (3, GL#FLOAT, 0, g#v);" is for storing the series of coordinates describing the points of a grid in the three-dimensional modeling space as vertices. The argument "3" is the number indicating the dimensions of the three-dimensional modeling space, and "GL#FOLAT" indicates that each coordinate is floating-point type data.

The statement "glTexCoordPointer(2, GL#FLOAT, 0, g#uv):" is an API call for storing a series of texture coordinates g#uv corresponding vertices of the grid in the three-dimensional modeling space as texture coordinate values.

The statement "for(I=0;i<W;i++)" defines a loop of repeating "glDrawElements" for each of W coordinates in the lateral direction.

The following describes the statement "glDrawElements (GL#TRIANGLE#STRIP, (H+1)*2, GL#UNSIGNED#SHORT, getStaticData( )→g#index[i]);". The first argument in this API call indicates that the geometry of the 3D model is a triangle strip (GL#Triangle#Stirp). The second argument specifies the number of vertices. Here, the number is specified as (the vertical division number H+1)×2. The statement "GL#UNSIGNED#SHORT" specifies that the type of index sorting vertices is of a short format, which is without a sign. The statement "g#index[W]" is an index array determining the order of rendering and the coordinates describing each intersection of the grid is stored as an element of the array. Through rendering by following the coordinates of vertices stored as the array elements of "g#index", texture mapping is carried out.

First, the following describes the hardware configuration for realizing DIBR (that is, the hardware configuration of the panoramic image memory 13 and the pixel shift unit 18 is described).

The panoramic image memory 13 is composed of a plurality of line memories each of which is in turn composed of a plurality of 32-bit memory elements. Panoramic image data is stored in the 32-bit memory elements. The coordinates of panoramic image data on a screen are defined, for example, by pairs each made up of a ROW address and a COLUMN address in the panoramic image memory 13. A ROW address specifies a line memory in the panoramic image memory 13, and a COLUMN address specifies a memory element in the related line memory. This concludes the description of the panoramic image memory 13. The following now describes the hardware configuration of the pixel shift unit 18.

The pixel shift unit 18 applies pixel shift to the panoramic image data using the depth image data thereby to generate a texture as seen from a different viewpoint.

To generate a left-view texture by modifying the X coordinate of each pixel of a panoramic image, the panoramic image is copied from the panoramic image memory 13 to the left-view texture memory 22. At the time of copying, the COLUMN address specifying the memory element used to store the copy of the panoramic image needs to be adjusted to an address that is closer to the top by the number of pixels X. By copying the panoramic image to the address adjusted in the above manner, the resulting left-view texture is shifted to the left. Thus, the pixel shift unit 18 can generate a left-view texture through the copying involving the address adjustment.

Similarly, to generate a right-view texture by changing the X coordinate of each pixel, the panoramic image is copied from the panoramic image memory 13 to the right-view texture memory 23 after adjusting the COLUMN address specifying the memory element used to store the copy of the street view to an address that is closer to the bottom by the number of pixels X. By copying the panoramic image to the address adjusted in the above manner, the resulting right-view texture is shifted to the right. Thus, the pixel shift unit 18 can generate a right-view texture through the copying involving the address adjustment. This concludes the description of the hardware implementation of the pixel shift unit 18.

DIBR may also be realized by line scanning. Line scanning involves reading a set of pixels (1920×1080) for one screen from the frame memory in units of 1920 pixels and converting the read pixels into a video signal. The line scanning is realized by a line-pixel memory for storing pixel data for one line of an image, a filter circuit, and a conversion circuit for parallel/serial conversion. As described above, DIBR refers to processing for converting the intensity value of each pixel in a depth image into a corresponding parallax to shift the pixel. The coordinates of each pixel constituting one line of a panoramic image read to the line memory are shifted by the number of pixels represented by the depth of a corresponding line in the depth image of the panoramic image. As a result, a viewpoint image as seen from a different viewpoint is created in a manner to appropriately reflect the depths shown by the depth image.

<Supplemental>

Up to this point, the best mode embodiments known to the applicant at the time of filing the present application have been described. With respect to the following technical topics, further improvements and modifications may be made. Each embodiment is practiced as described above and whether or not to make these improvements and modifications are optional and up to discretion of those who practice the embodiments.

(Variations of Depth Images)

A compressed Mercator depth image has been described as PNG data prepared by compressing an image representing depths of a Mercator image. Since noise in depth data compression tends to be noticeable, lossless compression such a PNG format is preferable. Note that the data of the compressed Mercator depth image in the street view file is redundant. Therefore, in addition to compressed data resulting from PNG compression, the street view file may additionally be provided with: surrounding terrain data; and data indicating the relationship between the compressed Mercator image and the surrounding terrain data. Note that in the case of transmitting or receiving the stereoscopic street view viewpoint over the Internet, the compressed Mercator image may be divided into a plurality of files. This makes it possible to display the compressed Mercator image even during download.

(Embodiments of Integration Circuit)

Regarding the hardware configuration of the image rendering device described in Embodiment 1, portions other than mechanical portions (such as the drive unit of a recording medium and the connectors to external sources) may be implemented as a system LSI. That is, portions corresponding to logic circuits and memory elements, i.e., cores of the logic circuits may be implemented as a system LSI. A system LSI refers to a package of bare chips mounted on a high-density substrate. A multi-chip module is a package of a plurality of bare chips mounted on one high-density substrate and thus has an external appearance like a single LSI. Such a multi-chip module is also encompassed within the scope of a system LSI.

Focusing on the types of packages, system LSIs include the following two types: QFP (Quad Flat Package) and PGA (pin grid array). QFP refers to a system LSI package having pins extending from each of the four sides. PGA refers to a system LSI package having a number of pins attached to the entire underside of the package.

These pins play the role of power feed, ground, and an interface with other circuits. Since the pins of the system LSI functions as an interface, by connecting other critics to the pins, the system LSI acts as the core of the image rendering device.

(Embodiments of Programs)

The programs shown in the above embodiments may be made in the following way. First, a software developer describes in a programming language a source program for realizing flowcharts or functional components described above. When describing the source program for realizing the flowcharts or functional components, the software developer follows the syntax of the program language and uses class structures, variables, array variables, and external function calls.

The source program thus described is then supplied in a file to a complier. The complier interprets the source program into an object program.

The interpretation by the complier involves processes, such as parsing, optimization, resource allocation, and code generation. In the process of parsing, the lexical analysis, syntactic analysis, and semantic analysis are performed to convent the source program into an intermediate program. In the process of optimization, the intermediate program is subjected to partitioning into basic blocks, control flow analysis, and data flow analysis. In the process of resource allocation, variables used in the intermediate program are allocated to the registers or memories of a processor targeted for execution of the resulting program to for adaptation to instruction sets for the targeted processor. In the process of code generation, intermediate instructions in the intermediate program are converted into program code to obtain an object program.

The object program thus generated is composed of one or more lines of program code for causing execution of a step or a procedure of a functional component described in the above embodiments. The program code may be of various types, including native code of a processor and JAVA(registered trademark) bytecode. The program code may realize the steps in various manners. In the case where each step may be realized by using an external function, then a call instruction to involve the external function serves as the program code. In another case, lines of program code for realizing a single step may be included in separate object programs. In the case of a RISC processor that uses only limited types of instructions, each step of the flowchart may be realized by a combined uses of an arithmetic instruction, a logical instruction, a branching instruction, and the like.

Once such an object program is ready, a programmer activates a linker for the object program. The linker allocates the object program and related library programs to memory spaces and combines all the programs into a single load module. The load module thus generated is to be read and executed by a computer to realize the processing steps shown in the flowcharts or the procedures of the functional components. Such a computer program may be stored on a non-transitory computer readable recording medium and provided to users.

(Increasing or Decreasing Angle of Panoramic Images)

In each embodiment, the description is directed to a panoramic image prepared by stitching seven background images in the row direction. However, the number of background images stitched together in the row direction may be reduced, which results in a change in the angle covered by the street view that can be seen from the viewpoint. In the above embodiments, a panoramic image covers the 360° field of view with seven background images arranged in the row direction. Thus, the angle covered by one background image is 52° (≈365°/7). That is, by combining two images, the resultant image provides the field of view angle of 104° (≈52°×2), and by combining three images, the resultant combined image provides the field of view angle of 156° (≈52°×3). In this manner, by changing the number of images combined in the row direction by a street view collection server or image providing device, the field of view angle covered by the resultant panoramic image can be changed to reduce the processing load of texture mapping, computation of parallaxes in texture, and so on.

INDUSTRIAL APPLICABILITY

The image rendering device in the present invention can, from the standpoint of industrial management, be manufactured and sold continually and repeatedly. In particular, the present invention is useful in the consumer product industry related to creation and reproduction of panoramic stereoscopic images.

REFERENCE SIGNS LIST 101 rendering device
102 remote control
103 stereoscopic compatible display
104 liquid crystal shutter glasses
105 server
1 user operation detection unit
2 position and direction determination unit
3 network interface
4 local storage

The invention claimed is:

1. An image rendering device for realizing stereoscopic viewing of joint image data,
   the joint image data being constructed of a plurality of pieces of background image data that are stitched together in a row direction,
   the image rendering device comprising:
   a pixel shifter that applies pixel shifting to each piece of background image data and conducts boundary processing relative to the pixel shifting, thereby to acquire two or more viewpoint textures for the joint image data;
   a mapper that places the two or more viewpoint textures onto inner surfaces of three-dimensional models in a three-dimensional modeling space;
   a viewport converter that extracts, for each of two or more viewpoints, a viewport image from the textured three-dimensional models, wherein
   the pixel shifting is to shift coordinates of respective pixels in each piece of background image data in the row direction, and the amount of shift applied to each pixel is determined based on a depth of a corresponding pixel in depth image data associated with the joint image data, and
   the boundary processing is to extract out-of-region pixels which are pixels to be located outside a display region of a given one of the pieces of background image data as a result of the pixel shifting, and write the extracted out-of-region pixels at an edge of another piece of background image data that is adjacent to the given piece of background image data in the row direction.

2. The image rendering device according to claim 1, further comprising:
   a display region buffer; an out-of-region buffer; and a texture memory that stores a piece of background image data already processed by the pixel shifting, wherein
   of the plurality of pieces of background image data constructing the joint image data, a piece of background image data currently subjected to the pixel shifting is designated as a current piece of background image data,
   the pixel shifting is carried out by:
      storing the current piece of background image data in the display region buffer;

shifting, on the display region buffer, coordinates of respective pixels in the current piece of background image data in the row direction; and extracting out-of-region pixels shifted to outside a display region of the current piece of background image data and storing the extracted out-of-region pixels in the out-of-region buffer, and the boundary processing is carried out by:

reading the out-of-region pixels from the out-of-region buffer; and writing the read out-of-region pixels at the edge of the piece of already processed background image data stored in the texture memory.

3. The image rendering device according to claim 1, wherein the joint image data is joint Mercator image data obtained by stitching together one edge and another edge of a single piece of Mercator image data, and the boundary processing is carried out by:

extracting out-of-region pixels which are pixels to be located outside a display region of the Mercator image data as a result of the pixel shifting applied to respective pixel in the joint Mercator image data based on the depth image data; and writing the extracted out-of-region pixels into the joint Mercator image at the opposite edge from the edge where the out-of-region pixels are extracted.

4. The image rendering device according to claim 1, further comprising:

a position and direction determiner that determines, in accordance with a user operation, a current viewpoint location on a map and a current line-of-sight direction; and an acquisitor that generates an image acquisition request using geographic information corresponding to the current viewpoint location on the map and transmits the image acquisition request to an image collection server, thereby to download a street view file, wherein the street view file downloaded from the image collection server has a location attribute matching the geographic information included in the image acquisition request, and the joint image data is contained in the downloaded street view file.

5. The image rendering device according to claim 1, wherein the joint image data is a panoramic image and constructed of the plurality of pieces of background image data stitched together in the row direction to represent a view of surroundings as seen from a geographic location corresponding to the geographic information included in the image acquisition information.

6. An image rendering method for realizing stereoscopic viewing of joint image data, the joint image data being constructed of a plurality of pieces of background image data that are stitched together in a row direction, the image rendering method comprising:

applying pixel shifting to each piece of background image data and conducting boundary processing relative to the pixel shifting, thereby to acquire two or more viewpoint textures for the joint image data;

placing the two or more viewpoint textures onto inner surfaces of three-dimensional models in a three-dimensional modeling space;

extracting, for each of two or more viewpoints, a viewport image from the textured three-dimensional models, wherein the pixel shifting is to shift coordinates of respective pixels in each piece of background image data in the row direction, and the amount of shift applied to each pixel is determined based on a depth of a corresponding pixel in depth image data associated with the joint image data, and the boundary processing is to extract out-of-region pixels which are pixels to be located outside a display region of a given one of the pieces of background image data as a result of the pixel shifting, and write the extracted out-of-region pixels at an edge of another piece of background image data that is adjacent to the given piece of background image data in the row direction.

7. A non-transitory recording medium recording an image rendering program for causing a computer to realize stereoscopic viewing of joint image data, the joint image data being constructed of a plurality of pieces of background image data that are stitched together in a row direction, the image rendering program comprising code that causes the computer to perform:

applying pixel shifting to each piece of background image data and conducting boundary processing relative to the pixel shifting, thereby to acquire two or more viewpoint textures for the joint image data;

placing the two or more viewpoint textures onto inner surfaces of three-dimensional models in a three-dimensional modeling space;

extracting, for each of two or more viewpoints, a viewport image from the textured three-dimensional models, wherein the pixel shifting is to shift coordinates of respective pixels in each piece of background image data in the row direction, and the amount of shift applied to each pixel is determined based on a depth of a corresponding pixel in depth image data associated with the joint image data, and the boundary processing is to extract out-of-region pixels which are pixels to be located outside a display region of a given one of the pieces of background image data as a result of the pixel shifting, and write the extracted out-of-region pixels at an edge of another piece of background image data that is adjacent to the given piece of background image data in the row direction.

* * * * *